United States Patent
Kasahara et al.

(10) Patent No.: US 8,906,279 B2
(45) Date of Patent: Dec. 9, 2014

(54) MANUFACTURING METHOD OF POLARIZING PLATE PROTECTIVE FILM, POLARIZING PLATE PROTECTIVE FILM, POLARIZING PLATE, AND LIQUID CRYSTAL DISPLAY DEVICE

(75) Inventors: Kenzo Kasahara, Kunitachi (JP); Koichi Saito, Kawagoe (JP); Rumiko Yamada, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 675 days.

(21) Appl. No.: 12/308,429

(22) PCT Filed: May 21, 2007

(86) PCT No.: PCT/JP2007/060362
§ 371 (c)(1),
(2), (4) Date: Dec. 15, 2008

(87) PCT Pub. No.: WO2007/148496
PCT Pub. Date: Dec. 27, 2007

(65) Prior Publication Data
US 2010/0239787 A1 Sep. 23, 2010

(30) Foreign Application Priority Data
Jun. 21, 2006 (JP) ................. 2006-171168

(51) Int. Cl.
*B29D 11/00* (2006.01)
*B29C 47/88* (2006.01)
*B29C 47/00* (2006.01)
*G02B 1/10* (2006.01)

(52) U.S. Cl.
CPC ......... *B29C 47/8845* (2013.01); *B29C 47/0021* (2013.01); *G02B 1/105* (2013.01)
USPC .................... 264/211; 264/176.1

(58) Field of Classification Search
USPC ............................... 264/211, 176.1
See application file for complete search history.

(56) References Cited

U.S. PATENT DOCUMENTS 5,175,312 A * 12/1992 Dubs et al. ............. 549/307
5,516,920 A * 5/1996 Nesvadba et al. .......... 549/307
(Continued)

FOREIGN PATENT DOCUMENTS

JP 2923681 B2 9/1991
JP 07-233160 A 9/1995
(Continued)

OTHER PUBLICATIONS

Furuhashi et al., "Rollers for shaping plastic sheets, films, paper, fibers, etc. consist of a metallic main roll and a thin presses roll of specific radius, which has an inner cylinder with cooling fluid", JP 11-235747 A, Derwent Abstract, Aug. 31, 1999.*

(Continued)

*Primary Examiner* — Galen Hauth
(74) *Attorney, Agent, or Firm* — Holtz, Holtz, Goodman & Chick PC

(57) ABSTRACT

A process for producing a cellulose-ester-resin-containing protective film for polarizers through film formation by melt casting. The protective film diminishes long-period optical unevenness and suffers no unevenness even after long-term storage. Also provided are a protective film for polarizers, a polarizer employing the film, and a liquid-crystal display. The process for producing a protective film for polarizers is a process for producing by the melt casting method a polarizer-protective film containing a cellulose ester resin. The process for producing a protective film for polarizers is characterized in that the protective film contains at least one compound selected among compounds represented by the following general formula (I) and compounds having an acrylate or methacrylate group and a phenolic hydroxy group in the same molecule and that the protective film extruded from a casting die at a draw ratio of 10-30 during film formation by melt casting is transferred while holding/pressing it between a touch roll having an elastic surface and a cooling roll.

5 Claims, 2 Drawing Sheets

(56) References Cited

U.S. PATENT DOCUMENTS

| | | | |
|---|---|---|---|
| 6,060,545 A * | 5/2000 | Gilg | 524/199 |
| 2003/0031848 A1* | 2/2003 | Sawada et al. | 428/220 |
| 2005/0150426 A1* | 7/2005 | Hashimoto et al. | 106/170.21 |
| 2006/0036033 A1* | 2/2006 | Toyoshima et al. | 525/97 |
| 2006/0062935 A1* | 3/2006 | Murakami | 428/1.31 |

FOREIGN PATENT DOCUMENTS

| | | | |
|---|---|---|---|
| JP | 11235747 A * | 8/1999 | |
| JP | 2000-143946 A | 5/2000 | |
| JP | 2002-121399 A | 4/2002 | |
| JP | 2003-131006 A | 5/2003 | |
| JP | 2003-131036 A | 5/2003 | |
| JP | 2004-359819 A | 12/2004 | |
| JP | 2005-172940 A | 6/2005 | |
| JP | 2005-178194 A | 7/2005 | |
| JP | 2005-280217 A | 10/2005 | |
| JP | 2006-057109 | 3/2006 | |
| JP | 2006-143799 A | 6/2006 | |
| KR | 1999-0030237 | 4/1999 | |
| TW | 578016 | 3/2004 | |
| WO | WO 2007/043358 A1 | 4/2007 | |

OTHER PUBLICATIONS

Ogino, Kentaro, "Optical Film and Manufacturing Method Therefor", JP 2005-172940 A, Machine Translation, Jun. 30, 2005.*
Korean Office Action mailed Sep. 11, 2013 in Korean Application No. 10-2008-7030741.
Taiwanese Office Action mailed Dec. 25, 2012 in Taiwanese Application No. 096121656.
Japanese Office Action dated Jul. 30, 2011 in Japanese Application No. 2008-522349.
Korean Office Action mailed Mar. 27, 2014 in Korean Application No. 10-2008-7030741.

* cited by examiner

US 8,906,279 B2

MANUFACTURING METHOD OF POLARIZING PLATE PROTECTIVE FILM, POLARIZING PLATE PROTECTIVE FILM, POLARIZING PLATE, AND LIQUID CRYSTAL DISPLAY DEVICE

This application is the United States national phase application of International Application PCT/JP2007/060362 filed May 21, 2007.

TECHNICAL FIELD

The present invention relates to a manufacturing method of a polarizing plate protective film, a polarizing plate protective film, a polarizing plate, and a liquid crystal display device, and in more detail, to a manufacturing method of a polarizing plate protective film incorporating cellulose ester resins via a melt casting method, which decreases long-period optical unevenness and does not generate the aforesaid optical unevenness after extended storage, and a polarizing plate protective film, a polarizing plate employing the same, and a liquid crystal display device.

BACKGROUND ART

The melt casting method is a method in which a melted film making composition, which is prepared by heating and melting polymers, is extruded from a die in a form of film, and solidified by cooling, and if needed, stretched, whereby a film is prepared. Since it is unnecessary to dry solvents, advantage results in which relatively compact facilities are employable.

On the other hand, it is common that the viscosity of melted polymers is higher than that of the polymer solution by a factor of 10-100. Consequently, since it is difficult to achieve leveling on the support, the resulting film carries problems in which clear streaking defects, called die-lines tends to occur. When the above die lines exist to a high degree, the following problems occur. When the resulting optical film is incorporated in a liquid crystal display device, light and shadow streaks, due to the die lines, are observed.

Specifically, melted materials of cellulose ester resins exhibit properties of no easy elongation due to high viscosity, whereby it has been difficult to employ the melt casting method. Specifically, when the draw ratio is high, thickness is not uniform in the film conveying direction (hereinafter, the film conveying direction or the conveying direction is occasionally described as the longitudinal direction), and problems occur in which breakage tends to occur in processes such as tenter stretching, whereby a decrease in die lines has been demanded. "Draw ratio", as described herein, is a value which is obtained by dividing the lip clearance of a die by the average thickness of the film solidified on the cooling roller.

As a method to minimize the above defect, a method has been considered in which film is brought into closer contact with a cooling roller via a rigid metallic touch roller. However, it is anyhow impossible to eliminate unevenness of the touch pressure by employing this method. As a result, problems occur in which optical unevenness such as retardation increases.

In order to dissolve problems due to the use of the above metallic touch roller, a method is proposed in which an elastic touch roller is employed.

Patent Document 1 discloses that an optical film exhibiting optical unevenness is prepared by pressing a cooling roller against an elastic roller controlled at a specified film temperature during extrusion of amorphous thermoplastic resins. As the above elastic roller, a rubber roller covered with a metal sleeve is preferred. Further specifically employed is a silicone rubber roller (at a wall thickness of 5 mm) covered with a 200 μm thick metal sleeve.

Further, Patent Document 2 discloses that an optical film, which exhibits excellent thickness accuracy, is prepared in such a manner that during extrusion of amorphous thermoplastic resins, a touch roller, carrying a surface capable of being elastically modified, is brought into close contact with a cooling roller under the conditions that the contact width of the touch roller during no rotation and the cooling roller is specified. As the touch roller, employed, in the specific example, is a silicone rubber (at a wall thickness of 5 mm) roller of which surface is covered with a 200 μm metal tube.

In any of the examples described in the above patent documents, norbornene based resins are employed as polymers, and the effects are verified.

The inventors of the present invention carried out film molding via the elastic touch roller described in the above patent documents, employing cellulose ester resins, and evaluated the resulting optical film as a polarizing plate protective film. It became clear that problems occurred in which long-period optical unevenness and the same after storage over an extended period were observed. Further, when the film production rate was increased, it was noted that the long-period optical unevenness tended to be more marked. In each of the above patent documents, no film production rate is described. For example, at a film production rate of 15 m/minute, the optical unevenness was pronounced and productivity was deteriorated, whereby practical problems occurred. "Long-period optical unevenness", as described herein, refers to the light and shadow unevenness which periodically appears over a length of approximately 10 cm, when a polarizing plate protective film is adhered onto a polarizing plate, followed by incorporation into a liquid crystal display device and the resulting device is employed at black display.

Further, Patent Document 3 discloses that it is possible to prepare an optical film exhibiting optical evenness by setting the temperature, just prior to close contact of an amorphous thermoplastic resin film with a cooling roller at Tg+30° C. or higher and by setting the draw ratio at 10 or less when the film thickness is 70-100 μm, at 15 or less when the same is 50-70 μm, and further at 20 or less when the same is at most 50 μm. Above Patent Document 3 describes that film is brought into close contact with a cooling roller via pressing or sucking, and describes various means. Specifically employed is an air chamber during molding of norbornene based resins and polysulfone resins.

On the other hand, when the method described in Patent Document 3 was employed, problems occurred in which die lines were pronounced, and when images were displayed via a liquid crystal display device, periodic light and shadow unevenness due to the die lines was observed.

As described above, at present, the polarizing plate protective film prepared via the melt casting film production method employing cellulose ester resins exhibits various problems.

Film composed of cellulose ester resins as a major raw material exhibits features such as optical evenness and minimal optical defects, in addition, excels in adhesion properties with a polarizer, and also exhibit features of appropriate moisture permeability when adhered onto a polarizing plate stretched via a wet system. Consequently, demanded is a manufacturing method of the polarizing plate protective film composed of cellulose ester resins as a major raw material via a melt casting film production method in which the various above problems are solved.

On the other hand, Patent Document 4 proposes application of 3-aryl-2-benzofranone as a stabilizer for organic materials which are easily subjected to oxidative, thermal, or photoinductive decomposition. As a specific example, Patent Document 5 discloses that in order to prepare a norbornene based polymer resin composition which excels in heat resistance, accurate molding properties, and stain resistant effects during molding at high temperature, compounds having a lactone structure are incorporated. Further, Patent Document 6 discloses that compounds having a lactone structure in the molecule or an acrylate group, and a phenolic hydroxyl group in the molecule are employed as a polymer carbon radical scavenger, whereby molded products are obtained which result in almost no formation of spot-like and streak-like external defects, coloration and color modification, and are appropriate for optical applications. However, as described above, when cellulose ester resins are employed, it is difficult to solve the problems due to the use of norbornene resins as a polymer.

Patent Document 1: Japanese Patent Publication Open to Public Inspection (hereinafter referred to as JP-A) No. 2005-172940

Patent Document 2: JP-A No. 2005-280217

Patent Document 3: JP-A No. 2003-131006

Patent Document 4: JP-A No. 7-233160

Patent Document 5: JP-A No. 2000-143946

Patent Document 6: JP-A No. 2002-121399

DISCLOSURE OF THE INVENTION

Problems to be Solved by the Invention

An object of the present invention is to provide a manufacturing method of a cellulose ester resin-containing polarizing plate protective film via a melt casting film production method which reduces long-period optical unevenness and results in evenness after storage over an extended period, a polarizing plate protective film, a polarizing plate employing the same, and a liquid crystal display device.

Means to Solve the Problem

The above object of the present invention is achieved via the following embodiments.

1. In a manufacturing method of cellulose ester resin-containing polarizing plate protective film formed via a melt casting film production method, a manufacturing method of a polarizing plate protective film wherein the aforesaid polarizing plate protective film incorporates at least one of the compounds represented by the following Formula (I), or the compounds having an acrylate group or a methacrylate group and a phenolic hydroxyl group in the same molecule, and the aforesaid polarizing plate protective film extruded from a casting die at a draw ratio of 10-30 during the melt casting film production is conveyed upon being sandwiched and pressed by a touch roller exhibiting surface elasticity and a cooling roller.

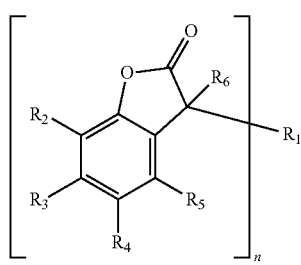

Formula (I)

wherein $R_2$-$R_5$ each independently represents a hydrogen atom or a substituent, $R_6$ represents a hydrogen atom or a substituent, and "n" represents 1 or 2. When "n" is 1, $R_1$ represent a substituent, and when "n" is 2, $R_1$ represents a divalent linking group.

The above draw ratio is the value obtained by dividing lip clearance B of the die shown in FIG. 2 by average thickness A of the film fixed on the cooling roller.

2. The manufacturing method of a polarizing plate protective film, described in 1. above, wherein the aforesaid polarizing plate protective film incorporates the compound represented by above Formula (I) in a amount of 0.01-5.0 parts by weight.

3. The manufacturing method of a polarizing plate protective film, described in 1. above, wherein when $R_1$ in the aforesaid Formula (I) represents a substituent, $R_1$ is a xylyl group, a phenyl group, or a methoxyphenyl group.

4. The manufacturing method of a polarizing plate protective film, described in 1. above, wherein a compound having the aforesaid acrylate group or methacrylate group and phenolic hydroxyl group in the same molecule is represented by the following Formula (II).

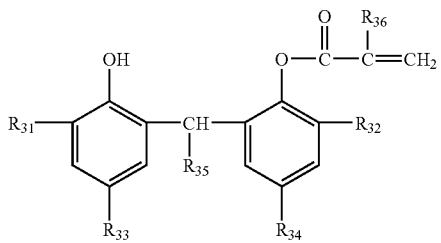

Formula (II)

wherein $R_{31}$-$R_{35}$ each independently represents a hydrogen atom or an alkyl group having 1-10 carbon atoms, and $R_{36}$ represents a hydrogen atom or a methyl group.

5. The manufacturing method of a polarizing plate protective film, described in 4. above, wherein the aforesaid polarizing plate protective film incorporates the compound represented by the aforesaid Formula (II) in an amount of 0.01-5.0 parts by weight with respect to 100 parts by weight of the aforesaid cellulose ester resin.

6. The manufacturing method of a polarizing plate protective film, described in 1. above, wherein the aforesaid cellulose ester resin simultaneously satisfies the following Schemes (1) and (2):

$$2.6 \leq X+Y \leq 3.0 \quad \text{Scheme (1)}$$

$$0.0 \leq X \leq 2.5 \quad \text{Scheme (2)}$$

wherein X represents the substitution degree of the acetyl group, while Y represents the substitution degree of the propionyl group or butyryl group.

7. The manufacturing method of a polarizing plate protective film, described in 1. above, wherein at least one ester based plasticizer selected from ester based plasticizers composed of polyhydric alcohol and monohydric carboxylic acid, ester based plasticizers composed of polyvalent carboxylic acid and monohydric alcohol, or sugar ester based plasticizers.

8. The manufacturing method of a polarizing plate protective film, described in 1. above, wherein the aforesaid touch roller has metallic outer and inner cylinders and a space for flowing fluid between them.

9. A polarizing plate protective film wherein the aforesaid polarizing plate protective film is manufactured via the manufacturing method of a polarizing plate protective film, described in any one of above 1.-8.

10. A polarizing plate wherein the polarizing plate protective film, described in 9. above, is employed on at least one surface side.

11. A liquid crystal display device wherein the polarizing plate, described in 10. above, is employed.

Effects of the Invention

According to the present invention, it is possible to provide a manufacturing method of a cellulose ester resin-containing polarizing plate protective film via a melt casting film production method which reduces long-period optical unevenness and results in evenness after storage over an extended period, a polarizing plate protective film, a polarizing plate employing the same, and a liquid crystal display device.

DESCRIPTION OF SYMBOLS

Figure 1:
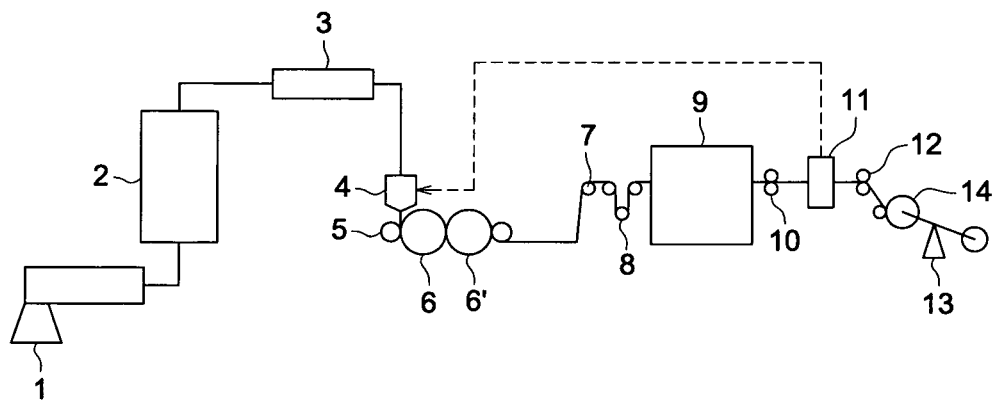
FIG. 1 a schematic view showing one example of an apparatus structure which produces the polarizing plate protective film of the present invention.
Figure 2:
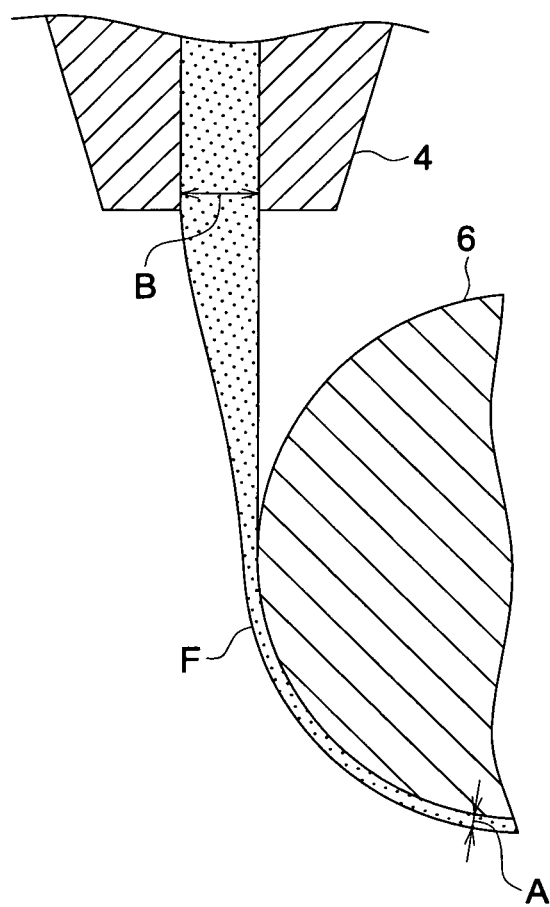
FIG. 2 is an explanatory diagram of a draw ratio (B/A) designating a ratio of a lip clearance B of a die to an average thickness A of a cast, cooled, and solidified film.

1 extruder
2 filter
3 static mixer
4 die
5 touch roller
6 first cooling roller
6' second cooling roller
7 peeling roller
8 dancer roller
9 stretcher
10 slitter
11 thickness measuring means
12 emboss ring and back roller
13 winder
14 wound film

PREFERRED EMBODIMENTS TO CARRY OUT THE INVENTION

The optimal embodiment to practice the present invention will now be detailed, however the present invention is not limited thereto.

In view of the foregoing, the inventors of the present invention conducted diligent investigation. As a result, it was discovered that it was possible to produce a polarizing plate protective film which reduced long-period optical unevenness and results in no above optical unevenness after storage over an extended period, by employing a manufacturing method of a polarizing plate protective film which incorporated cellulose ester resins formed by a melt casting film production method, which is characterized in that the the aforesaid polarizing plate protective film incorporated at least one of the compounds represented by the following Formula (I) or the compounds having an acrylate group or a methacrylate group, and a phenolic hydroxyl group in the same molecule, and the aforesaid polarizing plate protective film, extruded from a casting die at a draw ratio of 10-30, is conveyed while being pressed against a cooling roller via an elastic surfaced touch roller.

Further, the aforesaid compounds having an acrylate group or a methacrylate group, and a phenolic hydroxyl group in the same molecule are preferably those represented by above Formula (II). These compounds, represented by above Formula (I) or (II), exhibit a feature of capturing alkyl radicals formed via thermal decomposition. When the above compounds, according to the present invention, are incorporated into cellulose ester resins, the aromatic ring based structure derived from Formula (I) or (II) is bonded to the terminal or a side of the polymer chain, whereby it is assumed that a new compound is generated. In the structure of the resulting compound, it is assumed that any of the mutual interaction works between the cellulose ester resin and the aromatic ring based plasticizer or retardation controlling agent which are commonly incorporated.

Generally, when the extrusion draw ratio is high, cellulose ester resins are markedly oriented in the conveying direction. When the surface is corrected via a touch roller, it is assumed that the surface is partially oriented in the lateral direction based on irregularities prior to the correction. Accordingly, even though thickness is corrected, it is difficult to eliminate retardation unevenness, whereby liquid crystal display results in light and shadow unevenness.

It is assumed that uniform film without orientation disorder is prepared due to coexistence of (1) cellulose ester resins, (2) commonly added aromatic ring based plasticizers or retardation controlling agents, and (3) compounds combined with the aromatic ring based structure derived from the compounds (preferably the compounds represented by Formula (II)) which have, at the terminal or on a side chain of cellulose ester resins, Formula (I) or an acrylate group or a methacrylate group, and a phenolic hydroxyl group in the same molecule.

Further, coexistence of the above three results in a stronger structure. It is assumed that the above is not due to action of a common oxidation resistance (degradation resistance) function, but compounds combined with the aromatic ring based structure derived from the compounds (preferably, compounds represented by Formula (II)) which have, at the terminal or on the side chain of cellulose ester resins, Formula (I) or an acrylate group or a methacrylate group, and a phenolic hydroxyl group in the same molecule.

The present invention will now be detailed.

<<Compounds Represented by Formula (I)>>

In the present invention, one of the features is that a polarizing plate protective film incorporates the compounds represented by above Formula (I).

In Formula (I), $R_2$-$R_5$ each independently represents a hydrogen atom or a substituent, $R_6$ represents a hydrogen atom or a substituent, and "n" represents 1 or 2. When "n" is 1, $R_1$ represents a substituent, while when "n" is 2, $R_1$ represents a divalent linking group.

Further, the compounds represented by Formula (I) according to the present invention will now be described.

In Formula (I), "n" represents 1 or 2. When "n" is 1, $R_1$ represents an unsubstituted alkyl group or an alkyl group having 1-4 carbon atoms, an alkoxy group having 1-4 carbon atoms, an alkylthio group having 1-4 carbon atoms, a xylyl group, a phenyl group, a methoxyphenyl group, a hydroxyl group, a halogen atom, an amino group, an alkylamino group having 1-4 carbon atoms, a phenylamino group, a naphthyl group substituted with a phenylamino group or a di(alkyl having 1-4 carbon atoms)-amino group, a phenanthryl group, an anthoryl group, a 5,6,7,8-tetrahydro-2-naphthyl group, a 5,6,7,8-tetrahydro-1-naphthyl group, a thienyl group, a benzo[b]thienyl group, a naphtho[2,3-b]thienyl group, a thianthole-nyl group, a dibenzofuryl group, chromenyl group, a xanthe-nyl group, a phenoxanthynyl group, a pyrrolyl group, an imidazolyl group, a pyrazinyl group, a pyrimidinyl group, a pyridazinyl group, an indolydinyl group, an isoindolyl group, an indolyl group, an indazolyl group, a pulynyl group, a quinolidinyl group, an isoquinolyl group, a quinolyl group, a phthalazinyl group, a naphthylidinyl group, a quinoxalinyl group, a quinazolinyl group, a cinolyl group, a pteridinyl group, a carbazolyl group, a β-carbolinyl group, a phenan-thylidinyl group, an acrydinyl group, a perimidinyl group, a phenanthorinyl group, a phenandinyl group, an isothiazolyl group, a phenothiazinyl group, an isooxazolyl group, a fura-zanyl group, a biphenyl group, a terphenyl group, a fluorenyl group, or a phenoxazinyl group, or the group represented by the following Formula (III).

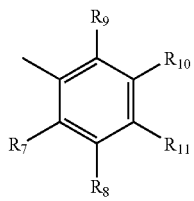

when "n" is 2, $R_1$ represents an unsubstituted alkyl group or an alkyl group having 1-4 carbon atoms, a phenylene group substituted with a hydroxyl group, or a naphthylene group; or —$R_{12}$—X—$R_{13}$— (in the group, X represents a directly bonded oxygen atom or sulfur atom, or —$NR_{31}$—); and $R_2$, $R_3$, $R_4$ and $R_5$ each independently represents a hydrogen atom, a chlorine atom, a hydroxyl group, an alkyl group having 1-25 carbon atoms, an unsubstituted phenyl group or a phenyl group substituted with an alkyl group having 1-4 carbon atoms, an unsubstituted cycloalkyl group or cycloalkyl group having 5-8 carbon atoms substituted with an alkyl group having 1-4 carbon atoms; an alkoxy group having 1-18 carbon atoms; an alkylthio group having 1-18 carbon atoms, an alkylamino group having 1-4 carbon atoms, a di(alkyl having 1-4 carbon atoms)amino group, an alkanoy-loxy group having 1-25 carbon atoms, an alkanoylamino group having 1-25 carbon atoms, an alkenoyloxy group hav-ing 3-25 carbon atoms; an alkanoyloxy group having 3-25 carbon atoms, interrupted by a an oxygen atom, a sulfur atom, or

a cycloalkylcarbonyloxy group having 3-25 carbon atoms; a cycloalkylcarbonyloxy group having 6-9 carbon atoms, a benzoyloxy group or a benzoyloxy group substituted with an alkyl group having 1-12 carbon atoms (however, when $R_2$ is a hydrogen atom or a methyl group, $R_7$ or $R_9$ in Formula (III), described below represents neither a hydroxyl group nor an alkanoyloxy group having 1-25 carbon atoms); or each of the pairs of substituents $R_2$ and $R_3$, $R_3$ and $R_4$, or $R_4$ and $R_5$ forms a benzene ring together with the carbon atom bonded by the pair; $R_4$ further represents —$(CH_2)_p$—$COR_{15}$ or —$(CH_2)_q$OH (in the formula, "p" represent 1 or 2, while "q" represents 1, 2, 3, 4, 5, and 6); or when $R_3$, $R_5$, and $R_6$ each represents a hydrogen atom, $R_4$ represents the group repre-sented by the following Formula (IV).

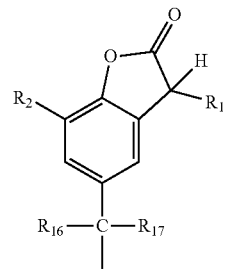

wherein $R_1$ represents the same as defined above for "n"=1, $R_6$ represents a hydrogen atom or the group represented by the following Formula (V).

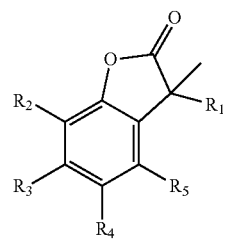

wherein $R_4$ is not the group of Formula (IV), and is defined as above for "n"=1; $R_7$, $R_8$, $R_9$, and $R_{10}$ each independently a hydrogen atom, a halogen atom, a hydroxyl group, an alkyl group; an alkyl group having 2-25 carbon atoms interrupted by an oxygen atom, a sulfur atom, or

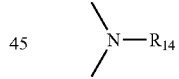

an alkoxy group having 1-25 carbon atoms; an alkoxy group having 2-25 carbon atoms, interrupted by a oxygen atom, a sulfur atom, or

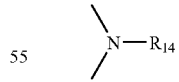

an alkylthio group having 1-25 carbon atoms, an alkenyl group having 3-25 carbon atoms, an alkenyloxy group having 3-25 carbon atoms, an alkynyl group having 3-25 carbon atoms, an alkynyloxy group having 3-25 carbon atoms, a phenylalkyl group having 7-9 carbon atoms, a phenylalkoxy group having 7-9 carbon atoms, an unsubstituted phenyl group or a phenyl group substituted with an alkyl group having 1-4 carbon atoms, an unsubstituted phenoxy group or a phenoxy group substituted with an alkyl group having 1-4 carbon atoms; an unsubstituted cycloalkyl group or a cycloalkyl group having 5-9 substituted carbon atoms substituted with alkyl group having 1-4 carbon atoms; an unsubstituted cycloalkoxy group or a cycloalkoxy group having 5-8 substituted carbon atoms substituted with an alkyl group having 1-4 carbon atoms; an alkylamino group having 1-4 carbon atoms, a di(alkyl having 1-4 carbon atoms)amino group, an alkanoyl group having 1-25 carbon atoms; an alkanoyl group having 3-25 carbon atoms, interrupted by an oxygen atom, a sulfur atom, or

an alkanoyloxy group having 1-25 carbon atoms; an alkanoyloxy group having 3-25 carbon atoms interrupted by an oxygen atom, a sulfur atom, or

an alkanoylamino group having 1-25 carbon atoms, an alkenoyl group having 3-25 carbon atoms, an alkenoyl group having 3-25 carbon atoms interrupted by an oxygen atom, a sulfur atom, or

an alkenoyloxy group having 3-25 carbon atoms, an alkenoyloxy group having 3-25 carbon atoms interrupted by an oxygen atom, a sulfur atom, or

a cycloalkylcarbonyl group having 6-9 carbon atoms, a benzoyl group or the same substituted with an alkyl group having 1-12 carbon atoms, a benzoyloxy group or the same substituted with an alkyl group having 1-12 carbon atoms; represents

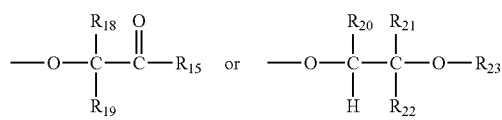

or in Formula (III), each of the pairs of substituents $R_7$ and $R_8$, or $R_8$ and $R_{11}$ forms a benzene ring together with the carbon atom bonded by the pair, $R_{11}$ represents a hydrogen atom, an alkyl group having 1-25 carbon atoms, an alkylthio group having 1-25 carbon atoms, an alkenyl group having 3-25 carbon atoms, an alkynyl group having 3-25 carbon atoms, a phenylalkyl group having 7-9 carbon atoms, an unsubstituted phenyl group or a phenyl group substituted with an alkyl group having 1-4 carbon atoms, an unsubstituted cycloalkyl group or a cycloalkyl group substituted with an alkyl group having 5-8 carbon atoms; an alkylamino group having 1-4 carbon atoms, a di(alkyl having 1-4 carbon atoms)amino group, an alkanoyl group having 1-25 carbon atoms; an alkanoyl group having 3-25 carbon atoms, interrupted by an oxygen atom, a sulfur atom, or

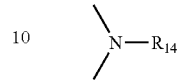

an alkanoylamino group having 1-25 carbon atoms; an alkenoyl group having 3-25 carbon atoms, interrupted by an oxygen atom, a sulfur atom, or

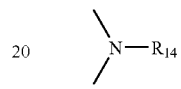

a cycloalkylcarbonyl group having 6-9 carbon atoms; a benzoyl group or the same substituted with an alkyl group having 1-12 carbon atoms; however, at least one of $R_7$, $R_8$, $R_9$, $R_{10}$, and $R_{11}$ is not a hydrogen atom; $R_{12}$ and $R_{13}$ each independently represents an unsubstituted phenylene or naphthylene group, and each of those substituted with an alkyl group having 1-4 carbon atoms; $R_{14}$ represents a hydrogen atom or an alkyl group having 1-8 carbon atoms; $R_{15}$ represents a hydroxyl group or the following group

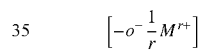

wherein M represents a metal cation and "r" represents 2 or 3, an alkoxy group having 1-18 carbon atoms, or

$R_{16}$ and $R_{17}$ each independently represents a hydrogen atom, $CF_3$, an alkyl group having 1-12 carbon atoms, or a phenyl group, or $R_{16}$ and $R_{17}$ form an unsubstituted cycloalkylidene ring or the same having 5-8 carbon atoms substituted with 1-4 alkyl groups each having 1-3 carbon atoms together with bonded carbon atoms; $R_{18}$ and $R_{19}$ each independently represents a hydrogen atom, an alkyl group having 1-4 carbon atoms, or a phenyl group; $R_{20}$ represents a hydrogen atom or an alkyl group having 1-4 carbon atoms; $R_{21}$ represents a hydrogen atom, an unsubstituted phenyl group or a phenyl group substituted with an alkyl group having 1-4 carbon atoms, an alkyl group having 1-25 carbon atoms; an alkyl group having 2-25 carbon atoms, interrupted by an oxygen atom, a sulfur atom, or

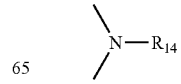

an unsubstituted phenylalkyl group or the same having 7-9 substituted carbon atoms, of which phenyl portion is substituted with 1-3 alkyl groups each having 1-4 carbon atoms, an substituted phenylalkyl group or the same, interrupted by an oxygen atom, a sulfur atom, or

having 7-25 carbon atoms of which phenyl portion is substituted with 1-3 alkyl groups each having 1-4 carbon atoms; or $R_{20}$ and $R_{21}$ form an unsubstituted cycloalkylene ring or the same having 5-12 carbon atoms substituted with 1-4 alkyl groups each having 1-4 carbon atoms together with bonded carbon atoms; $R_{22}$ represents a hydrogen atom or an alkyl group having 1-4 carbon atoms; $R_{23}$ represents a hydrogen atom, an alkanoyl group having 1-25 carbon atoms, an alkenoyl group having 3-25 carbon atoms; an alkanoyl group having 3-25 carbon atoms, interrupted by an oxygen atom, a sulfur atom, or

an alkanoyl group having 3-25 carbon atoms, substituted with a di(alkyl having 1-6 carbon atoms)-phosphonate group; a cycloalkylcarbonyl group having 6-9 carbon atoms, a thenoyl group, a furoyl group, a benzoyl group, or a an alkyl-substituted benzoyl group having 1-12 carbon atoms;

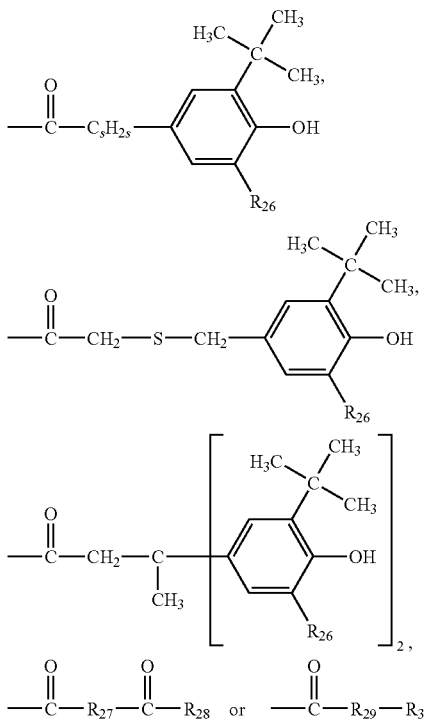

wherein s represents 1 or 2; $R_{24}$ and $R_{25}$ each independently represents a hydrogen atom or an alkyl group having 1-18 carbon atoms; $R_{26}$ represents a hydrogen atom or an alkyl group having 1-8 carbon atoms; $R_{27}$ represents a direct-bonded alkylene group having 1-18 carbon atoms; an alkylene group having 2-18 carbon atoms, interrupted by an oxygen atom, a sulfur atom, or

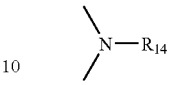

an alkylidene group having 2-20 carbon atoms, a phenylalkylidene group having 7-20, a cycloalkylene group having 5-8 carbon atoms, a bicycloalkylene group having 7-8 carbon atoms, an unsubstituted phenylene group or the same substituted with an alkyl group having 1-4 carbon atoms,

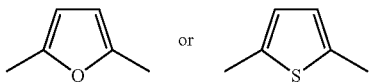

$R_{28}$ represents a hydroxyl group,

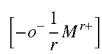

an alkoxy group having 1-18 carbon atoms, or

$R_{29}$ represents an oxygen atom, —NH—, or

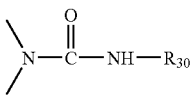

$R_{30}$ represents an alkyl group having 1-18 carbon atoms or a phenyl group; $R_{31}$ represents a hydrogen atom or an alkyl group having 1-18 carbon atoms.

When "n" is 1, $R_1$ represents an unsubstituted alkyl group having 1-4 carbon atoms, an alkoxy group having 1-4 carbon atoms, an alkylthio group having 1-4 carbon atoms, a hydroxyl group, a halogen atom, an amino group, an alkylamino group having 1-4 carbon atoms, or the same substituted with a di(alkyl having 1-4 carbon atoms)-amino group, a naphthyl group, a phenanthryl group, an anthryl group, a 5,6,7,8-tetrahydro-2-naphthyl group, a 5,6,7,8-tetrahydro-1-naphthyl group, a thienyl group, a benzo[b]thienyl group, a naphtho[2,3-b]thienyl group, a thianthrenyl group, a dibenzofuryl group, a chromenyl group, a xanthenyl group, a phenoxanthynyl group, a pyrrolyl group, an imidazolyl group, a pyrazolyl group, a pyazinyl group, a pyrimidinyl group, a pyridazinyl group, an indolydinyl group, an isoindolyl group, an indazolyl group, a purinyl group, a quinolidinyl group, an isoquinolyl group, a quinolyl group, a phthalazinyl group, a naphthylidinyl group, a quinoxalinyl group, a quinazolinyl group, a cinnolyl group, a puteridinyl group, a carbazolyl group, a β-carbolinyl group, a phenanthylidinyl group, an acrydinyl group, a perimidinyl group, a phenanthrolinyl group, a phenazinyl group, an isothiazolyl group, a phenothiazinyl group, an isoxazolyl group, a frazanyl group, a biphenyl group, a terphenyl group, a fluorenyl group, or a phenoxazinyl group, representatively, a 1-naphthayl group, a 2-naphthyl group, a 1-phenylamino-4-naphthyl group, a 1-naphthyl group, a 1-methylnaphthyl group, a 2-methynaphthyl group, a 1-methoxy-2-naphthyl group, a 2-methoxy-1-naphthyl group, a 1-dimethylamino-2-naphthyl group, a 1,2-dimethyl-4-napthyl group, a 1,2-dimethyl-6-naphthyl group, a 1,2-dimethyl-7-naphthyl group, a 1,3-dimethyl-6-naphthyl group, a 1,4-dimethyl-6-naphthyl group, a 1,5-dimethyl-2-naphthyl group, a 1,6-dimethyl-2-naphthyl group, a hydroxy-2-naphthyl group, a 2-hydroxy-1-naphthyl group, a 1,4-dihyrdoxy-2-naphthyl group, a 7-phenanthryl group, a 1-anthryl group, a 2-anthryl group, a 9-anthryl group, a 3-benzo[b]thienyl group, a 5-benzo[b]thienyl group, a 2-benzo[b]thienyl group, a 4-dibenzofuryl group, a 4,7-dibenzofuryl group, a 4-methyl-7-dibenzofuryl group, a 2-xanthenyl group, a 8-methyl-2-xanthenyl group, a 3-xanthenyl group, a 2-phenoxanthenyl group, a 2,7-phenoxanthynyl group, a 2-pyrrolyl group, a 3-pyrrolyl group, a 5-methyl-3-pyrrolyl group, a 2-imidazolyl group, a 4-imidazolyl group, a 5-imidazolyl group, a 2-mwthyl-4-imidazolyl group, a 2-ethyl-4-imidazolyl group, a 2-ethyl-5-imidazolyl group, a 3-pyrazolyl group, a 1-methyl-3-pyrazolyl group, a 1-propyl-4-pyrazolyl group, a 2-pyrazinyl group, a 5,6-dimethyl-2-pyrazinyl group, a 2-indolidinyl group, a 2-methyl-3-isoindolyl group, a 2-methyl-1-isoindolyl group, a 1-methyl-2-indolyl group, a 1-methyl-3-indolyl group, a 1,5-dimethyl-2-indolyl group, a 1-methyl-3-indazolyl group, a 2,7-dimethyl-8-purynyl group, a 2-methoxy-7-methyl-8-purynyl group, a 2-qunilidinyl group, a 3-isoquinolyl group, a 6-isoquinolyl group, a 7-isoquinolyl group, an isoquinolyl group, a 3-methoxy-6-isoquinolyl group, a 2-quinolyl group, a 6-quinolyl group, a 7-quinolyl group, a 2-methoxy-3-quinolyl group, a 2-methoxy-6-quinolyl group, a 6-phthalazinyl group, a 1-methoxy-6-phthalazinyl group, a 1,4-dimehoxy-6-phthalazinyl group, a 1,8-naphthylidini-2-yl group, a 2-quinoxarinyl group, a 6-quinoxarinyl group, a 2,3-dimethyl-6-quinoxarinyl group, a 2,3-dimethjoxy-6-quinoxarinyl group, a 2-quinazorinyl group, a 7-quinazorinyl group, a 2-dimethylamino-6-quinazorinyl group, a 3-cinnorinyl group, a 6-cinnorinyl group, a 7-cinnorinyl group, a 3-methoxy-7-cinnorinyl group, a 2-pteridinyl group, a 6-pteridinyl group, a 7-pteridinyl group, a 6,7-dimethoxy-2-pteridinyl group, a 2-carbazoyl group, a 2-carbazolyl group, a 9-methyl-2-carbazolyl group, a 9-methyl-3-carbazolyl group, a β-carbolyni-3-yl group, a 1-methyl-β-carbolyni-3-yl group, a 1-methyl-β-carbolyni-6-yl group, a 3-pheniantridinyl group, a 2-acrydinyl group, a 3-acrydinyl group, a 2-perimidinyl group, a 1-methyl-5-perimidinyl group, a 5-phenanthrolinyl group, a 6-phenanthrolinyl group, a 1-phenadinyl group, a 2-phenadinyl group, a 3-isothiazolyl group, a 4-isothiazolyl group, a 5-isothiazolyl group, a 2-phenothiazinyl group, a 3-phenothiazinyl group, a 10-methyl-phenothiazinyl group, a 3-isoxazoyl group, a 4-isoxazolyl group, a 5-isoxazolyl group, a 4-methyl-3-frazanyl group, a phenoxazinyl group, or a 10-methyl-2-phenoxazinyl group.

Of these, specifically preferred substituents include an unsubstituted alkyl group having 1-4 carbon atoms, an alkoxy group having 1-4 carbon atoms, an alkylthio group, a hydroxyl group, a naphthyl group substituted with a phenylamino group or a di(alkyl having 1-4 carbon atoms)-amino group, a phenanthryl group, an anthryl group, a 5,6,7,8-tetrahydro-2-naphthyl group, a 5,6,7,8-tetrahydro-1-naphthyl group, a thienyl group, a benzo[b]thienyl group, a naphtho[2,3-b]thienyl group, a thiantrenyl group, a dibenzofuryl group, a chromenyl group, a xanthenyl group, a phenoxanthinyl group, a pyrrolyl group, an isoindolyl group, an indolyl group, a phenothiazinyl group, a biphenyl group, a terphenyl group, a fluorenyl group, or a phenoxazinyl group. Representative groups include a 1-naphthyl group, a 2-naphthyl group, a 1-phenylamino-4-naphthyl group, a 1-methylnaphthyl group, a 2-methylnaphthyl group, a 1-methoxy-2-naphthyl group, a 2-methoxy-1-naphthyl group, a 1-dimethylamino-2-naphthyl group, a 1,2-dimethyl-4-naphthyl group, a 1,2-dimethyl-6-naphthyl group, a 1,2-dimethyl-7-naphthyl group, a 1,3-dimethyl-6-naphthyl group, a 1,4-dimethyl-6-naphthyl group, a 1,5-dimethyl-2-naphthyl group, a 1,6-dimethyl-2-naphthyl group, a 1-hydroxy-2-naphthyl group, a hydoxy-1-naphthyl group, a 1,4-dihydroxy-2 naphthyl group, a 7-phenathoryl group, a 1-anthoryl group, a 2-anthoryl group, a 9-anthoryl group, a 3-benzo[b]thienyl group, a 5-benzo[b]thienyl group, a 2-benzo[b]thienyl group, a 4-benzofuryl group, a 4,7-dibenzofuryl group, a 4-methyl-7-dibenzofuryl group, a 2-xantenyl group, a 8-methyl-2-xantenyl group, a 3-xantenyl group, a 2-phenoxantinyl group, a 2,7-phenoxantinyl group, a 2-pyrrolyl group, a 3-pyrrolyl group, a 2-phenothiazinyl group, a 3-phenorthiazinyl group, and a 10-methyl-3-phenothiazinyl group.

Preferred halogen substituents include a chlorine substituent, a bromine substituent, and a iodine substituent, but more preferred one is a chlorine substituent.

Alkanoyl groups having at most 25 carbon atoms include those which are not branched or branched. Examples thereof includes a formyl group, an acetyl group, a propionyl group, a butanoyl group, a pentanoyl group, a hexanoyl group, a heptanoyl group, an octanoyl group, a nonaloyl group, a decanoyl group, a undecanoyl group, a dodecanoyl group, a tridecanoyl group, a tetradecanoyl group, a pentadecanoyl group, a hexadecanoyl group, a heptadecanoyl group, an octadecanoyl group, an eicosanoyl group, or a docosanoyl group. Alkanoyl groups having 2-18 carbon atoms are preferred, those having 2-12 carbon atoms are more preferred, but those having 2-6 carbon atoms are most preferred. The acetyl group is particularly preferred.

Representative alkanoyl groups having 2-25 carbon atoms, substituted with a di(alkyl having 1-6 carbon atoms)phosphonate group include $(CH_3CH_2O)_2POCH_2CO-$, $(CH_3O)_2POCH_2CO-$, $(CH_3CH_2CH_2CH_2O)_2POCH_2CO-$, $(CH_3CH_2O)_2POCH_2CH_2CO-$, $(CH_3O)_2POCH_2CH_2CO-$, $(CH_3CH_2CH_2CH_2O)_2POCH_2CH_2CO-$, $(CH_3CH_2O)_2PO(CH_2)_4CO-$, $(CH_3CH_2O)_2PO(CH_2)_8CO-$, and $(CH_3CH_2O)_2PO(CH_2)_{17}CO-$.

Alkanoyloxy groups having at most 25 carbon atoms are those which are not branched or branched. Examples thereof include a formyloxy group, an acetoxy group, a propionyloxy group, a butanoyloxy group, a pentanoyloxy group, a hexanoyloxy group, a heptanoyloxy group, an octanoyloxy group, a nonanoyloxy group, a decanoyloxy group, a undecanoyloxy group, a dodecanoyloxy group, a tridecanoyloxy group, a tetradecanoyloxy group, a pentadecanoyloxy group, a hexadecanoyloxy group, a heptadecanoyloxy group, eicosanoyloxy group, and a docosanoyloxy group. Alkanoyl groups having 2-18 carbon atoms are preferred, those having 2-12 carbon atoms are more preferred, but those having 2-6 carbon atoms are most preferred. The acetoxy group is particularly preferred.

Alkenoyl groups having 3-25 carbon atoms are those which are not branched or branched. Examples thereof include a propenoyl group, a 2-butanoyl group, a 3-butenoyl group, an isobutenoyl group, an n-2,4-pentadienoyl group, a 3-methyl-2-butenoyl group, an n-2-octenoyl group, an n-2-dodecynoyl group, an iso-dodecanoyl group, an oleoyl group, an n-2-octadecanoyl group, and an n-4-octadecanoyl group. Alkenoyl groups having 3-18 carbon atoms are preferred, those having 3-12 carbon atoms are more preferred, but those having 3-6 carbon atoms are most preferred. The alkenoyl group having 3-4 carbon atoms is preferred.

A representative alkenoyl group having 3-25 carbon atoms, interrupted by an oxygen atom, a sulfur atom, or

is CH$_3$OCH$_2$CH$_2$CH=CHCO— or CH$_3$OCH$_2$CH$_2$OCH=CHCO—.

Alkenoyloxy groups having 3-25 carbon atoms are those which are not branched or branched. Examples thereof include a propenoyloxy group, a 2-butanoyloxy group, a 3-butenoyloxy group, an isobutenoyloxy group, an n-2,4-pentadienoyloxy group, a 3-methyl-2-butenoyloxy group, an n-2-octenoyloxy group, an n-2-dedecenolyloxy group, an iso-dodecenoyloxy group, an oleyloxy group, an n-2-octadecenoyloxy group, and an n-4-octadecenoyloxy group. Alkenoyloxy groups having 3-18 carbon atoms are preferred, those having 3-12 carbon atoms are more preferred, but those having 3-6 carbon atoms are most preferred. And still more preferred is alkenoyloxy groups having 3-4 carbon atoms A representative alkenoyloxy group having 3-25 carbon atoms, interrupted by an oxygen atom, a sulfur atom, or

is CH$_3$OCH$_2$CH$_2$CH=CHCOO— or CH$_3$OCH$_2$CH$_2$OCH=CHCOO—.

A representative alkanoyloxy group having 3-25 carbon atoms, interrupted by an oxygen atom, a sulfur atom, or

is CH$_3$—O—CH$_2$CO—, CH$_3$—S—CH$_2$CO—, CH$_3$—NH—CH$_2$CO—, CH$_3$—N(CH$_3$)—CH$_2$CO—, CH$_3$—O—CH$_2$CH$_2$—OCH$_2$CO—, CH$_3$—(OCH$_2$CH$_2$)$_2$O—CH$_2$CO—, CH$_3$—(O—CH$_2$CH$_2$—)$_3$O—CH$_2$CO—, or CH$_3$—(OCH$_2$CH$_2$)$_4$O—CH$_2$CO—.

A representative alkanoyloxy group having 3-25 carbon atoms, interrupted by an oxygen atom, a sulfur atom, or

is CH$_3$—O—CH$_2$COO—, CH$_3$—S—CH$_2$COO—, CH$_3$—NH—CH$_2$COO—, CH$_3$—N(CH$_3$)CH$_2$COO—, CH$_3$—O—CH$_2$CH$_2$—OCH$_2$COO—, CH$_3$—(OCH$_2$CH$_2$)$_2$O—CH$_2$COO—, CH$_3$—(O—CH$_2$CH$_2$—)O—CH$_2$COO—, or CH$_3$—(O—CH$_2$CH$_2$—)$_4$O—CH$_2$COO—.

Examples of the cycloalkylcarbonyl group having 6-9 carbon atoms include a cyclopentylcarbonyl group, a cyclohexylcarbonyl group, a cycloheptylcarbonyl group, and a cyclooctylcarbonyl group. Of these, preferred is the cyclohexylcarbonyl group.

Examples of the cycloalkylcarbonyloxy group having 6-9 carbon atoms include a cyclopentylcarbonyloxy group, a cyclohexylcarbonyloxy group, a cycloheptylcarbonyloxy group, and a cyclooctylcarbonyloxy group. Of these, preferred is the cyclohexylcarbonyloxy group.

Alkyl-substituted benzoyl groups having 1-12 carbon atoms, which have preferably 1-3 alkyl groups, but have most preferably 1 or 2 alkyl groups, include an o-, m-, or p-methylbenzoyl group, a 2,3-dimethylbenzoyl group, a 2,4-dimethylbenzoyl group, a 2,5-dimethylbenzoyl group, a 2,6-dimethylbenzoyl group, a 3,4-dimethylbenzoyl group, a 3,5-dimethylbenzoyl group, a 2-methyl-6-ethylbenzoyl group, a 4-tertiary-butyl-benzoyl group, a 2-ethylbenzoyl group, a 2,4,6-trimethylbenzoyl group, a 2,6-dimethyl-4-tertiarybutylbenzoyl group, and a 3,5-ditertiarybutyl-benzoyloxy group. The substituent is preferably an alkyl group having 1-8 carbon atoms, but is more preferably the same having 1-4 carbon atoms.

Alkyl-substituted benzoyloxy groups having 1-12 carbon atoms, which have preferably 1-3 alkyl groups, but have most preferably 1 or 2 alkyl groups, include an o-, m-, or p-methylbenzoyloxy group, a 2,3-dimethylbenzoyloxy group, a 2,4-dimethylbenzoyloxy group, a 2,5-dimethylbenzoyloxy group, a 2,6-dimethylbenzoyloxy group, a 3,4-dimethylbenzoyloxy group, a 3,5-dimethylbenzoyloxy group, a 2-methyl-6-ethylbenzoyloxy group, a 4-tertiary-butyl-benzoyloxy group, a 2-ethylbenzoyloxy group, a 2,4,6-trimethylbenzoyloxy group, a 2,6-dimethyl-4-tertiary-butylbenzoyloxy group, and a 3,5-ditertiary-butylbenzoyloxy group. The substituent is preferably an alkyl group having 1-8 carbon atoms, but is more preferably the same having 1-4 carbon atoms.

Alkyl groups having at most 25 carbon atoms are those which are not branched or branched. Examples thereof include a methyl group, an ethyl group, an isopropyl group, an n-butyl group, a secondary butyl group, an isobutyl group, a tertiary butyl group, a 2-ethlbutyl group, an n-pentyl group, an isopentyl group, a 1-methylpentyl group, a 1,3-dimethylbutyl group, a n-hexyl group, a 1-methylhexyl group, a n-heptyl group, an isoheptyl group, a 1,1,3,3-tetramethylbutyl group, a 1-methylheptyl group, a 3-methylheptyl group, a n-octyl group, a 2-ethylhexyl group, a 1,1,3-trimethylhexyl group, a 1,1,3,3-tetramethylpentyl group, a nonyl group, a decyl group, a undecyl group, a 1-methylundecyl group, a dodecyl group, a 1,1,3,3,5,5-hexamethylhexyl group, a tridecyl group, a tetradecyl group, a pentadecyl group, a hexadecyl group, a heptadecyl group, an octadecyl group, an eicosil group, and a docosil group.

Examples of preferred $R_2$ and $R_4$ include alkyl groups having 1-18 carbon atoms. Specifically preferred $R_4$ includes an alkyl group having 1-4 carbon atoms.

Alkenyl groups having 3-25 carbon atoms are those which are not branched or branched. Examples thereof include a propenyl group, a 2-butenyl group, a 3-butenyl group, an isobutenyl group, a n-2,4-pentadienyl group, a methyl-2-butenyl group, a n-2-octenyl group, a n-2-dodecenyl group, an isododecenyl group, an oleyl group, a n-2-octadecanical group, and a n-4-octadecanical group. The number of carbon atoms of the alkenyl group is commonly 3-18, is preferably 3-12, is more preferably 3-6, is further more preferably 3-6, but is most preferably 3 or 4.

Alkenyloxy groups having 3-25 carbon atoms are those which are not branched or branched. Examples thereof include a propenyloxy group, a 2-butenyloxy group, a 3-butenyloxy group, an isobutenyloxy group, a n-2,4-pentadienyloxy group, a 3-methyl-2-butenyloxy group, a n-2-octenyloxy group, a n-2-dodecenyloxy group, an isododecenyloxy group, an isododecenyl group, an oleyloxy group, a n-2-octadecanicaloxy group, and a n-4-octadecanicaloxy group. The number of carbon atoms of the alkenyl group is commonly 3-18, is preferably 3-12, is more preferably 3-6, but is most preferably 3 or 4.

Alkynyl groups having 3-25 carbon atoms are those which are not branched or branched. Examples thereof include a propynyl group (—CH$_2$—C≡CH), a 2-butynyl group, a 3-buttnyl group, a n-2-octynyl group, a n-2-dodecynyl group. The number of carbon atoms of the alkynyl group is commonly 3-18, is preferably 3-12, is more preferably 3-6, but is most preferably 3 or 4.

Alkynyloxy groups having 3-25 carbon atoms are those which are not branched or branched. Examples thereof include a propynyloxy group (—OCH$_2$—C≡CH), a 2-butynyloxy group, a 3-buttnyloxy group, a n-2-octynyloxy group, a n-2-dodecynyloxy group. The number of carbon atoms of the alkynyloxy group is commonly 3-18, is preferably 3-12, is more preferably 3-6, but is most preferably 3 or 4.

A representative alkyl group having 2-25 carbon atoms, interrupted by an oxygen atom, a sulfur atom, or

is CH$_3$—O—CH$_2$—, CH$_3$—S—CH$_2$—, CH$_3$—NH—CH$_2$—, CH$_3$—N(CH$_3$)—CH$_2$—, CH$_3$—OCH$_2$CH$_2$—O—CH$_2$—, CH$_3$(O—CH$_2$CH$_2$)$_2$O—CH$_2$—, CH$_3$—(OCH$_2$CH$_2$—)$_3$O—CH$_2$—, or CH$_3$—(OCH$_2$CH$_2$—)OCH$_2$—.

Representative phenylalkyl groups having 7-9 carbon atoms include a benzyl group, an α-methylbenzyl group, an α,α-dimethylbenzyl group, and a 2-phenylethyl group. Of these preferred are the benzyl group and the α,α-dimethylbenzyl group.

Representative unsubstituted alkylphenyl groups and alkylphenyl groups substituted with 1-3 alkyl group having 1-4 carbon atoms at the phenyl portion include a benzyl group, an α-methylbenzyl group, an α,α-dimethylbenzyl group, a 2-phenylethyl group, a 2-methylbenzyl group, a 3-methylbenzyl group, a 4-methylbenzyl group, a 2,4-dimethylbenzyl group, a 2,6-dimethylbenzyl group, and a 4-tertiary-butylbenzyl group. Of these, preferred is the benzyl group.

Examples of unsubstituted phenylalkyl groups or phenylalkyl groups having 7-9 carbon atoms, substituted with 1-3 alkyl groups having 1-4 carbon atoms at the phenyl portion, interrupted by an oxygen atom, a sulfur atom, or

include those, which are not branched or branched, such as a phenoxymethyl group, a 2-methylphenoxymethyl group, a 3-methylphenoxymethyl group, a 4-methylphenoxymethyl group, a 2,4-methylphenoxymethyl group, a 2,3-methylphenoxymethyl group, a phenylthiomethyl group, an N-methyl-N-phenyl-methyl group, an N-ethyl-N-phenylmethyl group, a 4-teritiary-butylphenoxymethyl group, a 4-tertiary-butylphenoxyethoxymethyl group, a 2,4-di-tertiary-butylphenoxymethyl, a 2,4-di-tertiary-butylphenoxyethoxymethyl group, a phenoxyethoxyetoxyethoxymethyl group, a benzyloxymethyl group, a benzyloxyethoxymethyl group, an N-benzyl-N-ethylmethyl group, or an N-benzyl-N-isopropylmethyl group.

Representative phenylalkoxy groups having 7-9 carbon atoms include a benzoyloxy group, an α-methylbenzyloxy group, an α,α-dimethylbenzyloxy group, and a 2-phenylethoxy group. Of these preferred is the benzoyloxy group.

Examples of the phenyl group substituted with preferably 1-3, particularly 1 or 2 alkyl groups, each having 1-4 carbon atoms are an o-, m-, or p-methylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 2-methyl-6-ethylphenyl group, a 4-tertiary-phenyl group, an ethylphenyl group, and a 2,6-diethylphenyl group.

Examples of the phenoxy group substituted with preferably 1-3, particularly 1 or 2 alkyl groups, each having 1-4 carbon atoms are an o-, m-, or p-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-methyl-6-ethylphenoxy group, a 4-tertiary-phenoxy group, a 2-ethylphenoxy group, and a 2,6-diethylphenoxy group.

Examples of unsubstituted cycloalkyl groups and cycloalkyl groups having 5-8 carbon atoms substituted with an alkyl group having 1-4 carbon atoms include a cyclopentyl group, a methylcyclopentyl group, a dimethylcyclopentyl group, a cyclohexyl group, a methylcyclohexyl group, a dimethylcyclohexyl group, a trimethylcyclohexyl group, a tertiary butylcyclohexyl group, a cyclopentyl group, a cyclooctyl group. Of these preferred are the cyclohexyl group and the tertiary butylcyclohexyl group.

Examples of unsubstituted cycloalkoxy groups or cycloalkyl groups having 5-8 carbon atoms substituted with an alkyl group having 1-4 carbon atoms include a cyclopentoxy group, a methylcyclopentoxy group, a dimethylcyclopentoxy group, a cyclohexoxy group, a methylcyclohexoxy group, a dimethylcyclohexoxy group, a trimethylcyclohexoxy group, a tertiary butylcyclohexoxy group, a cycloputoxy group, a cyclooctoxy group. Of these, preferred are the cyclohexoxy group and the tertiary butylcyclohexoxy group.

Alkoxy groups having at most 25 carbon atoms are those which are not branched or branched. Examples thereof include a methoxy group, an ethoxy group, a propoxy group, an isoproxy group, a n-butoxy group, an isobutoxy group, a pentoxy group, an isopentoxy group, a hexoxy group, a heptoxy group, an octoxy group, a decyloxy group, a tertadecyloxy group, a hexadecyloxy group, and an octadecyloxy group. The number of carbon atoms of the alkoxy group is commonly 1-12, is preferably 1-8, but is most preferably 1-6.

Representatives of alkoxy groups having 2-25 carbon atoms, interrupted by an oxygen atom, a sulfur atom, or

include CH$_3$—O—CH$_2$CH$_2$O—, CH$_3$—S—CH$_2$CH$_2$O—, CH$_3$—NH—CH$_2$CH$_2$O—, —CH$_3$—N(CH$_3$)—CH$_2$CH$_2$O—, CH$_3$—O—CH$_2$CH$_2$—OCH$_2$CH$_2$O—, CH$_3$(O—CH$_2$CH$_2$)$_2$O—CH$_2$CH$_2$O—, CH$_3$(OCH$_2$CH$_2$—)$_3$O—CH$_2$CH$_2$O—, and CH$_3$—(OCH$_2$CH$_2$—)$_4$O—CH$_2$CH$_2$O—.

Alkylthio groups having at most 25 carbon atoms are those which are not branched or branched. Examples thereof include a methylthio group, an ethylthio group, a propylthio group, an isopropylthio group, a n-butylthio group, an isobutylthio group, a pentylthio group, an isopentylthio group, a hexylthio group, a heptylthio group, an octylthio group, a decylthio group, a tetradecylthio group, a hexadecylthio group, and an octadecylthio group. The number of carbon atoms of the alkylthio group is commonly 1-12, is preferably 1-8, but is most preferably 1-6.

Alkylamino groups having at most 4 carbon atoms are those which are not branched or branched. Examples thereof include a methylamino group, an ethylamino group, a propylamino group, an isopropylamino group, a n-butylamino group, an isobutylamino group, and a tertiary butylamino group.

Di(alkylamino having 1-4 carbon atoms) groups also include two portions, in which a portion is independent from the other are branched or not branched. Representatives thereof include a dimethyl amino group, a methylethylamino group, a diethyl amino group, a methyl-n-propylamino group, a ethylisopropylamino group, a methyl-n-butylamino group, a methylisobutylamino group, an ethylisopropylamino group, an ethyl-n-butylamino group, an ethylisobutyrylamino group, an ethyl-tertrabutylamino group, a diethylamino group, a diisoproylamino group, an isopropyl-n-butylamino group, an isopropylisobutylamino group, an di-n-butylamino group, or a diisobutylamino group.

Alkanoylamino groups having at most 25 carbon atoms are those which are not branched or branched. Examples thereof include a formylamino group, an acetylamino group, a propionylamino group, an acetylamino group, a propionylamino group, a butanoylamino group, a pentanoylamino group, a hexanoylamino group, a heptanoylamino group, an octnoylamino group, a nonanoylamino group, a decanoylamino group, an undecanoylamino group, a tridecanoylamino group, a tetradecanoylamino group, a pentadecanoylamino group, a hexadecanoylamino group, a heptadecanoylamino group, an octadecanoylamino group, eicosanoylamino group, or a docosanoylamino group. The number of carbon atoms of the alkanoylamino group is commonly 2-18, is preferably 2-12, but is most preferably 2-6.

Alkylene groups having 1-18 carbon atoms are those which are not branched or branched. Examples thereof include a methylene group, a trimethylene group, a tetramethylene group, a pentamethylene group, a hexamethylene group, a heptamethylene group, an octamethylene group, a decamethylene group, a decamethylene group, and an octadecamethylene group. The number of carbon atoms of the alkylene group is preferably 1-12, but is most preferably 1-8.

Examples of cycloalkylene rings of 5-12 carbon atoms having a substituent of 1-4 carbon atoms of 1-3, but preferably 1-2 branched or non-branched alkyl group include a cyclopentylene, methylcyclopentylene, dimethylcyclpentylene, cyclohexylene, methylcyclohexylane, dimethylcyclohexylane, trimethylcyclohexylane, tertiary butylcyclohexylane, cyclobutylane, cycloctylane, or cyclodecylane ring. Of these, preferred are cyclohexylane and secondary butylocyclohexylane rings.

Examples of alkylene groups having 2-18 carbon atoms, interrupted by an oxygen atom, a sulfur atom, or

include —CH$_2$—OCH$_2$—, —CH$_2$—S—CH$_2$—, —CH$_2$—NH—CH$_2$—, —CH$_2$—N(CH$_3$)—CH$_2$—, —CH$_2$—O—CH$_2$CH$_2$—O—CH$_2$—, —CH$_2$—(OCH$_2$CH$_2$—)$_2$O—CH$_2$—, —CH$_2$—(—O—CH$_2$CH$_2$)$_3$O—CH$_2$—, —CH$_2$—(O—CH$_2$CH$_2$)$_4$O—CH$_2$—, and —CH$_2$CH$_2$—S—CH$_2$CH$_2$—.

As representative alkenylene groups having 1-18 carbon atoms, preferred are a vinylene group, a methylvinylene group, an octenylethylene group, and a dodecenylethylene group. Alkenylene groups having 2-8 atoms are preferred.

As representative alkylidene groups having 2-20 carbon atoms preferred are an ethylidene group, a propylidene group, a butylidene group, a pentylidene group, a 4-methylpentylidene group, a heptylidene group, a nonylidene group, a tridecylidene group, a nonadecylidene group, a 1-methylethylidene group, a 1-ethylpropylidene group, and a 1-ethylpentylidene group. Alkylidene groups having 2-8 atoms are preferred.

Preferred examples of phenylalkylidene groups having 7-20 carbon atoms include a benzylidene group, a 2-phenylethylidene group, and a 1-phenyl group-2-hexylidene group. Phenylalkylidene groups having 7-9 carbon atoms are preferable.

A cycloalkylene groups having 5-8 carbon atoms is a saturated hydrocarbon group which has 2 free electron valence and at least one ring unit. Examples thereof include a cyclopentylene group, a cyclohexylene group, a cycloheptylene group, and a cyclooctylene group. Of these, the cyclohexylene group is preferred.

Bicyloalkylene groups having 7 or 8 carbon atoms include a bicyloalkylene group, a bicycloheptylene group, and a bicyclooctylene group.

Examples of unsubstituted naphthylene groups or naphthylene groups substituted with an alkyl group having 1-4 carbon atoms are preferably a 1,2-, 1,3- or 1,4-phenylene group and a 1,2-, 1,3, 1,4-, 1,6-, 1,7-, 2,6-, or 2,7-naphthylene group.

Examples of cycloalkylidene rings having 5-8 substituted carbon atoms with an alkyl groups, having 1-4 carbon atoms which is branched or not branched include cyclopentylidene, methylcyclopentylidene, dimethylcyclopentylidene, cyclohexylidene, methycyclohexylidene, dimethylcyclohexylidene, trimethylcyclohexylindene, tertiary-butylcyclohexylindene, cycloheptylidene and cyclooctylidene. Of these, the cyclohexylidene and the tertiary-butylcyclohexylindene are preferred.

A univalent, divalent, or trivalent metal cation is preferably an alkaline cation, an alkaline earth metal cation, or an aluminum ion, and examples thereof includes Na$^+$, K$^+$, Mg$^{2+}$, Ca$^{2+}$, or Al$^{3+}$.

In the present invention, the preferred compounds include: when "n" is 1, an unsubstituted alkylphenyl group and an alkylphenyl group substituted at the para position with an alkylthio group having 1-18 carbon atoms, or a di(alkyl having 1-4 carbon atoms)-amino group; an alkylphenyl group simultaneously having at most 18 carbon atoms being subjected to 1-5 substitutions in 1-5 alkyl substituents; an unsubstituted alkyl group and an alkyl group substituted with an alkyl group having 1-4 carbon atoms, an alkoxy group having 1-4 carbon atoms, an alkylthio group having 1-4 carbon atoms, and a naphthyl group, a biphenyl group, a terphenyl group, a phenanthryl group, an anthryl group, a fluorenyl group, a carbazolyl group, a thienyl group, a pyrrolyl group, or a phenothiazinyl group, each substituted with a hydroxyl group or an amino group, and a 5,6,7,8-tetrahydronaphthyl group.

The more preferred compounds represented by Formula (I), when "n" is 2, are those in which R$_1$ represents —R$_{12}$—

X—R$_{13}$—; R$_{12}$ and R$_{13}$ each represents a phenylene group; X represents —NR$_{31}$—; and R$_{31}$ represents an alkyl group having 1-4 carbon atoms.

The specifically preferred compounds represented by Formula (I), when "n" is 1, are those in which R$_1$ represents an unsubstituted alkyl group and an alkyl group having 1-4 carbon atoms, an alkoxy group having 1-4 carbon atoms, an alkylthio group having 1-4 carbon atoms, a hydroxyl group, a halogen atom, an amino group, an alkylamino group having 1-4 carbon atoms, a naphthyl group substituted with a di(alkyl having 1-4 carbon atoms)-amino group, a phenanthryl group, a thienyl group, a dibenzofuryl group, a carbazolyl group, and a fluorenyl group, or the group represented by Formula (III).

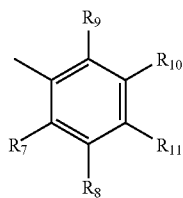
(III)

wherein R$_7$, R$_8$, R$_9$, and R$_{10}$ each independently represents a hydrogen atom, a chlorine atom, a bromine atom, a hydroxyl group, an alkyl group having 1-18 carbon atoms; an alkyl group interrupted by an oxygen atom or a sulfur atom; an alkoxy group having 1-18 carbon atoms; an alkoxy group having 2-18 carbon atoms, interrupted by an oxygen atom or a sulfur atom; an alkylthio group having 1-18 carbon atoms, an alkenyloxy group having 3-12 carbon atoms, an alkynyloxy group having 3-12 carbon atoms, a phenylalkyl group having 7-9 carbon atoms, a phenylalkoxy group having 7-9 carbon atoms, an unsubstituted or phenyl group or a phenyl group substituted with an alkyl group having 1-4 carbon atoms, a phenoxy group, a cyclohexyl group, a cycloalkoxy group having 5-8 carbon atoms; an alkylamino group having 1-4 carbon atoms, a di(alkyl having 1-4 carbon atoms)amino group, an alkanoyl group having 1-12 carbon atoms; an alkanoyl group having 3-12 carbon atoms, interrupted by an oxygen atom or a sulfur atom; an alkanoyloxy group having 3-12 carbon atoms; an alkanoyloxy group having 3-12 carbon atoms, interrupted by an oxygen atom or a sulfur atom; an alkanoylamino group having 1-12 carbon atoms, an alkenoyl group having 3-12 carbon atoms, an alkenoyloxy group having 3-12 carbon atoms, a cyclohexylcarbonyl group, a cyclohexylcarbonyloxy group, a benzoyl group, or an benzoyl group substituted with an alkyl group having 1-4 carbon atoms, a benzoyloxy group, or a benzoyloxy group substituted with an alkyl group having 1-4 carbon atoms;

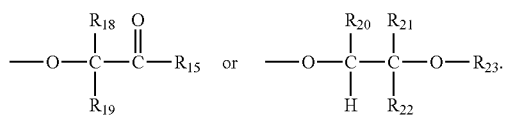

Further, in Formula (III), each pair of substituent R$_7$ and R$_8$ or R$_8$ and R$_{11}$ forms a benzene ring together with the bonded carbon atoms. R$_{11}$ represents a hydrogen atom, an alkyl group having 1-18 carbon atoms, an alkylthio group having 1-18 carbon atoms, a phenylalkyl group having 7-9 carbon atoms, an unsubstituted phenyl group or a phenyl group substituted with an alkyl group having 1-4 carbon atoms, a cyclohexyl group, an alkylamino group having 1-4 carbon atoms, a di(alkyl having 1-4 carbon atoms)amino group, an alkanoyl group having 1-12 carbon atoms; an alkanoyl group having 3-12 carbon atoms, interrupted by an oxygen atom or a sulfur atom, an alkanoylamino group having 2-12 carbon atoms, an alkenoyl group having 3-12 carbon atoms, a cyclohexylcarbonyl group, a benzoyl group, or an benzoyl group substituted with an alkyl group having 1-4 carbon atoms; however, at least one of R$_7$, R$_8$, R$_9$, R$_{10}$ or R$_{11}$ is not a hydrogen atom; R$_{15}$ represents a hydroxyl group, an alkoxy group having 1-12 carbon atoms, or

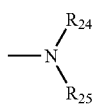

R$_{18}$ and R$_{19}$ each independently represents a hydrogen atom or an alkyl group having 1-4 carbon atoms; R$_{20}$ represents a hydrogen atom; R$_{21}$ represents a hydrogen atom, a phenyl group, an alkyl group having 1-18 carbon atoms, an alkyl group having 2-18 carbon atoms interrupted by an oxygen atom or a sulfur atom, a phenylalkyl group having 7-9 carbon atoms, an phenylalkyl group having 7-18 carbon atoms substituted with 1-3 alkyl groups of 1-4 carbon atoms which is interrupted by an oxygen atom or a sulfur atom; or R$_{20}$ and R$_{21}$ bind together with the bonded carbon atoms an unsubstituted cyclohexylene ring or a cyclohexylene ring substituted with 1-3 alkyl groups having 1-4 carbon atoms; R$_{22}$ represents a hydrogen atom or an alkyl group having 1-4 carbon atoms; R$_{23}$ represents a hydrogen atom, an alkanoyl group having 3-12 carbon atoms; an alkanoyl group having 3-12 carbon atoms, interrupted by an oxygen atom or a sulfur atom; an alkanoyl group having 2-12 carbon atoms, substituted with a di(alkyl having 1-6 carbon atoms)-phosphonate group; a cycloalkylcarbonyl group having 6-9 carbon atoms, a benzoyl group;

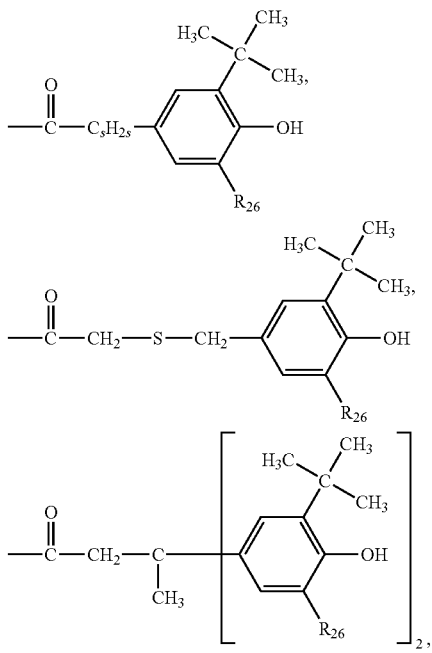

-continued

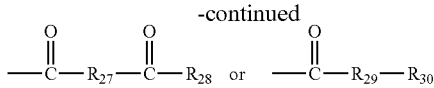

wherein "s" represents 1 or 2, and $R_{24}$ and $R_{25}$ each independently represents a hydrogen atom, or an alkyl group having 1-12 carbon atoms, $R_{26}$ represents a hydrogen atom or an alkyl group having 1-4 carbon atoms, $R_{27}$ represents an alkylene group having 1-12 carbon atoms, an alkenylene group having 2-8 carbon atoms, an alkylidene group having 2-8 carbon atoms, a phenylalkylidene group having 7-12 carbon atoms, a cycloalkylene group having 5-8 carbon atoms, $R_{28}$ represents a hydroxyl group, an alkoxy group having 1-12 carbon atoms, or

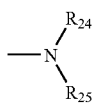

$R_{29}$ represents an oxygen atom or —NH—, $R_{30}$ represents an alkyl group having 1-18 carbon atoms or a phenyl group.

Further, in preferred compounds, when "n" is 1, $R_1$ represents a phenanthryl group, a thienyl group, a dibenzofuryl group; an unsubstituted carbazolyl group and a carbazolyl group substituted with an alkyl group having 1-4 carbon atoms, or the group represented by Formula (III).

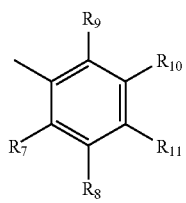
(III)

$R_7$, $R_8$, $R_9$, and $R_{10}$ each independently represents a hydrogen atom, a chlorine atom, a hydroxyl group, an alkyl group having 1-18 carbon atoms, an alkoxy group having 1-18 carbon atoms, an alkylthio group having 1-18 carbon atoms, an alkenyloxy group having 3 or 4 carbon atoms, an alkynyloxy group having 3 or 4 carbon atoms, a phenol group, a benzoyl group, a benzoyloxy group, or

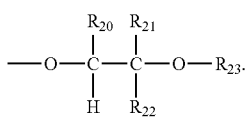

$R_{11}$ represents a hydrogen atom, an alkyl group having 1-18 carbon atoms, an alkylthio group having 1-8 carbon atoms, a phenyl group, or a cyclohexyl group. However, at least one of $R_7$, $R_8$, $R_9$, $R_{10}$, or $R_{11}$ is not a hydrogen atom, $R_{20}$ represents a hydrogen atom, $R_{21}$ represents a hydrogen atom, a phenyl group, an alkyl group having 1-18 carbon atoms, or $R_{20}$ and $R_{21}$ combine to form an unsubstituted cyclohexylene ring or a cyclohexylene ring substituted with 1-3 alkyl groups substituted with an alkyl group having 1-4 carbon atoms, $R_{22}$ represents an alkyl group having 1-4 carbon atoms, $R_{23}$ represents a hydrogen atom, an alkanoyl group having 1-12 carbon atoms, or a benzoyl group.

$R_7$, $R_8$, $R_9$, and $R_{10}$ each independently represents a hydrogen atom or an alkyl group having 1-4 carbon atoms, $R_{11}$ represents a hydrogen atom, an alkyl group having 1-12 carbon atoms, an alkylthio group having 1-4 carbon atoms, or a phenyl group. However, specifically preferred are the compounds represented by Formula (I) in which at least one of $R_7$, $R_8$, $R_9$, $R_{10}$, or $R_{11}$ is not hydrogen atom.

Further; in the specifically preferred compounds represented by Formula (I), $R_2$, $R_3$, $R_4$, and $R_5$ each independently represents a hydrogen atom, a chlorine atom, a hydroxyl group, an alkyl group having 1-18 carbon atoms, a benzyl group, a phenyl group, a cycloalkyl group having 5-8 carbon atoms, an alkoxy group having 1-18 carbon atoms, an alkylthio group having 1-18 carbon atoms, an alkanoyloxy group having 1-18 carbon atoms, an alkanoylamino group having 1-18 carbon atoms, an alkenoyloxy group having 1-18 carbon atoms, or a benzoyloxy group (however, when $R_2$ is a hydrogen atom or a methyl group, $R_7$ and $R_9$ each represents neither a hydroxyl group nor an alkanoyloxy group having 1-25 carbon atoms), or substituents $R_2$ and $R_3$, $R_3$ and $R_4$, or $R_4$ and $R_5$ form a benzene ring together with the bonded carbon atoms, further, $R_4$ represents —(CH$_2$)p-COR$_{15}$ or —(CH$_2$)$_q$OH (wherein "p" represents 1 or 2; "q" represents 2,3,4,5, or 6), or when $R_3$, $R_5$, and $R_6$ each represents a hydrogen atom, $R_4$ further represents the group represented by Formula)IV), $R_{15}$ represents a hydroxyl group, an alkoxy group having 1-12 carbon atoms or

$R_{16}$ and $R_{17}$ each represents a methyl group, or forms an unsubstituted or cycloalkylidene ring having 5-8 carbon atoms, substituted with 1-3 alkyl groups having 1-4 carbon atoms together with the bonded carbon atoms, $R_{24}$ and $R_{25}$ each independently represents a hydrogen atom or an alkyl group having 1-12 carbon atoms.

The preferred compounds represented by Formula (I) include those in which at least two of $R_2$, $R_3$, $R_4$, and $R_5$ represent a hydrogen atom.

Further, the more preferred compounds represented by Formula (I) include those in which both of $R_3$ and $R_5$ represent a hydrogen atom.

Still further, the most preferred compounds represented by Formula (I) include those in which $R_2$ represents an alkyl group having 1-4 carbon atoms, $R_3$ represents a hydrogen atom, $R_4$ represents an alkyl group having 1-4 carbon atoms, and when $R_6$ represents a hydrogen atom, $R_4$ further represents the group represented by Formula (IV), $R_5$ represents a hydrogen atom, and $R_{16}$ and $R_{17}$ form a cyclohexylidene ring together with the bonded carbon atoms.

It is possible to produce the compounds according to the present invention, represented by Formula (I) via the method known in the art.

Specific examples of the compounds represented by Formula (I) will now be shown, however the present invention is not limited thereto.

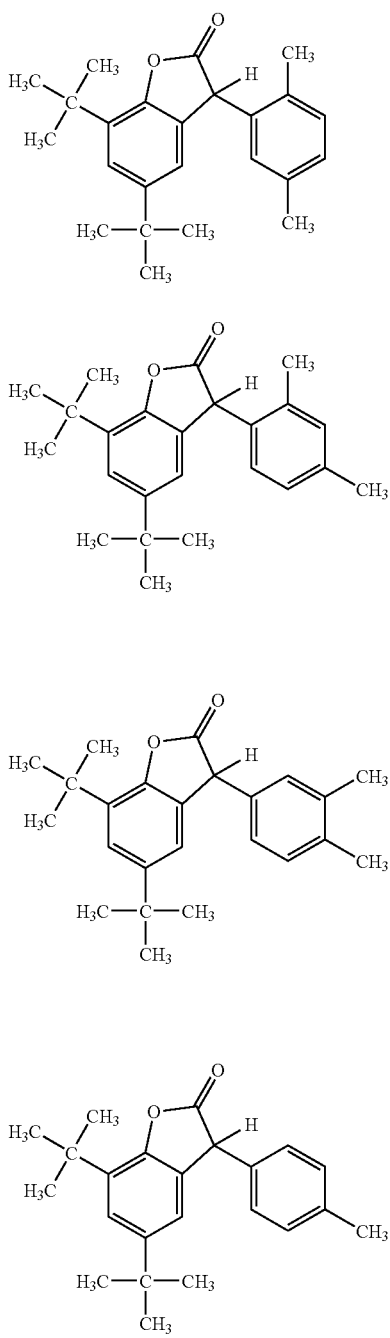
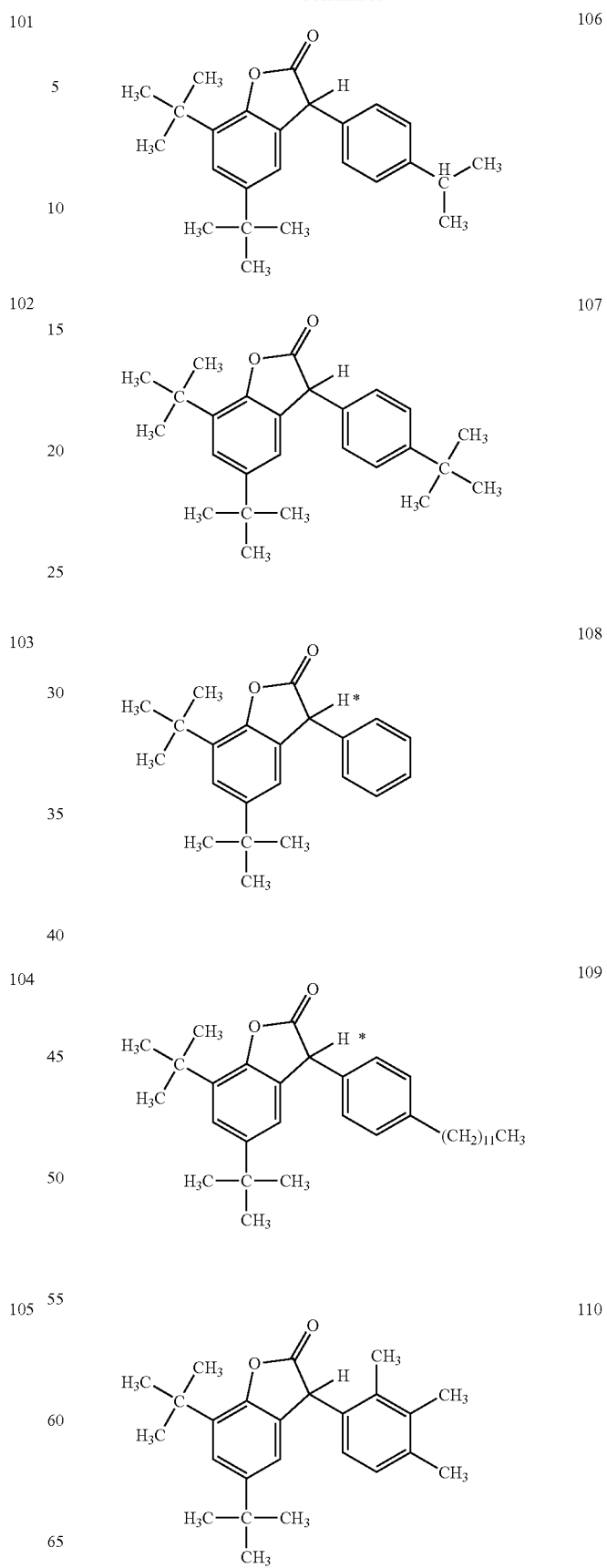

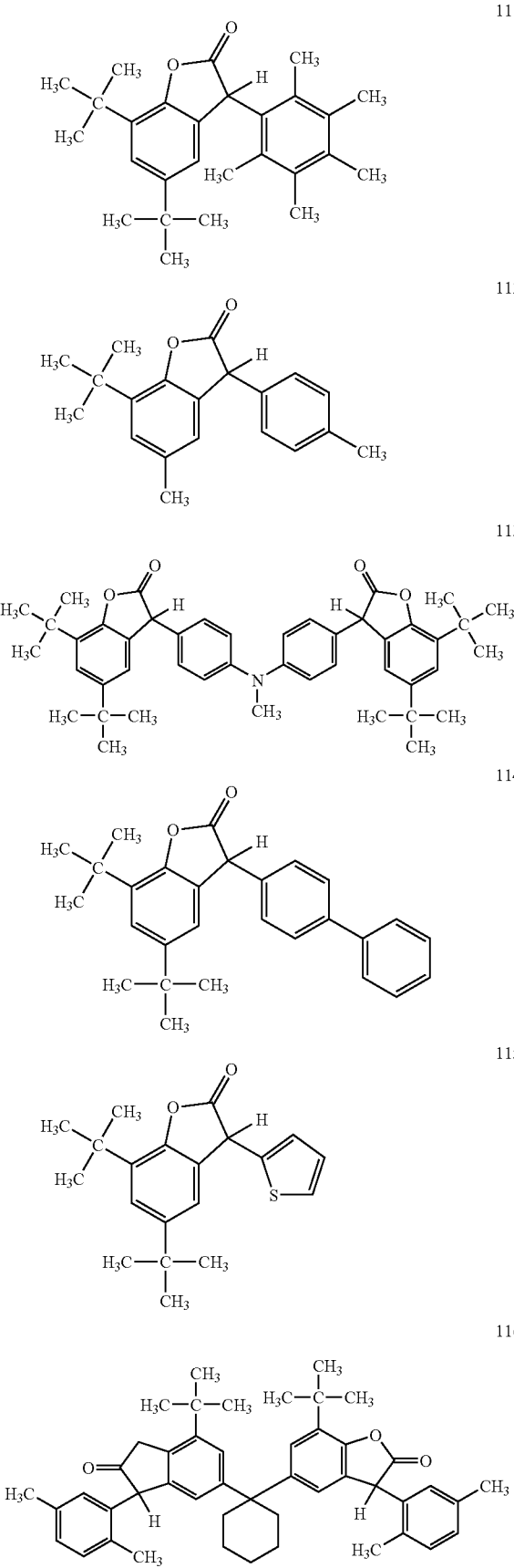
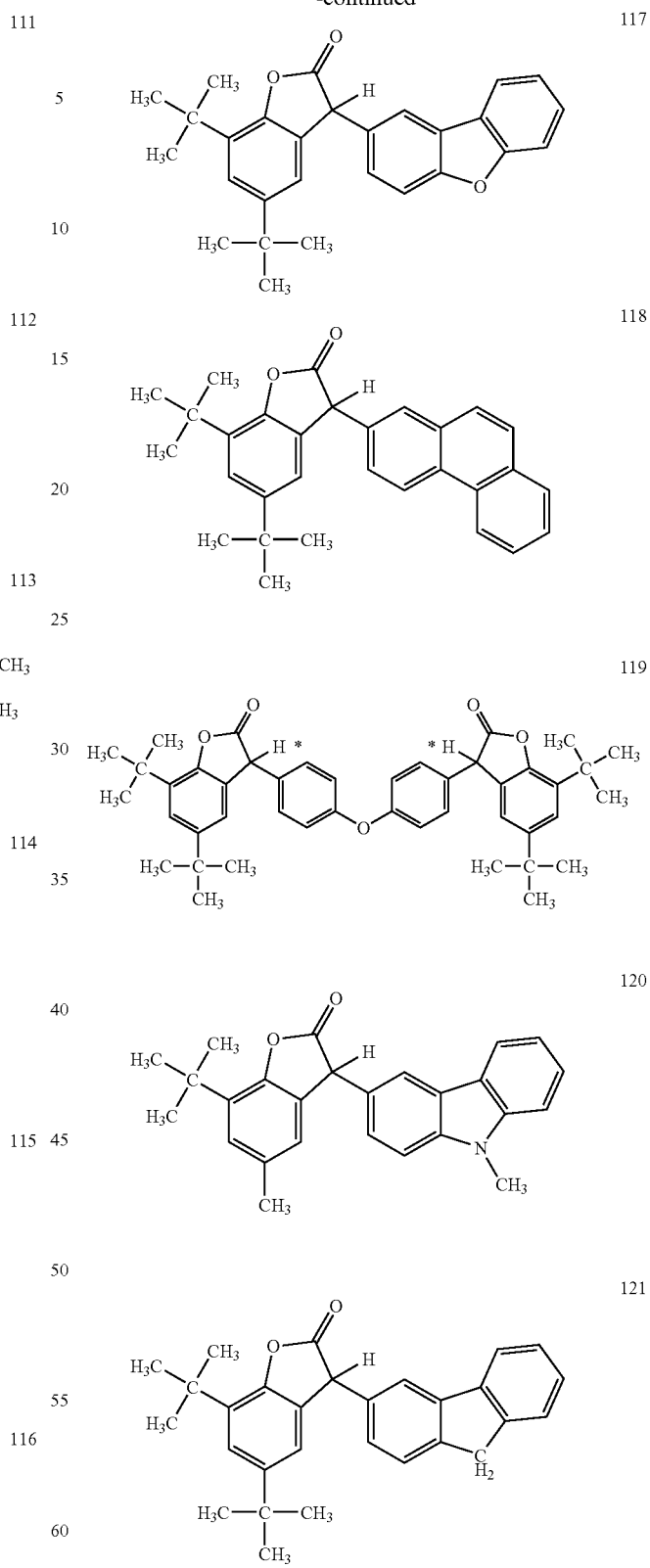
Further, the preferred compounds represented by Formula (I) are those which have the following structures, and are commercially available under the trade name of HP-136 from Ciba Specialty Chemicals Co., Ltd.

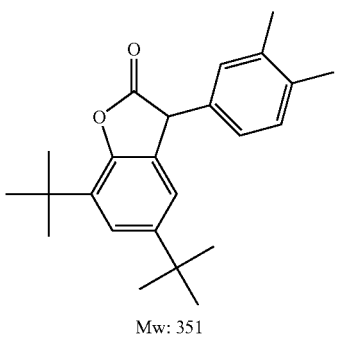 [SMILES: Cc1ccc(C2C(=O)Oc3c2cc(C(C)(C)C)cc3C(C)(C)C)cc1C]

Mw: 351

Further, more preferred compounds are those which have the following structural formula corresponding to above Compound 108.

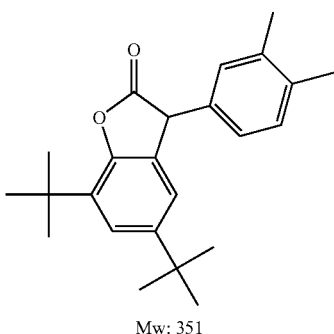 [SMILES: Cc1ccc(C2C(=O)Oc3c2cc(C(C)(C)C)cc3C(C)(C)C)cc1C]

Mw: 351

The employed amount of the compounds represented by above Formula (I) according to the present invention is preferably in the range of 0.01-5.0 parts by weight with respect to 100 parts by weight of the cellulose ester resins, is more preferably in the range of 0.05-1.0 part by weight in view of higher realization of excellent effects of the present invention, but is most preferably in the range of 0.1-0.5 part by weight.

<<Compounds having Acrylate or Methacrylate Group and Phenolic Hydroxyl Group in the Same Molecule>>

In the manufacturing method of the polarizing plate protective film of the present invention, one of the features is that the above polarizing plate protective film incorporates compounds which have an acrylate or methacrylate group and a phenolic hydroxyl group in the same molecule.

In the present invention, the compounds which have an acrylate or methacrylate group and a phenolic hydroxyl group in the same molecule are preferably the compounds represented by above Formula (II).

In the above Formula (II), $R_{31}$-$R_{35}$ are identical or different, and each of them is a hydrogen atom, an alkyl group commonly having 1-10 carbon atoms, but preferably having 1-5 carbon atoms. Alkyl groups are selected upon considering effects as a stabilizer and ease of preparation. Specific examples of the alkyl groups represented by $R_{31}$-$R_{35}$ include a methyl group, an ethyl group, a n-propyl group, an isopropyl group, a n-butyl group, a sec-butyl group, an isobutyl group, a tert-butyl group, and a 1,1-dimethylpropyl group. Specifically, in view of stabilizing effects and the ease of production, as $R_{31}$ and $R_{32}$, are preferred bulky alkyl groups, resulting in steric hindrance, such as a isopropyl group, a sec-butyl group, a tert-butyl group, or a 1,1-dimethylpropyl group. Of these, preferred are the tert-butyl group and the 1,1-dimethylpropyl group. In view of the ease of production, as $R_{33}$ and $R_{34}$ employed are a methyl group, an ethyl group, a n-propyl group, an isopropyl group, a n-butyl group, a sec-butyl group, an isobutyl group, a tert-butyl group, and a 1,1-dimethylpropyl group. However, when a reaction to form a quinoid type structure accompanied by hydrogen extraction is considered, preferred are the tert-butyl group and the 1,1-dimethylpropyl group. In view of production, as $R_{35}$ preferred are alkyl groups resulting in less steric hindrance such as a methyl group, an ethyl group, a propyl group, or a n-butyl group. $R_{36}$ represents a hydrogen atom or a methyl group.

Specific examples of compounds according to the present invention, which have an acrylate or methacrylate group and a phenolic hydroxyl group in the same molecule are listed below, however the present invention is not limited thereto.

1

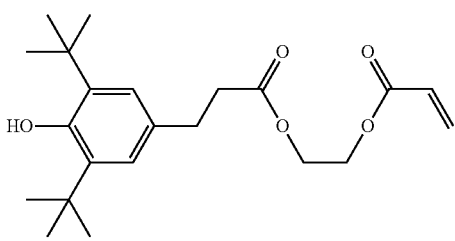

2

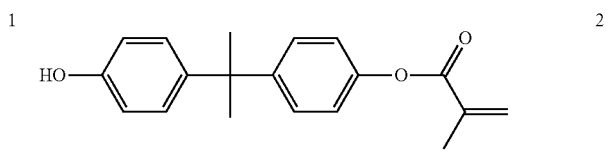

3

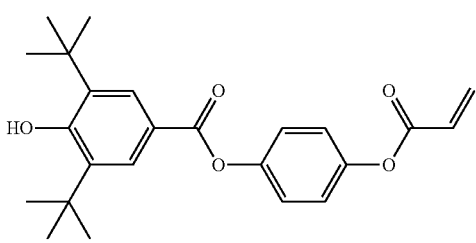

4

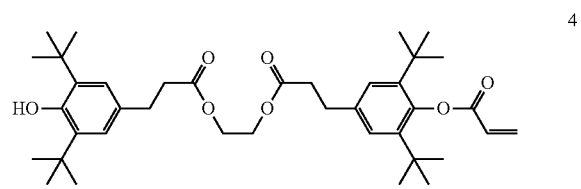

-continued
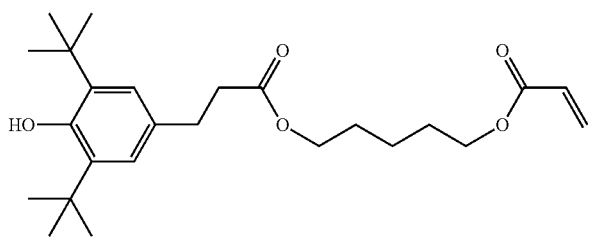
5
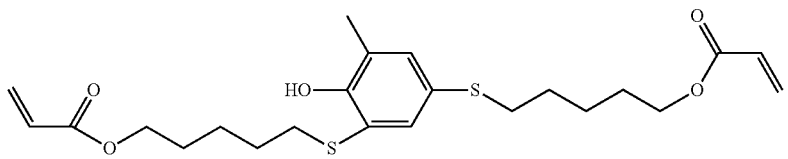
6
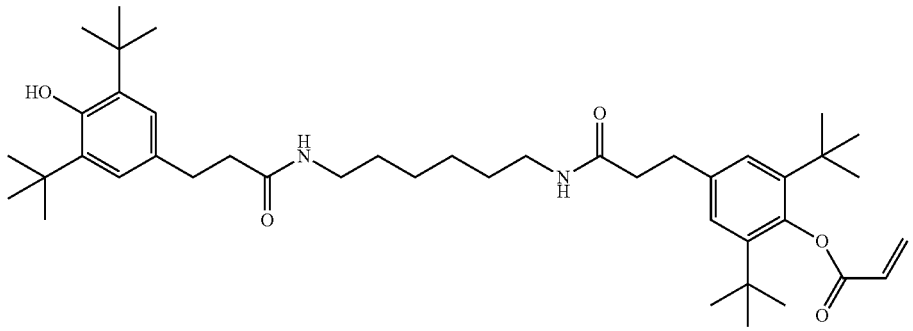
7
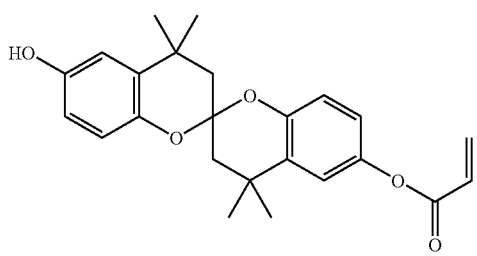
8
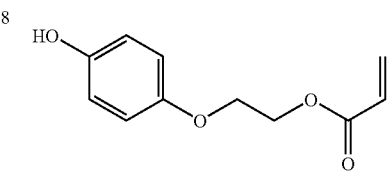
9
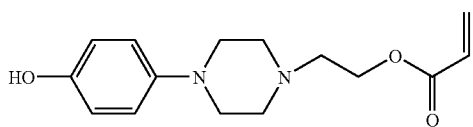
10
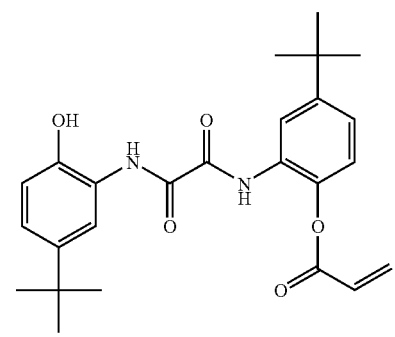
11

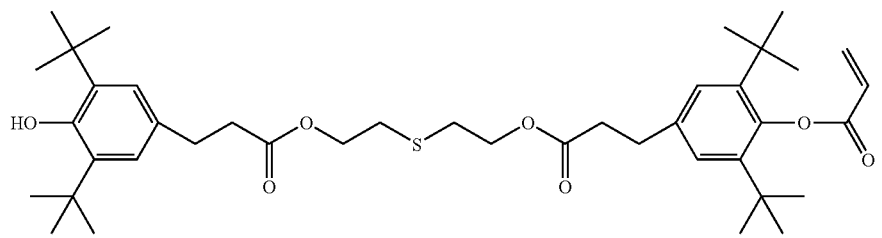
12
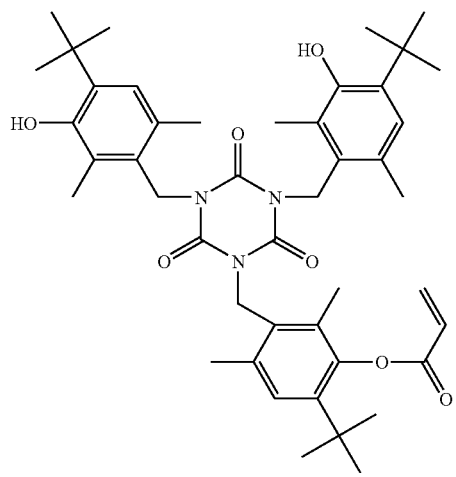
13
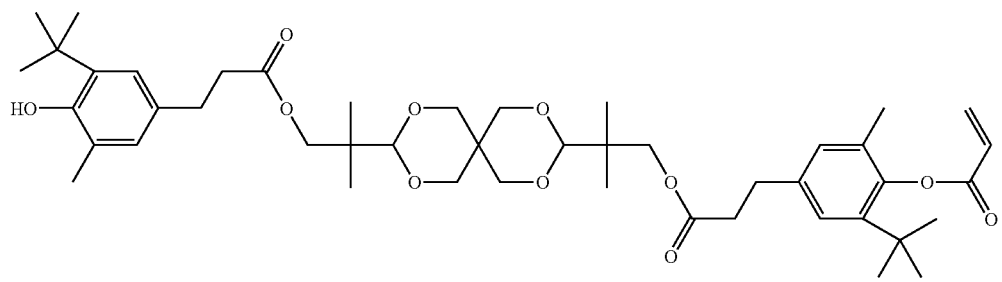
14
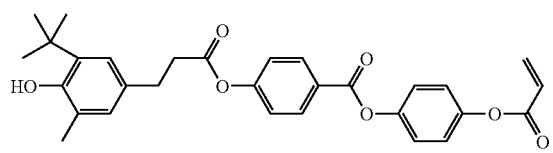
15
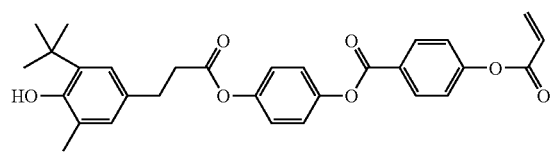
16
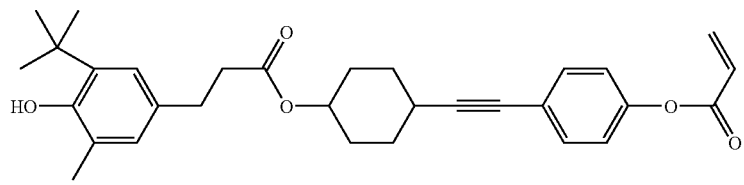
17

18
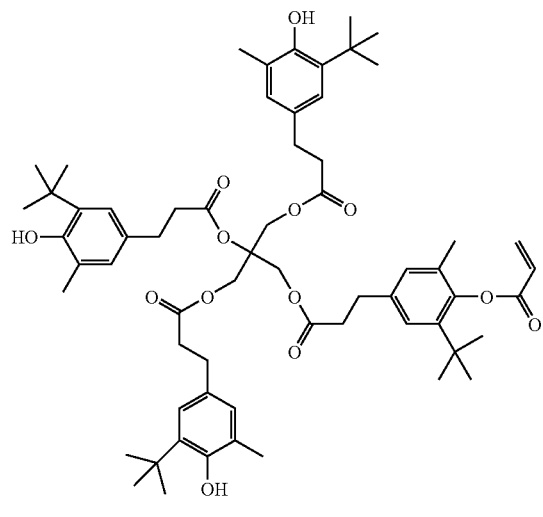
19
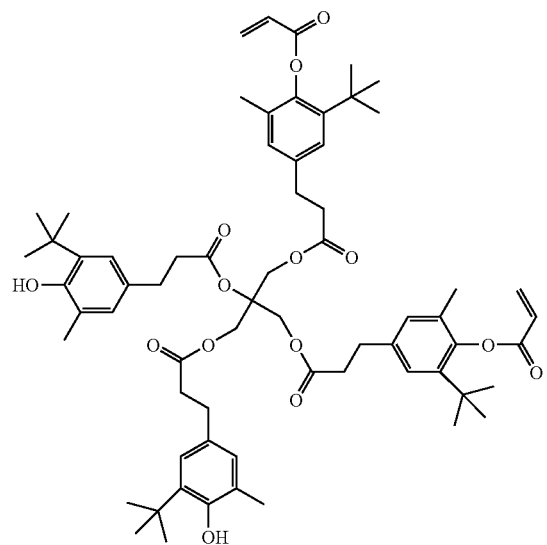
20
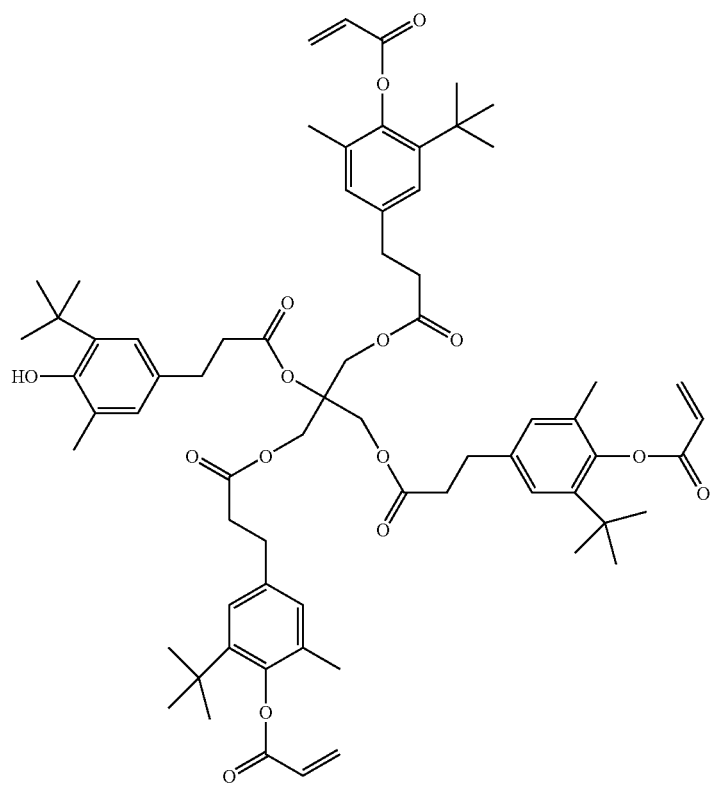

The compounds which have an acrylate or methacrylate group and a phenolic hydroxyl group in the same molecule are preferably those represented by above Formula (II). Of the compounds represented by above Formula (II), specifically preferred are commercially available "SUMILIZER GS" and "SUMILIZER GM" (both are registered trade names and are produced by Sumitomo Chemical Co., Ltd.) which are shown by the following structural formulas.

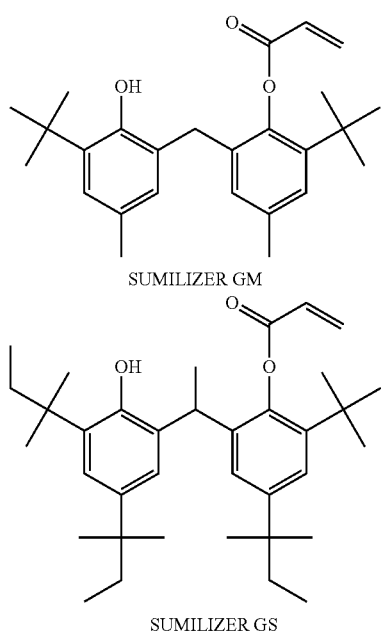

It is preferable that the compounds according to the present invention, which have an acrylate or methacrylate group and a phenolic hydroxyl group in the same molecule are employed in the amount range of 0.01-5.0 parts by weight with respect to 100 parts by weight of the cellulose ester resins. In view of realization of excellent effects of the present invention, the employed amount is more preferably in the range of 0.1-3.0 parts by weight, but is most preferably in the range of 0.5-1.0 part by weight.

Further, together with the above compounds, it is preferable to simultaneously employ the hindered phenol based compounds described below.

<Cellulose Ester Resins>

Cellulose ester resins (hereinafter also referred simply to as cellulose esters) will now be detailed.

It is preferable that the polarizing plate protective film according to the present invention is manufactured via a melt casting method. Since the melt casting method enables a significant decrease in the amount of used organic solvents, it is possible to prepare film which results in highly enhanced environmental friendliness, compared to the conventional solution casting method which employs a large amount of organic solvents.

Cellulose esters which constitute the polarizing plate protective film are not particularly limited as long as melt casting film production is applicable. In view of characteristics of the resulting film such as optical characteristics, it is preferable to employ lower fatty acid cellulose esters. In the present invention, "lower fatty acids" in the lower fatty acid cellulose esters mean fatty acid having at most 5 carbon atoms. Examples thereof include cellulose acetate, cellulose butyrate, and cellulose pivalate. Cellulose esters substituted with a fatty acid having at least 6 carbon atoms exhibit acceptable melt casting properties, while it is difficult to employ them as an optical film since dynamical characteristics of the resulting cellulose ester film is poor. In order to satisfy both of dynamical characteristics and melt casting properties, employed may be mixed fatty acid esters such as cellulose acetate propionate and cellulose acetate butyrate. It is difficult to employ triacetylcellulose, which is commonly employed in solution casting film production, in melt casting film production since its decomposition temperature is higher than its melting temperature.

Accordingly, the most preferred lower fatty acid cellulose esters are cellulose esters, having an acyl group having 2-4 carbon atoms as a substituent, which simultaneously satisfy the following Schemes (1) and (2):

$$2.6 \leq X+Y \leq 3.0 \qquad \text{Scheme (1)}$$

$$0.0 \leq X \leq 2.5 \qquad \text{Scheme (2)}$$

wherein X represents a substitution degree with acetic acid, namely a substitution degree with an acetyl group, and Y represents a substitution degree with an organic acid having 3-5 carbon atoms, namely a substitution degree with an acyl group particularly derived from an aliphatic organic acid having 3-5 carbon atoms such as a propionyl group or a butyryl group.

Of these, cellulose acetate propionate is most preferably employed, and further, it is preferable to employ cellulose esters satisfying $1.5 \leq X \leq 2.5$ and $0.1 \leq Y \leq 2.0$, further $1.0 \leq Y \leq 1.5$. The portion which is not substituted with an acyl group is commonly present as a hydroxyl group. It is possible to synthesize these via method known in the art.

It is possible to determine the substitution degree with an acyl group such as an acetyl group, a propionyl group, or a butyl group via the specification of ASTM-D817-96.

Ratio Mn of weight average molecular weight Mw/number average molecular weight Mn of cellulose esters employed in the present invention is preferably 1.0-5.5, is more preferably 1.4-5.0, but is most preferably 2.0-3.0. Further, preferably employed are those of an Mw of 100,000-500,000, and more preferably employed are those of an Mw of 150,000-300,000.

It is possible to determine the average molecular weight and molecular weight distribution of cellulose esters via a conventional method employing high speed liquid chromatography. Based on the results, the number average molecular weight and the weight average molecular weight are calculated.

Measurement conditions follow:
Solvent: methylene chloride
Columns: SHODEX K806, K805, and K803 (produced by Showa Denko K.K. These three columns were employed in connection.)
Column temperature: 25° C.
Sample concentration: 0.1% by weight
Detector: RI Model 504 (produced by GL Science Co.)
Pump: L6000 (produced by Hitachi Ltd.)
Flow rate: 1.0 ml/minute
Calibration curve: The calibration curve was which was prepared by employing 13 samples of STANDARD POLYSTYRENE STK standard polystyrene (produced by Tosoh Corp.) of Mw=1,000,000-500. It is preferable that 13 samples resulted in approximately equal intervals.

Raw materials of celluloses employed in the present invention may be wood pulp or cotton linter, and wood pulp may be derived from conifers or broadleaf trees, while conifers' one is preferred. In view of peeling properties during film production, the cotton linter is preferably employed. Cellulose esters prepared employing the above may be employed individually or in combinations.

For example, it is possible to employ combinations of cellulose resins derived from cotton linter, cellulose resins derived from wood pulp (conifers), and cellulose derived from wood pulp (broadleaf trees) at a ratio of 100:0:0, 90:10:0, 85:15:0, 50:50:0, 20:80:0, 10:90:0, 0:100:0, 0:0:100, 80:10:10, 85:0:15, or 40:30:30.

Cellulose esters are prepared in such a manner that hydroxyl groups of raw material cellulose are substituted with an acetyl group, a propionyl group and/or a butyl group employing acetic anhydride, propionic anhydride and/or butyric anhydride, based on a conventional method. Synthetic methods of cellulose esters, described above, are not particularly limited. Synthesis may be carried out with reference to the methods described, for example, in JP-A No. 10-45804 or Japanese Patent Publication Open to Public Inspection (under PCT Application) No. 6-501040.

Further, cellulose esters are industrially synthesized employing sulfuric acid as a catalyst. The above sulfuric acid is not completely removed, and residual sulfuric acid results in various decomposition reactions during melt casting film production to affect quality of the resulting cellulose ester film. Therefore, the content of residual sulfuric acid in cellulose esters employed in the present invention is preferably in the range of 0.1-40 ppm in terms of sulfur element. It is assumed that these are incorporated in the form of salts. When the content of the residual sulfuric acid is at most 40 ppm, it is possible to retard an increase of compounds adhered to the die lip section during thermal melting. Further, in view of minimizing breakage during slitting during and after thermal stretching, the above regulation is preferred. It is preferable that the content of the residual sulfuric acid is less. When it is at least 0.1 ppm, it is possible to prevent an excessive increase of load of the cellulose ester washing process. Further, it is preferable in view of retardation of breakage. When the residual sulfuric acid amount is less than 0.1 ppm, washing frequency excessively increases and this may affect the characteristics of resins, but it is not yet clarified. The range of 0.1-30 ppm is more preferred. It is also possible to determine the residual sulfuric acid amount based on ASTM-D817-96.

Further, the amount of total residual acids including others (such as acetic acid) is preferably at most 1,000 ppm, is more preferably at most 500 ppm, but is most preferably at most 100 ppm.

By further carrying out sufficient washing of synthesized cellulose esters compared to those employed in the solution casting method, it is possible to regulate the amount of residual acids within the above range. Thus, when a film is manufactured by the melt casting method, adhesion to the lip section is reduced, whereby it is possible to prepare a film with excellent flatness, as well as with desired dimensional change, mechanical strength, transparency, moisture resistance, and desired retardation value Rt in the thickness direction and retardation value Ro in the in-plane direction, described below. Further, washing cellulose esters may be carried by poor solvents such as methanol or ethanol in addition to water, or mixtures of poor and good solvents when poor solvents are employed as a result, whereby it is possible to remove inorganic compounds other than residual acids and low molecular weight organic impurities. Further, it is preferable to wash cellulose esters in the presence of antioxidants such as hindered amines, phosphorous acid esters, whereby heat resistance and film stability of cellulose esters are enhanced.

Further, In order to enhance heat resistance, mechanical physical properties, and optical physical properties of cellulose esters, after dissolving cellulose esters in good solvents of cellulose esters, re-precipitation is carried out in poor solvents, whereby it is possible to remove low molecular weight components and other impurities. During the above, in the same way as the above cellulose ester washing, it is preferable that the above removal is carried out in the presence of antioxidants.

Further, after re-precipitation of cellulose esters, other polymers or low molecular weight compounds may be incorporated.

The polarizing plate protective film of the present invention is provided with excellent characteristics of foreign matter bright spot resistance. However, it is preferable that the employed cellulose ester film, when cast, carries minimal foreign matter bright spots. "Foreign matter bright spots" refers to the following. Two polarizing plates are arranged at right angles (crossed Nicols) and a polarizing plate protective film is arranged between them. Light is exposed onto one side, while the polarizing plate protective film is viewed from another side. The foreign matter bright spot is a spot which is viewed due to the leakage of light of the light source. At the time, it is desirous that a polarizing plate employed for evaluation is composed of a protective film having no foreign matter bright spot and one in which a glass plate is employed to protect a polarizer is preferably employed. It is assumed that one of the causes of the foreign matter bright spot is cellulose which has not been acetylated, or has undergone acetylation of a lower degree. It is possible to remove the foreign matter bright spot by employing cellulose esters having minimal foreign matter bright spot (for example, employing cellulose esters of small variance of the substitution degree), filtering melted cellulose esters, as well as by employing a process in which in any of the process of the final synthesis period of cellulose esters and the process to prepare precipitates, the resulting product is melted, followed by the filtering process similar to the above. Since the melted reins exhibit relatively high viscosity, the latter method results in higher efficiency.

As film thickness decreases, the number of foreign matter bright spots decreases, while as the content of cellulose esters, incorporated in the film, decreases, foreign matter bright spots tend to decrease. The number of foreign matter bright spots of a bright spot diameter of at most 0.01 mm is preferably 200/cm$^2$, is more preferably 100/cm$^2$, is further more preferably 50/cm$^2$, is further more preferably 30/cm$^2$, is still further more 10/cm$^2$, but is most preferably 0. Further, the number of foreign matter bright spots of a bright spot diameter of 0.005-0.01 mm is preferably at most 200/cm$^2$, is more preferably at most 100/cm$^2$, is further more preferably, is further more preferably 50/cm$^2$, at most 30/cm$^2$, is still further more preferably at most 10/cm$^2$, but is most preferably 0.

When bright spot foreign matter is removed via melted filtration, filtration of a cellulose ester composition incorporating added and mixed plasticizers, degradation inhibitors, and antioxidants is more preferred than the filtration of a melted composition composed of only cellulose esters since the removal efficiency of the bright spot foreign matter is higher. Obviously, it may be reduced in such a manner that during synthesis of cellulose esters, dissolution is carried out in solvents followed by filtration. It is possible to filter a composition incorporating UV absorbers and other additives. It is preferable to carry out filtration of a melted material incorporating cellulose esters of a viscosity of at most 1,000 Pa·s. The viscosity is more preferably at most 500 Pa·s, is further preferably at most 100 Pa·s, but is most preferably at most 50 Pa·. As filter elements, preferably employed are conventional ones such as glass fibers, cellulose fibers, filter paper, or fluororesins such as ethylene tetrafluoride. Ceramics and metals are preferably employed. Absolute filtration accuracy of employed filter materials is preferably at most 50 μm, is more preferably at most 30 μm, is further more preferably at most 10 μm, but is most preferably at most 5 μm. These may be employed in appropriate combinations. A surface or depth type filter material may be employed, while the depth type is more preferably employed due to a tendency of less clogging.

As another embodiment of the manufacturing method of the polarizing plate protective film of the present invention, a cellulose ester film my be employed which is prepared in such a manner that after dissolving at least once raw material cellulose esters into solvents, solvents are dried. At that time, after dissolving cellulose esters together with at least one of the plasticizer, UV absorber, degradation inhibitor, antioxidant, and matting agent, it is possible to employ dried cellulose esters. As solvents employed may be good solvents employed in the solution casting method, such as methylene chloride, methyl acetate, or dioxolanes, and poor solvents such as methanol, ethanol, or butanol may simultaneously be employed. During dissolution, cooling to at most −20° C. or heating to at least 80° C. may be carried out. By employing such cellulose esters, in a melted state, each of the additives is uniformly blended, whereby occasionally, it is possible to make optical characteristics uniform.

In the polarizing plate protective film of the present invention, polymer components other than cellulose ester resins may be appropriately blended. Blended polymer components preferably exhibit targeted compatibility with cellulose esters. When they are converted into a film, the resulting transmittance is preferably at least 80%, is more preferably at least 90%, but is most preferably 92%.

(Additives)

As other additives employed together with cellulose esters listed are those, which exhibit various functions, such as plasticizers, antioxidants, acid scavengers, light stabilizers, peroxide decomposing agents, radical scavengers, metal inactivating agents, matting agents, dyes, pigments, fluorescent materials, UV absorbers, infrared ray absorbers, dichroic dyes, refractive index controlling agents, retardation controlling agents, gas permeability retarding agents, antibacterial agents, electrical conductivity providing agents, biodegradation providing agents, gelling inhibitors, viscosity controlling agents, viscosity lowering agents, If any of the above functions is exhibited, additives which are not included the above classification are employed.

The polarizing plate protective film of the present invention is melt-cast at such high temperature as 150-300° C. via the melt casting method. Thus, a process is employed in which cellulose esters tend to be subjected to decomposition and deterioration, compared to the conventional solution casting film production. It is preferable to employ additives to minimize oxidation of cellulose ester compositions, to scavenge acids formed by decomposition, to retard or inhibit decomposition reactions due to radical species via light or heat, as well as to retard modification represented by coloration or a decrease in molecular weight including decomposition reactions which are not yet clarified and the generation of volatile components due to decomposition of materials.

Further, additives themselves are required to be highly heat resistant. As heat resistance of additives, it is preferable that 1% weight loss temperature Td1 is at least 250° C. Above 1% weight loss temperature Td1 is the temperature at which a sample weight decrease by 1% due to thermal modification and decomposition, obtained from TG curve described in JIS K 7120 "Plastic Heat Weight Measurement Method". In the present invention, measurement was carried out at initiation/ termination temperature of 30/500° C. and a temperature increasing rate of 10° C./minute under a nitrogen flow rate of 100 n·ml/minute, employing a differential heat weight simultaneous measurement apparatus TG/DTA (produced by Seiki Instrument Co., Ltd.).

When a cellulose ester composition is thermally melted, it undergoes marked decomposition reactions. Due to the decomposition reactions, occasionally, coloration and degradation of strength of the above constituting materials may be accompanied. Further, due to the decomposition reaction of cellulose ester compositions, occasionally, undesirable volatile components are simultaneously formed. The presence of the above additives excels in retardation of degradation of strength due to degradation and decomposition of materials or capability of maintaining the inherent strength of materials, whereby in view of possibility of manufacturing of the cellulose ester film of the present invention, the presence of the above additives is essential.

Examples of the above additives include, but are not limited to, antioxidants, acid scavengers, hindered amine light stabilizers, UV absorbers, peroxide decomposing agents, radical scavengers, and metal inactivating agents. These are described in JP-A Nos. 3-199201, 5-1907073, 5-194789, 5-271471, and 6-107854. It is preferable that at least one selected from these is incorporated into film forming materials.

Further, the presence of additives excels in retardation or elimination of the formation of colored compounds in the visible light range during thermal melting, and undesirable performance as an optical film in regard to transmittance and haze, formed by mixing of volatile components into the film.

Specifically, the constitution of the present invention excels in capability to decrease coloration and the haze value. When the polarizing plate protective film of the present invention is employed, it is possible to decrease the haze value to less than 1%, but preferably to less than 0.5%.

Further, since the polarizing plate protective film of the present invention is weak against ultraviolet radiation, it is preferable that UV absorbers are incorporated in the polarizing plate protective film on the light incident side of the polarizer.

Further, when the polarizing plate protective film of the present invention is employed as a retardation film, it is possible to incorporate additives to regulate retardation. As added compounds to regulate the retardation employed may be the retardation regulating agents, described, for example, in European Patent No. 911,656A2.

Further, in order to control viscosity during thermal melting and to regulate physical properties of a film after film processing, it is possible to add organic or inorganic polymers to the polarizing plate protective film.

During addition of cellulose esters and the above additives, the total amount including them is preferably 1-30% by weight with respect to the entire weight of the cellulose esters. It is preferable that the amount is at least 1% by weight, whereby it is possible to maintain melt casting film making capability, and to assure dynamical characteristics and storage stability of the cellulose ester film obtained in the range of 1-30% by weight.

During storage of the above cellulose ester compositions or the film production process, deterioration reactions may simultaneously occur due to oxygen in atmosphere. In such a case, the above additives may simultaneously be employed to realize the present invention by utilizing the stabilizing effects and also an effect to decrease oxygen concentration in atmosphere. Conventional technologies include the use of nitrogen and argon as an inert gas, the deaeration via reduced pressure—vacuum, and the operation in tightly sealed environment. It is possible to simultaneously employ at least one of these three and the above method in which additives are incorporated. By decreasing probability of the contact of a cellulose ester composition with oxygen in atmosphere, it is possible to retard the degradation of the above materials. The above is preferable to achieve the object of the present invention.

To enhance storage stability of the polarizing plate protective film of the present invention for the polarizing plate and the polarizer, it is preferable that the above additives are present in the cellulose ester composition.

In the liquid crystal display device employing the polarizing plate of the present invention, since the above additives are present in the polarizing plate protective film of the present invention, the above modification and degradation are retarded, whereby it is possible to enhance storage stability over an extended period. Further, with regard to the display quality of the liquid crystal display device, functions of the optical compensation design provided with the polarizing plate protective film are realized over an extended period.

Additives will now be further described.

(Plasticizers)

Plasticizers which are applicable to the polarizing plate protective film of the present invention are not particularly limited. It is preferable that at least one ester based plasticizer is incorporated, which is selected from an ester based plasticizer composed of polyhydric alcohol and monovalent carboxylic acid, an ester based plasticizer composed of polyvalent carboxylic acid and monohydric alcohol, or a sugar ester based plasticizer.

As used herein, a "plasticizer" is an additive which results in effects such as improvement of brittleness or creation of flexibility. In the present invention, plasticizers are added so that the melting temperature of cellulose ester itself is lowered, and further, in the same heating temperature, the melt viscosity of a film composition incorporating plasticizers is lower than cellulose ester itself. Further, they are added as a moisture permeation minimizing agent which improves hydrophilicity of cellulose esters and moisture permeability of optical films.

"Melting temperature of film compositions", as described herein, means the temperature at which the above material is heated to result in fluidity. In order to fluidize cellulose esters via heating, it is necessary to heat them at the higher temperature than the glass transition temperature. At or higher than the glass transition temperature, the elastic modulus or viscosity decreases via absorption of heat, whereby fluidity develops. However, at relatively high temperature, the molecular weight of cellulose esters is decreased due to thermal decomposition which occurs during melting, and occasionally, dynamical characteristics of the resulting film is adversely affected. Consequently, it is necessary to melt cellulose esters at a relatively low temperature. It is possible to realize the decrease in the melting temperature of a film composition by the addition of plasticizers, which exhibit lower melting point or glass transition temperature than the glass transition temperature of the cellulose esters. Polyhydric alcohol ester based plasticizers, having a structure such that the organic acid represented by Formula (3), described below, employed in the present invention and polyhydric alcohol, lower the melting point of cellulose esters, exhibit minimal volatility during the melt casting process and after the production, and excels in process suitability. Further, the resulting cellulose ester film excels in optical characteristic, dimensional stability, and flatness.

Ester based plasticizers composed of polyhydric alcohol and monovalent carboxylic acid as well as ester based plasticizers composed of polyvalent carboxylic acid and monohydric alcohol are preferred due to their high affinity with cellulose esters.

Specific examples of ethylene glycol based plasticizers, which belong to polyhydric alcohol based ones, include ethylene glycol alkyl ester based plasticizers such as ethylene glycol diacetate or ethylene glycol dibutyrate; ethylene glycol cycloalkyl esters such as ethylene glycol dicyclopropyl carboxylate or ethylene glycol dicyclohexyl carboxylate; and aryl ester based plasticizers such as ethylene glycol dibenzoate or ethylene glycol di4-methyl benzoate. These alkylate group, cycloalkylate group and arylate group may be the same or different and may be substituted. Further, these substituents may be combined via a covalent bond. Still further, the ethylene glycol portion may be substituted, and the partial structure of ethylene glycol ester is a part of the polymer, or may be subjected to regular pendant. Further, additives such as antioxidants, acid scavenger, or UV absorbers may be introduced into one portion of the molecular structure.

Specific examples of glycerin ester based plasticizers, which belong to polyhydric alcohol ester based ones, include glycerin alkyl esters such as triacetin, tributyrin, glycerin diacetate-caprirate, or glycerin oleate-propionate; glycerin cycloalkyl esters such as glycerin tricyclopropyl carboxylate or glycerin tricyclohexyl carboxylate; glycerin aryl esters such as glycerin tribenzoate or glycerin 4-methyl benzoate; diglycerin alkyl esters such as diglycerin tetraacetate, diglycerin tetrapropionate, diglycerin acetate caprylate, or diglycerin tetralaurate; diglycerin cycloalkyl esters such as diglycerin tetracyclobutyl carboxylate or diglycerin tetracyclopentyl carboxylate; and diglycerin aryl esters such as diglycerin tetrabenzoate or diglycerin 3-methyl benzoate. These alkylate group, cycloalkyl carboxylate group, and arylate group may be the same or different and may be further substituted. Further, the alkylate group, the cycloalkyl carboxylate group, and the arylate group may be employed in combination, and these substituents may be combined via a covalent bond. The portion of glycerin or diglycerin may be substituted. The partial structure of glycerin ester and diglycerin ester is a part may be a part of a polymer or may be subjected to regular pendant. Further, additives such as antioxidants, acid scavenger, or UV absorbers may be introduced into one portion of the molecular structure.

Specific examples of other polyhydric alcohol ester based plasticizers include polyhydric alcohol ester based plasticizers described in paragraphs 0030-0033 of JP-A No. 2003-12823.

These alkylate group, cycloalkylate group and arylate group may be the same or different and may further be substituted. Further, the alkylate group, the cycloalkyl carboxylate group, and the arylate group may be in combination, and may be combined with each other via a covalent bond. Still further, the partial structure of polyhydric alcohol may be a part of the polymer or may be subjected to regular pendant. Further, additives such as antioxidants, acid scavenger, or UV absorbers may be introduced into one portion of the molecular structure.

Of the above ester based plasticizers composed of polyhydric alcohol and monovalent carboxylic acid, preferred are alkyl polyhydric alcohol aryl esters. Specific examples thereof include the above ethylene glycol dibenzoate, glycerin tribenzoate, and diglycerin tetrabenzoate, as well as Exemplified Compound 16, described in paragraph 0032 of JP-A No. 2003-12823.

Specific examples of dicarboxylic acid ester based plasticizers, which belong to polyvalent carboxylic acid ester based ones, include alkyl dicarboxylic acid alkyl ester based plasticizers such as didodecyl malonates (C1), dioctyl adipate (C5), or dibutyl sebacate (C8); alkyl dicarboxylic acid cycloalkyl ester based plasticizers such as dicyclopentyl succinate or dicyclohexyl adipate; alkyl dicarboxylic acid aryl ester based plasticizers such as diphenyl succinate or di4-merthylphenyl glutarate; cycloalkyl dicarboxylic acid alkyl ester based plasticizers such as dihexyl-1,4-cyclohexane dicarbooxylate or didecylbicyclo[2,2,1]heptane-2,3-carboxylate; cycloalkyl dicarboxylic acid cycloalkyl based plasticizers such as dicyclohexyl-1,2-cyclobutane dicarboxylate or dicyclopropyl-1,2-cyclohexyl dicarboxylate; cycloalkyl dicarboxylic acid aryl ester based plasticizers such as diphenyl-1,1-cyclopropyl dicarboxylate or di2-naphthyl-1,4-cyclohexane dicarboxylate; aryl dicarboxylic acid alkyl ester based plasticizers such as diethyl phthalate, dimethyl phthalate, octyl phthalate, dibutyl phthalate, or di-2-ethylhexyl phthalate; aryl dicarboxylic acid cycloalkyl ester based plasticizers such as dicylopropyl phthalate or dicyclohexyl phthalate; and aryl dicarboxylic acid aryl ester based plasticizers such as diphenyl phthalate or di4-methylphenyl phthalate. These alkoxy group and cycloalkoxy group may be the same or different and may subjected to one substitution. Further, these substituents may be further substituted. The alkyl group and the cycloalkyl group may be in combination, and may be combined with each other via a covalent bond. Still further, the aromatic ring of the phthalic acid may be substituted, and polymers such as a dimer, a trimer, or a tetramer may be applicable. The partial structure of phthalic acid esters may be a part of the polymer or may be subjected to regular pendant. Further, additives such as antioxidants, acid scavenger, or UV absorbers may be introduced into one portion of the molecular structure.

Specific examples of other polyvalent carboxylic acid ester based plasticizers include alkyl polyvalent carboxylic acid ester based plasticizers such as tridecyl tricarbalate or tributyl-meso-butane-1,2,3,4-tetracarboxylate; alkyl polyvalent carboxylic acid cycloalkyl ester based plasticizers such as tricyclohexyl tricarbalate or tricyclopropyl-2-hydroxy-1,2,3-propane tricarboxylate; alkyl polyvalent carboxylic acid aryl ester based plasticizers such as triphenyl 2-hydroxy-1,2,3-propane tricarboxylate or tetra3-methylphenyltetrahydrofuran-2,3,4,5-tetracabocxylate; cycloalkyl polyvalent carboxylic acid alkyl ester based plasticizers such as tetrahexyl-1,2,3,4-cyclobutane tetracarboxylate or tetrabutyl-1,2,3,4-cyclopentane tetracarboxylate; cycloalkyl polyvalent carboxylic acid cycloalkyl ester based plasticizers such as tetracyclopropyl-1,2,3,4-cyclobutane tetracarboxylate or tricyclohexyl-1,3,5-cyclohexyl tricarboxylate; cycloalkyl polyvalent carboxylic acid aryl ester based plasticizers such as triphenyl-1,3,5-cyclohexyl tricarboxylate or hexa4-methylphenyl-1,2,3,4,5,6-cyclohexyl hexacarboxylate; aryl polyvalent carboxylic acid alkyl ester based plasticizers such as trodecylbenzene-1,2,4-tricarboxylate or tetraoctylbenzene-1,2,4,5-tetracarboxylate; aryl polyvalent carboxylic acid cycloalkyl ester based plasticizers such as tricyclopentylbenzene-1,3,5-tricarboxylate or tetracyclohexylbenzene-1,2,3,5-tetracarboxylate; and aryl polyvalent carboxylic acid aryl ester based plasticizers such as triphenylbenzene-1,3,5-tetracarboxylate or hexa4-methylphenylbenzene-1,2,3,4,5,6-hexacarboxylate. These alkoxy group and cycloalkoxy group may be the same or different and may subjected to one substitution. Further, these substituents may be further substituted. The alkyl group and the cycloalkyl group may be in combination, and may be combined with each other via a covalent bond. Still further, the aromatic ring of phthalic acid may be substituted, and polymers such as a dimer, a trimer, or a tetramer may be applicable. The partial structure of phthalic acid esters may be a part of the polymer or may be subjected to regular pendant. Further, additives such as antioxidants, acid scavenger, or UV absorbers may be introduced into one portion of the molecular structure.

Of the above ester based plasticizers composed of polyvalent carboxylic acid and monohydric alcohol, preferred are dialkylcaroxylic acid alkyl esters. Specifically listed are above dioctyl adipate and tridecyl tricarbalate.

Further, it is specifically preferable that the polarizing plate protective film of the present invention incorporates, as a plasticizer, ester compounds in an amount of 1-25% by weight, which have a structure in which the organic acid, represented by the following Formula (3), and tri- or higher hydric alcohol undergo condensation. When the incorporated amount is at least 1% by weight, plasticizer adding effects are realized, while when it is at most 25% by weight, it is possible to retard the generation of bleed-out, whereby it is possible to maintain the storage stability of the film. The content of the above plasticizers in the polarizing plate protective film is more preferably 3-20% by weight, but is most preferably 5-15% by weight.

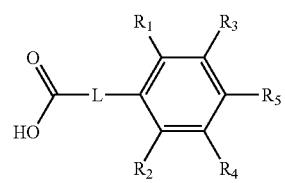

Formula (3)

In above Formula (3), $R_1$-$R_5$ each represents a hydrogen atom, a cycloalkyl group, an aralkyl group, an alkoxy group, a cycloalkoxy group, an aryloxy group, an aralkyloxy group, an acyl group, a carbonyloxy group, an oxycarbonyl group, or an oxycarbonyloxy group; any of these may further have a substituent; and at least one of $R_1$-$R_5$ is not a hydrogen atom. L represents 2 valent linking group, and represents a substituted or unsubstituted alkylene group, an oxygen atom, or a direct bond.

The cycloalkyl groups represented by $R_1$-$R_5$ are those having preferably 3-8 carbon atoms, and specifically include a cyclopropyl cyclopentyl, or cyclohexyl group. These may be substituted, and preferred substituents include a halogen atom such as chlorine atom, a bromine atom, or a fluorine atom, a hydroxyl group, an alkyl group, a cycloalkoxy group, an aralkyl group (this phenyl group may further be substituted with an alkyl group or a halogen atom), a vinyl group, an alkenyl group such as an aryl group, a phenyl group (this phenyl group may further be substituted with alkyl group or a halogen atom), a phenoxy group (this phenyl group may further be substituted with alkyl group or a halogen atom), an acetyl group, an acyl group having 2-8 carbon atoms such as a propionyl group, and an unsubstituted carbonyloxy group having 2-8 carbon atoms such as an acetyloxy group or a propionyloxy group.

The aralkyl groups represented by $R_1$-$R_6$ include a benzyl group, a phenethyl group, a γ-phenylpropyl group, and these group may be substituted. Preferred substituents include those which may be substituted with the above cycloalkyl group.

The alkoxy groups represented by $R_1$-$R_5$ include those having 1-8 carbon atoms, and specifically include each of the alkoxy groups such as a methoxy, ethoxy, n-propoxy, n-octyloxy, isopropoxy, isobutoxy, 2-ethylhexyloxy, or t-butoxy group. Further, these groups may be substituted, and preferred substituents include a halogen atom such as chlorine atom, a bromine atom, or a fluorine atom, a hydroxyl group, an alkoxy group, a cycloalkoxy group, an aralkyl group (this aralkyl group may be substituted with an alkyl group or a halogen atom), an alkenyl group, a phenyl group (this phenyl group may further be substituted with alkyl group or a halogen atom), an aryloxy group (such as a phenoxy group (this phenoxy group may further be substituted with an alkyl group or a halogen atom)), an acetyl group, an acyl group such as a propionyl group, an acyloxy group having 2-8 carbon atoms such as an acetyloxy group or a propionyloxy group, and an arylcarbonyloxy group such as a benzoyloxy group.

The cycloalkoxy groups represented by $R_1$-$R_5$ include those having 1-8 carbon atoms, and specifically include a cyclopropyloxy, cyclopentyloxy, or cyclohexyloxy group. Further, these groups may be substituted, and as preferred substituents may be listed those which may be substituted with the above cycloalkyl group.

As the aryloxy groups represented by $R_1$-$R_5$, listed is a phenoxy group. This phenyl group may be substituted with the substituent such as an alkyl group or halogen atom which is listed as the substituent which may be substituted with the above cycloalkyl group.

As the aralkyloxy groups represented by $R_1$-$R_5$, listed are a phenetyloxy group and the like. These substituents may further be substituted. As preferred substituents listed may be substituents which may be substituted with the above cycloalkyl group.

As the acyl groups represented by $R_1$-$R_5$, listed are unsubstituted acyl group having 2-8 carbon atoms such as an acetyl group or a propionyl group (as a hydrocarbon group of the acyl group, an alkyl, alkenyl or alkynyl group is included), and these substituents may further be substituted. As preferred substituents, listed may be those which may be substituted with the above cycloalkyl group.

As the carbonyloxy groups represented by $R_1$-$R_5$, listed are unsubstituted acyloxy group having 2-8 carbon atoms such as an acetyloxy group or a propionyloxy group (as a hydrocarbon group of the acyl group, an alkyl, alkenyl or alkynyl group is included), or an arylcarbonyloxy group such as a benzoyloxy group, and these substituents may further be substituted with substituents which may be substituted with the above cycloalkyl group.

As the oxycarbonyl groups represented by $R_1$-$R_5$, listed are alkoxycarbonyl groups such as a methoxycarbonyl group, an ethoxycarbonyl group, or a propyloxycarbonyl group, or an aryloxycarbonyl group such as a phenoxycarbonyl group. These substituents may further be substituted with substituents, and as the preferred substituents listed may be those which may be substituted with the above cycloalkyl group.

As the oxycarbonyloxy groups represented by $R_1$-$R_5$, listed are those such as a methoxycarbonyloxy group having 1-8 carbon atoms. These substituents may further be substituted with substituents, and as the preferred substituents listed may be those which may be substituted with the above cycloalkyl group.

Further, any one of $R_1$-$R_5$ is not a hydrogen atom. Further, any of $R_1$-$R_5$ may be combined with each other to form a ring structure.

Further, as the linking groups represented by L, listed is a substituted or unsubstituted alkylene group, an oxygen atom, or a direct bond. The alkylene groups include those such as a methylene group, an ethylene group, or a propylene group. Further, these groups may be substituted with the substituents which are listed as a substituent which may be substituted for the above group represented by $R_1$-$R_5$.

Of these, the specifically preferred linking group, represented by L, includes the direct bond and aromatic carboxylic acid.

Further, in the present invention, as the organic acids represented by above Formula (3), which constitute the ester compounds which employed as a plasticizer, preferred are those having, in at least $R_1$ or $R_2$, the alkoxy group, the acyl group, the oxycarbonyl group, the carbonyloxy group or the oxycarbonyloxy group each of which is described above. Further preferred are compounds having a plurality of substituents.

In the present invention, organic acids, in which the hydroxyl group of tri- or higher hydric alcohol is substituted, may be employed individually or in combinations.

In the present invention, tri- or higher hydric alcohol compounds which react with the organic acid represented by above Formula (3) to form a polyhydric alcohol ester compound are preferably aliphatic trihydric-icosahydric alcohol. In the present invention, as tri- or higher hydric alcohols, preferred are those represented by the following Formula (4).

R'—(OH)$_m$            Formula (4)

wherein R' represents an m-valent organic group, "m" represents a positive integer of at least 3, and OH represents an alcoholic hydroxyl group. Specifically preferred is polyhydric alcohol of m of 3 or 4.

As examples of specifically preferred polyhydric alcohol listed may be the following, however the present invention is not limited thereto.

Listed may be adonitol, arabitol, 1,2,4-butanetriol, 1,2,3-hexanetriol, 1,2,6-hexanetriol, glycerin, diglycerin, erythritol, pentaerythritol, dipentaerythritol, tripentaerythritol, galactitol, glucose, cellobiose, inositol, mannitol, 3-methylpentane-1,3,5-triol, pinacol, sorbitol, trimethylolpropane, trimethylolethane, and xylitol. Of these, preferred are glycerin, trimethylolpropane, trimethylolethane, and xylitol. Further, specifically preferred are glycerin, trimethylolethane, trimethylolpropane, and pentaerythritol.

It is possible to synthesize esters, which are formed by being allowed to react the tri- or higher valent organic acid represented by Formula (3) with tri- or higher hydric alcohol via a conventional method. In the following, shown is a representative synthesis example. However, synthesis is carried out via methods such as a method in which the organic acid represented by above Formula (3) and polyhydric alcohol undergo esterification via condensation in the presence of acid, a method in which organic acid is previously modified to acid chloride or acid anhydride, followed by allowing to react with polyhydric alcohol, and a method in which phenyl ester of organic acid is allowed to react with polyhydric alcohol. It is preferable to appropriately select any of the methods resulting in a high yield, depending on the targeted compound.

As plasticizers composed of the tri- or higher valent organic acid represented by Formula (3) and tri- or higher hydric alcohol ester, the compounds represented by the following Formula (5) are preferred.

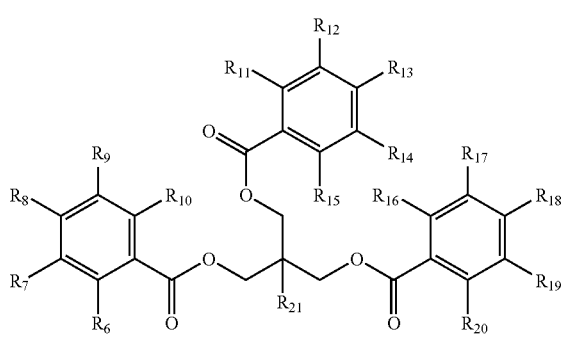

Formula (5)

In above Formula (5), $R_6$-$R_{20}$ each represents a hydrogen atom, a cycloalkyl group, an aralkyl group, an alkoxy group, a cycloalkoxy group, an aryloxy group, an aralkyloxy group, an acyl group, a carbonyloxy group, an oxycarbonyl group, or an oxycarbonyloxy group, and these may have a substituent. At least one of $R_6$-$R_{10}$ is not a hydrogen atom, at least one of $R_{11}$-$R_{15}$ is not a hydrogen atom, and at least one of $R_{16}$-$R_{20}$ is not a hydrogen atom. Further, $R_{21}$ represents an alkyl group.

As the cycloalkyl group, the aralkyl group, the alkoxy group, the cycloalkoxy group, the aryloxy group, the aralkyloxy group, the acyl group, the carbonyloxy group, the oxycarbonyl group, and the oxycarbonyloxy group represented by $R_6$-$R_{21}$ include the same groups as those represented by above $R_1$-$R_5$.

The molecular weight of the polyhydric alcohol esters prepared as above is not particularly limited, and is preferably 300-1,500, but is more preferably 400-1,000. Lager molecular weight is preferred due to less volatilization, while with regard to moisture permeability and compatibility with cellulose esters, smaller molecular weight is preferred.

Specific examples of polyhydric alcohol esters according to the present invention will now be illustrated.

1

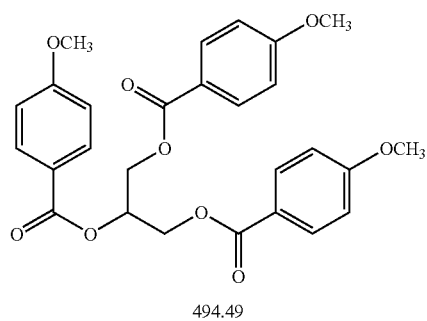

494.49

2

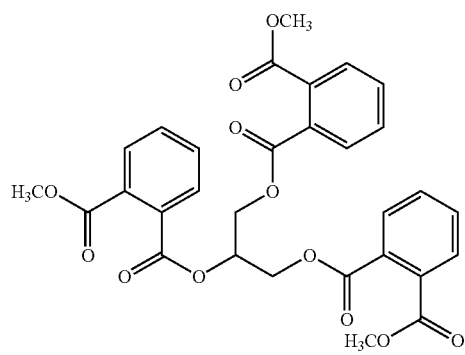

578.52

3

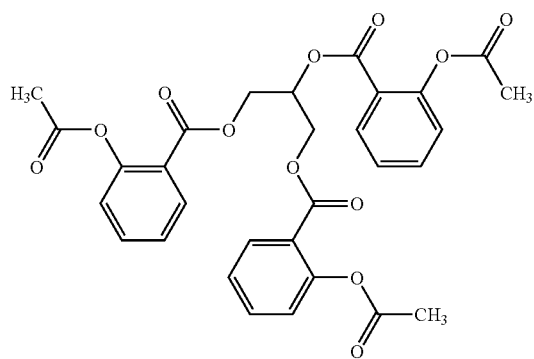

578.52

4

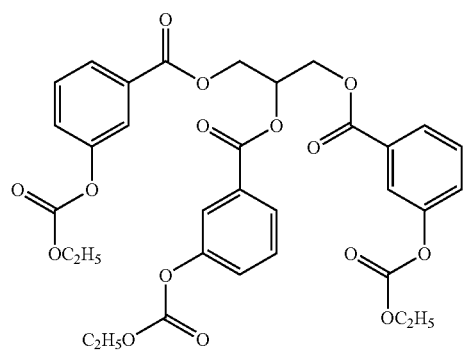

668.60

-continued
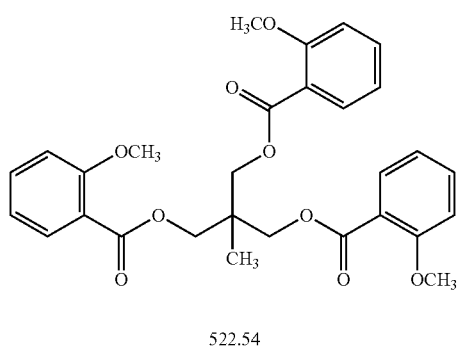
522.54
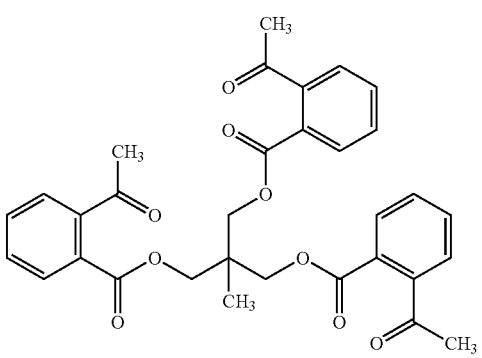
558.58
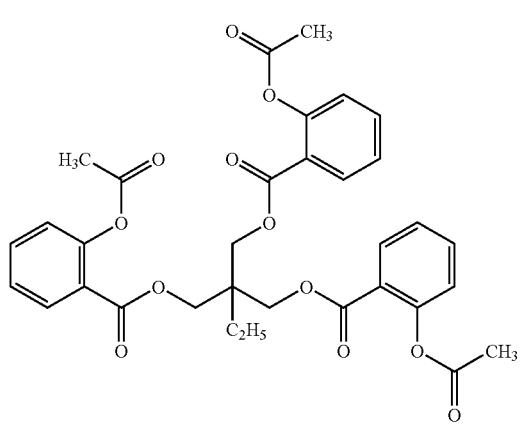
620.60
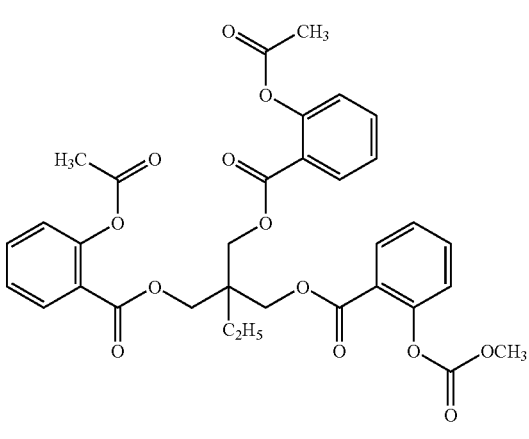
668.60
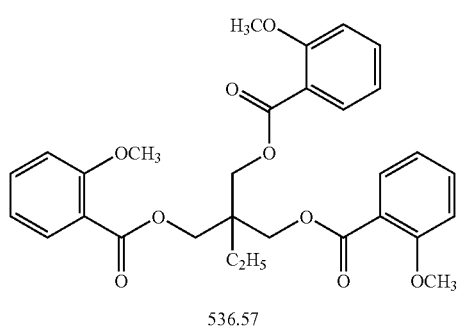
536.57
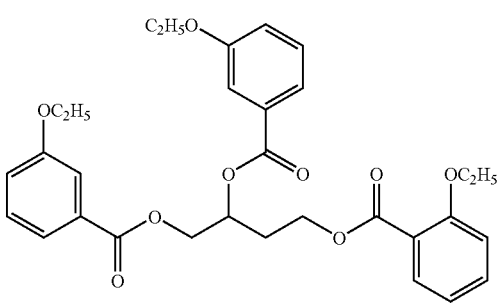
550.60
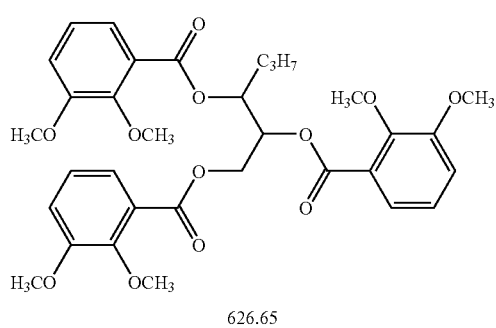
626.65
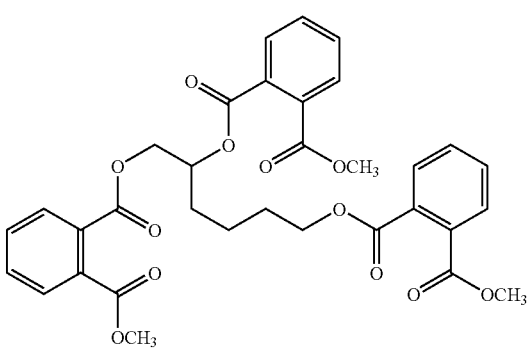
620.60

-continued
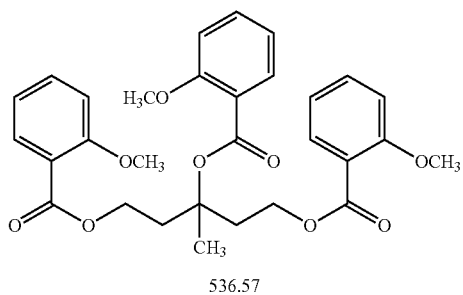
13
536.57
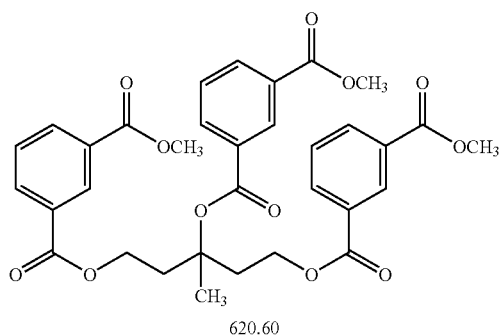
14
620.60
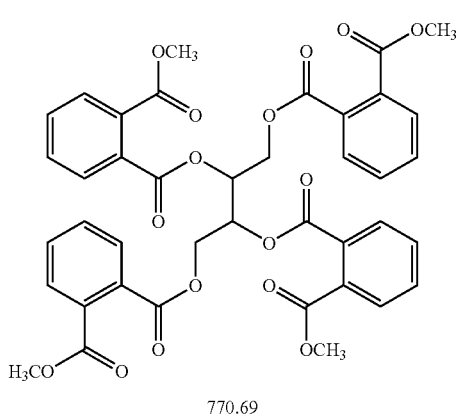
15
770.69
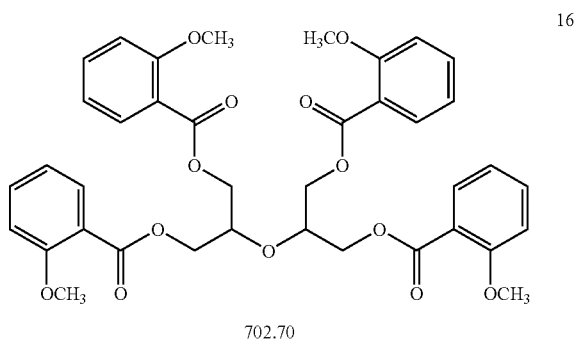
16
702.70
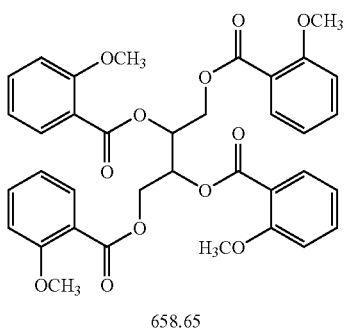
17
658.65
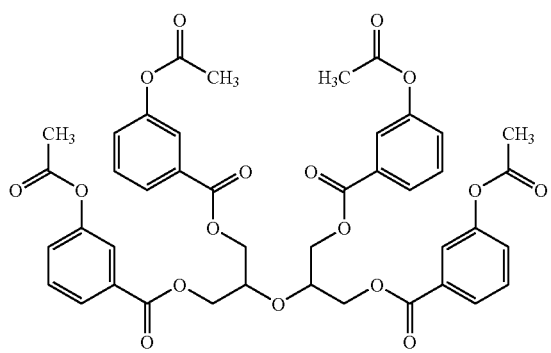
18
814.74
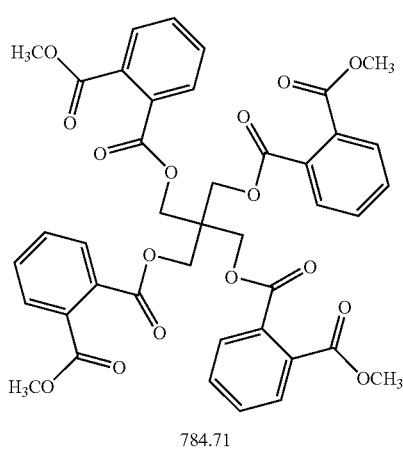
19
784.71
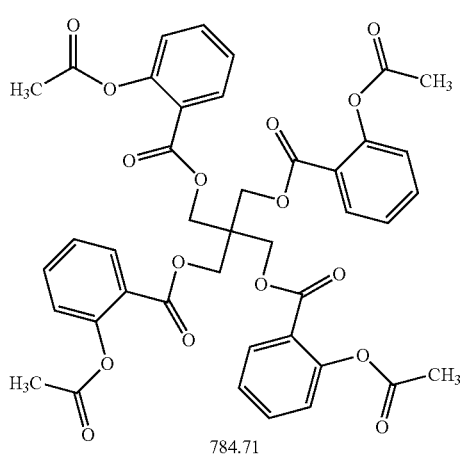
20
784.71

-continued
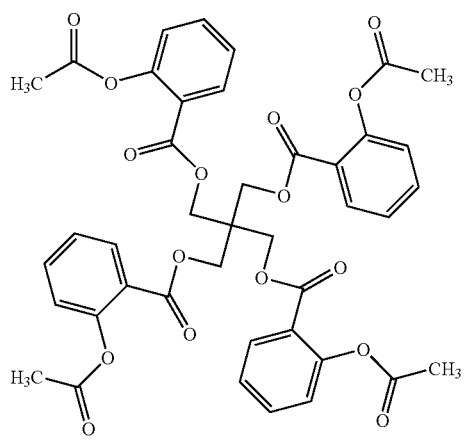
848.71
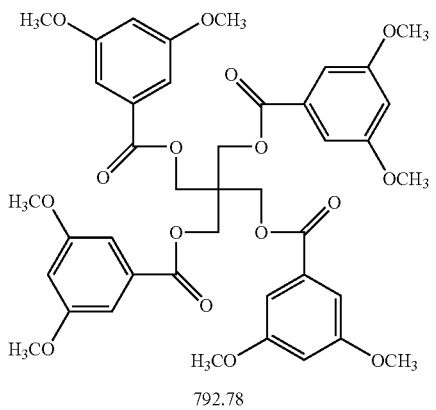
792.78
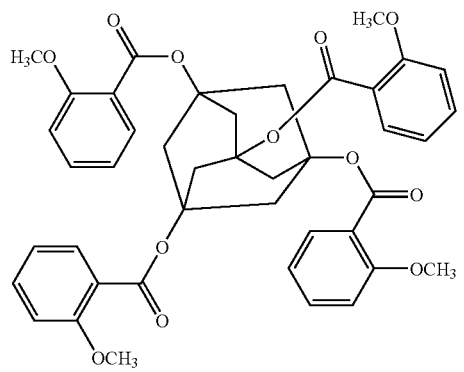
736.76
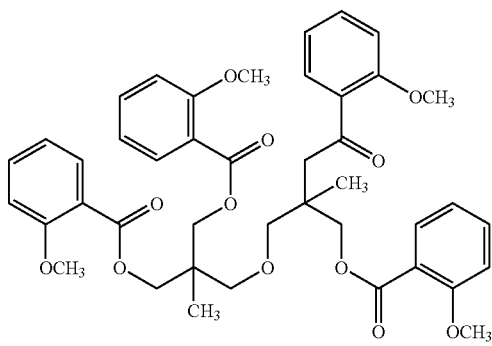
742.81
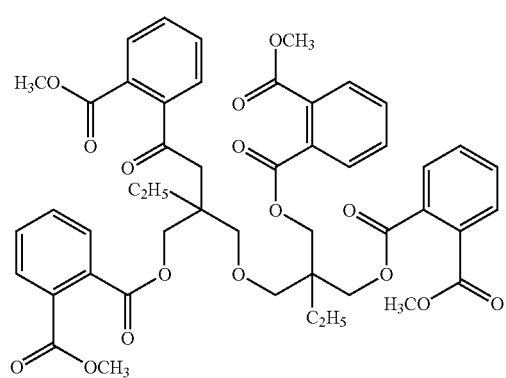
882.90
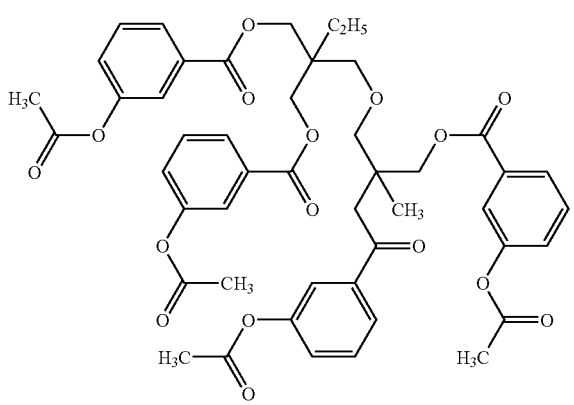
868.87

-continued
27
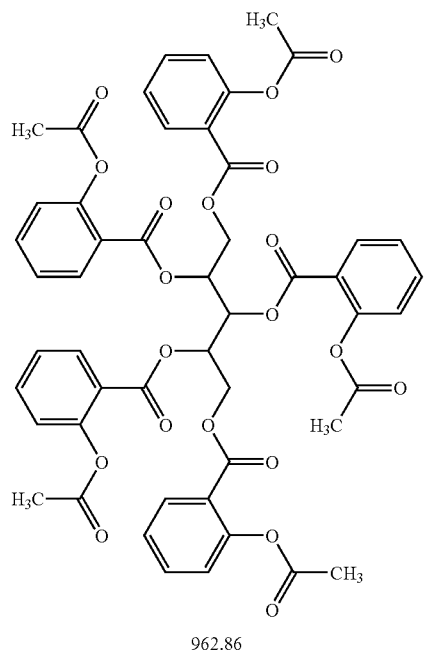
962.86
28
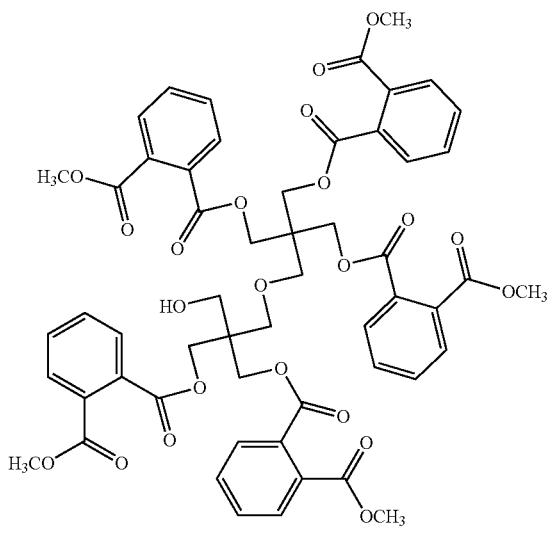
1064.99
29
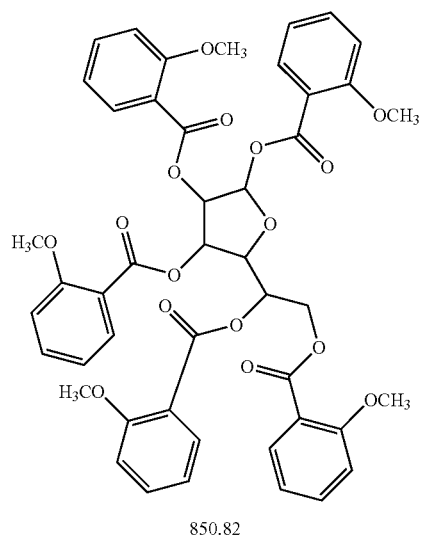
850.82
30
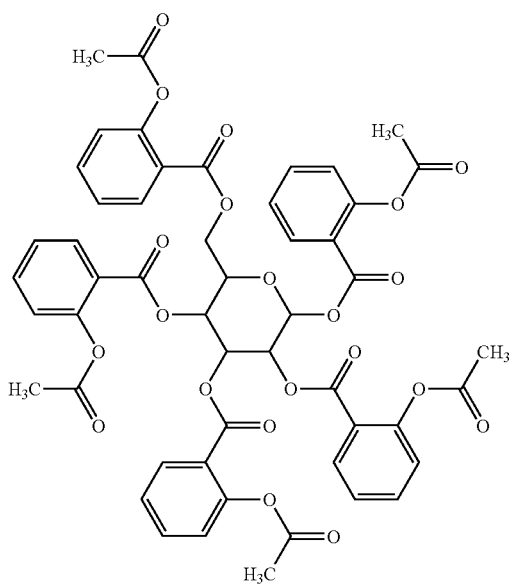
990.87

-continued
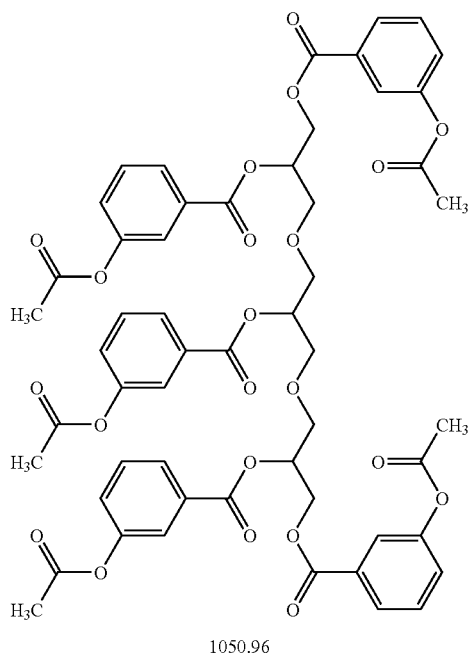
31
1050.96
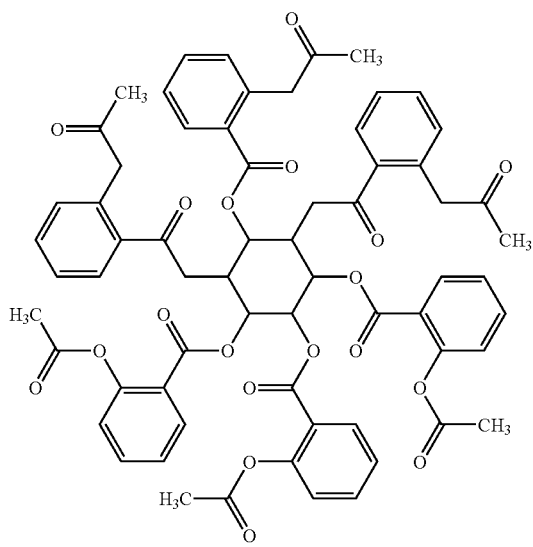
32
1153.01
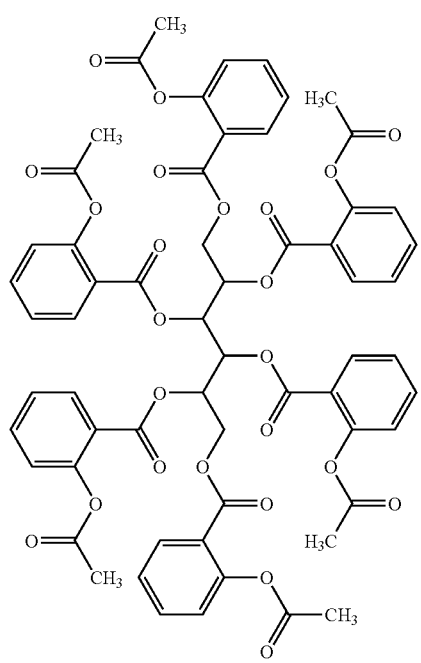
1155.02
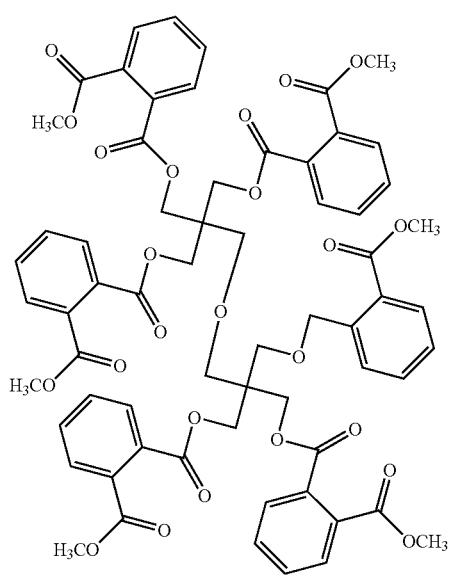
33
34
1213.15

35
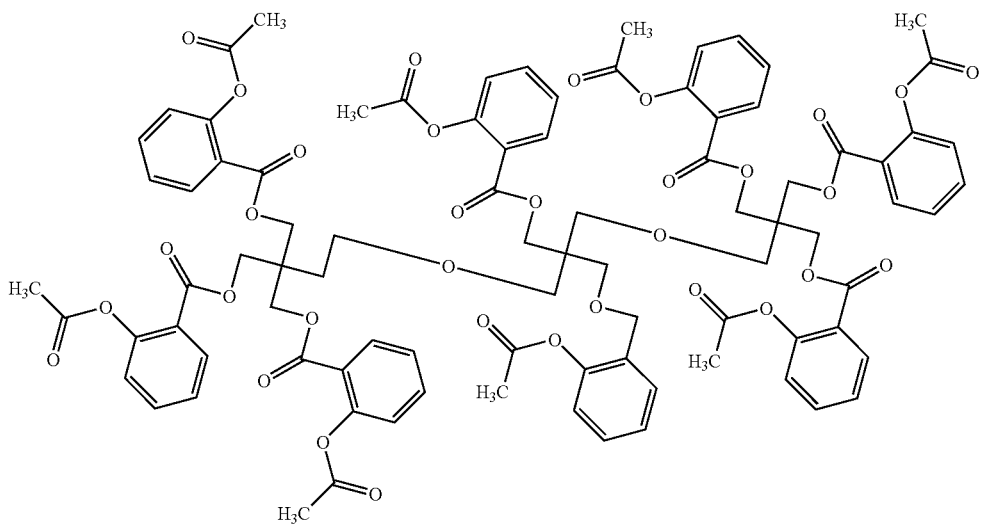
1669.59
36
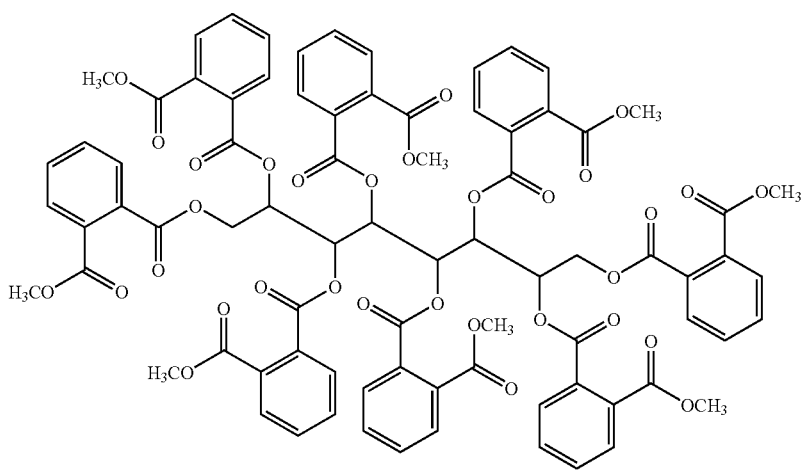
1539.36
37
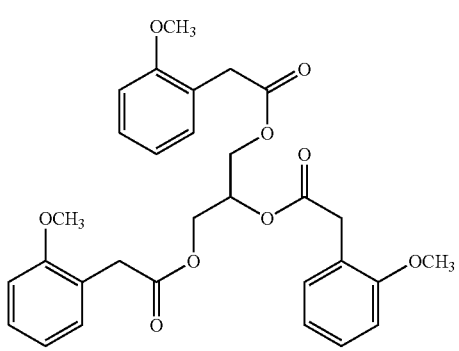
536.57
38
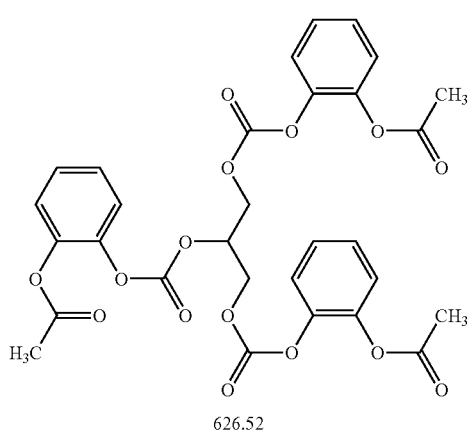
626.52

-continued
39
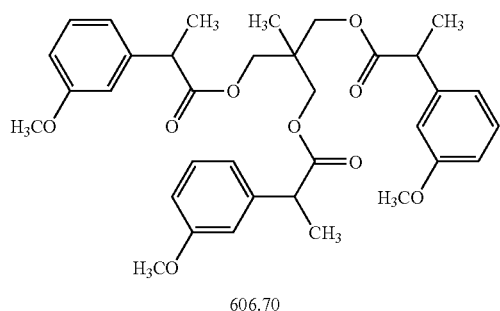
606.70
40
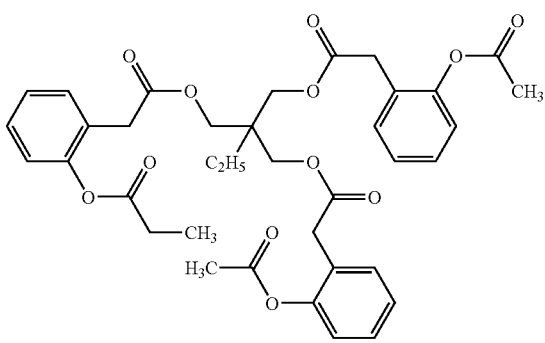
662.68
41
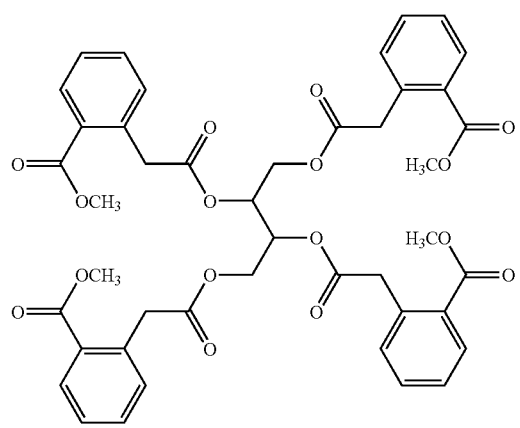
826.79
42
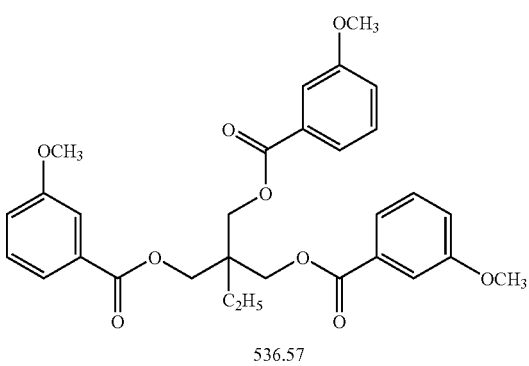
536.57
43
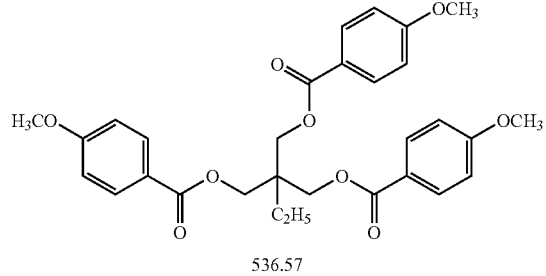
536.57
44
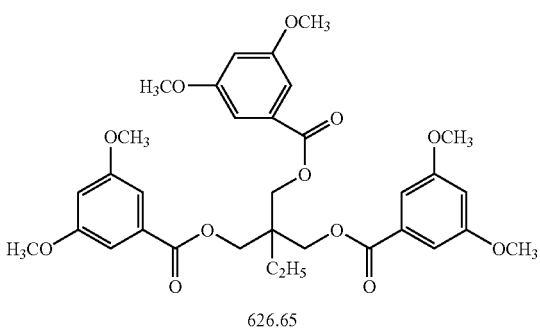
626.65
45
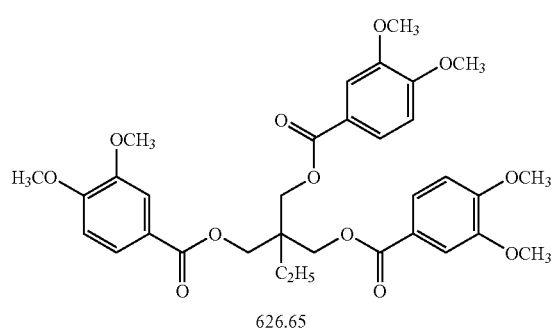
626.65
46
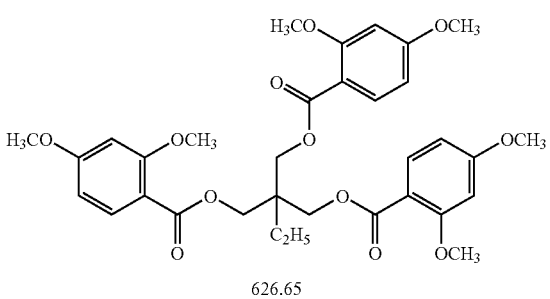
626.65

47
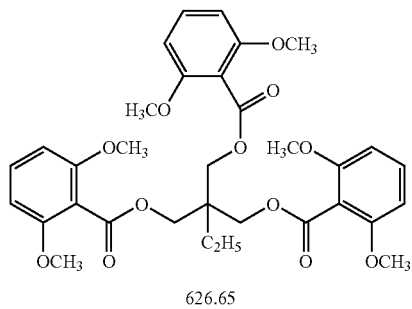
48
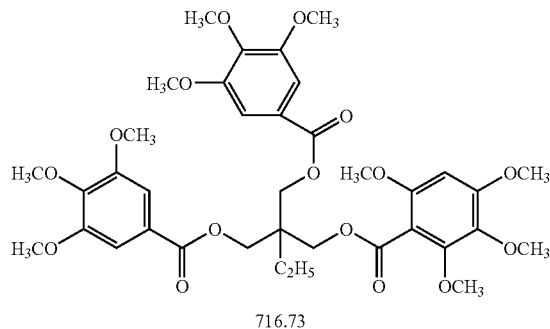
49
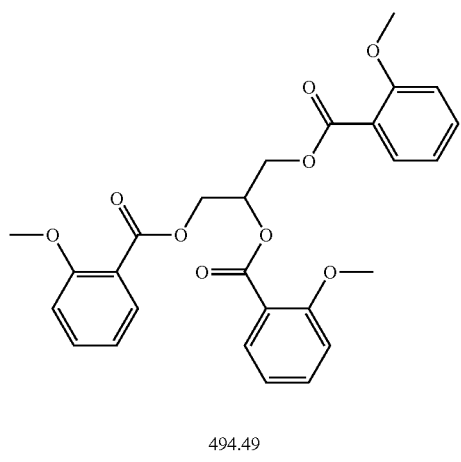
50
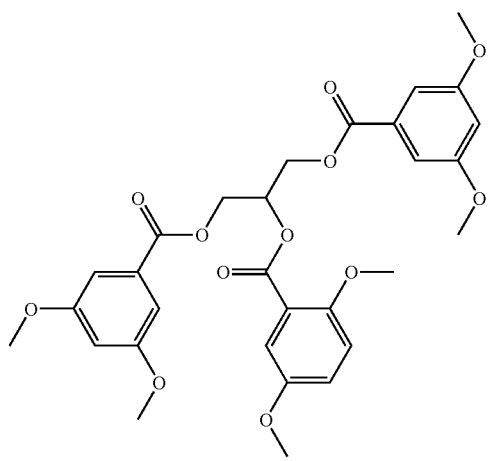
51
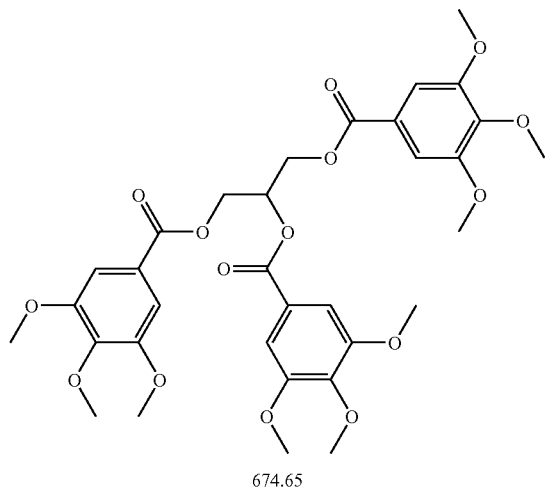
52
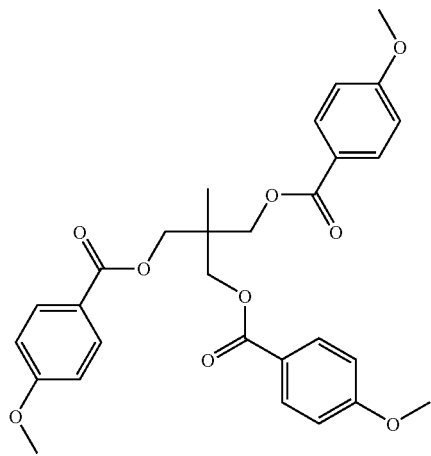

53
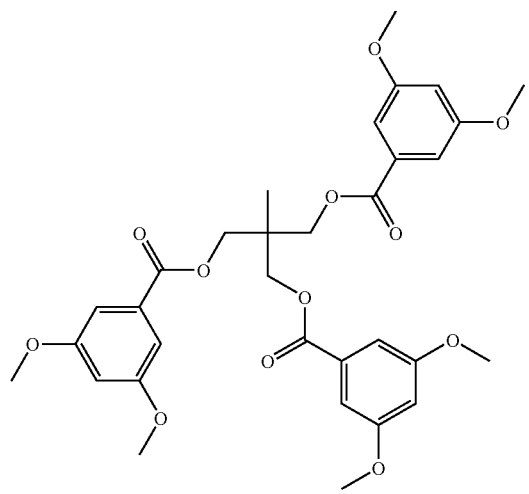
612.62
54
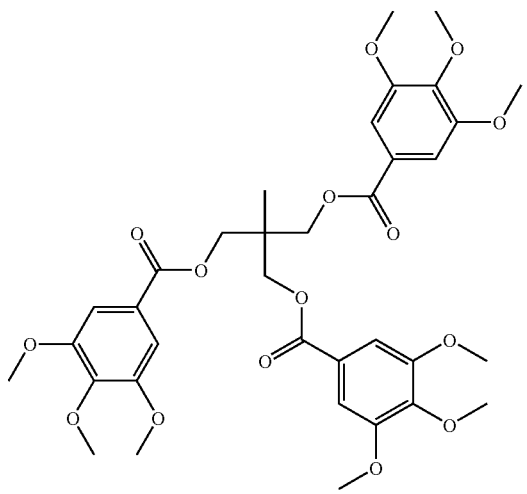
702.70
55
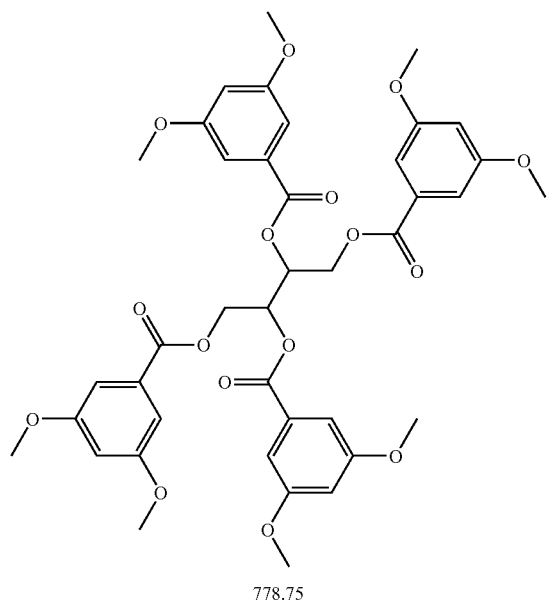
778.75
56
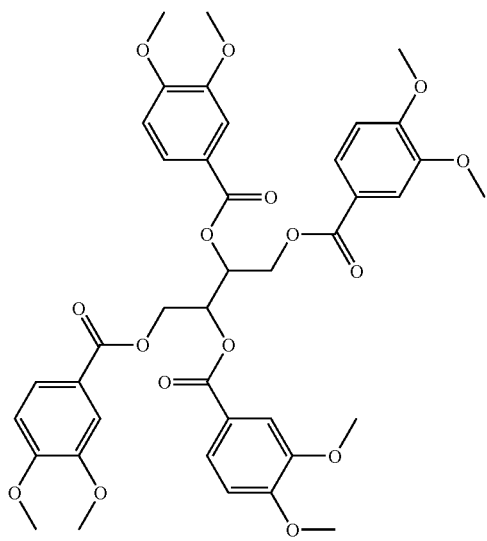
778.75

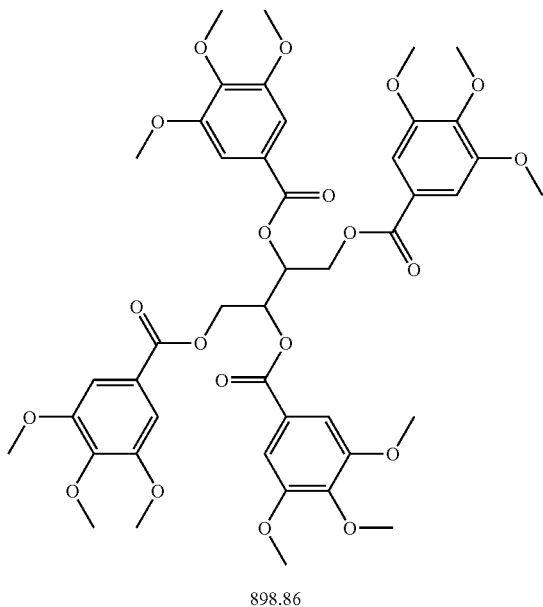

898.86

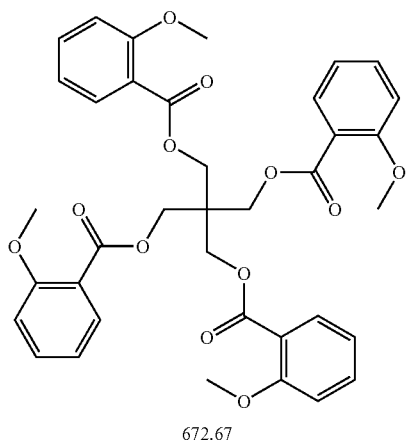

672.67

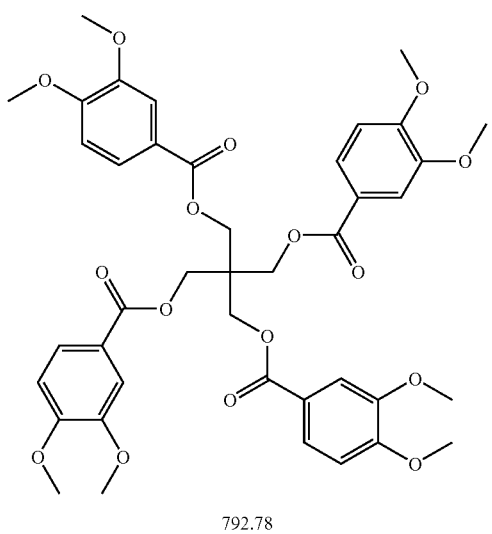

792.78

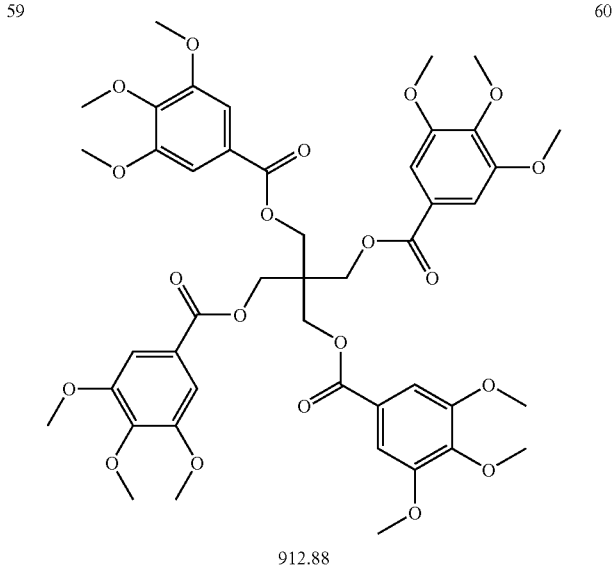

912.88

<Sugar Ester Based Plasticizers>

Sugar ester based plasticizers are compounds which are prepared by esterifying some or all OH groups in a compound (A) having a furanose or pyranose structure, or a compound (B) in which at least one of the furanose structure and the pyranose structure undergoes 2-12 combinations.

As examples of preferred compounds (A) and (B), listed may be the following, however examples are not limited thereto.

Examples of compounds (A) include glucose, galactose, mannose, fructose, xylose, and arabinose.

Examples of compounds (B) include lactose, sucrose, nystose, 1F-fructosylnystose, stachyose, maltitol, lactitol, lactulose, cellobiose, maltose, cellotriose, maltotriose, raffinose, and kesutose. Other than the above, listed are gentiobiose, gentiotriose, gentiotetraose, xylotriose, and galactosylsucrose. Of these compounds (A) and (B), preferred are compounds having both furanose and pyranose structures. Examples of preferred compounds include sucrose, kesutose, nystose, 1F-fructosylnytose, and stachyose. Of these, more preferred is sucrose. Further, one of the preferred embodiments is that compounds (B) are composed of 2 or 3 combinations of at least one of the furanose or pyranose structures.

Monocarboxylic acids which are employed to esterify some or all OH groups in compounds (A) and (B) are not particularly limited, and employed may be conventional aliphatic monocarboxylic acids, alicyclic monocarboxylic acids, and aromatic monocarboxylic acids. Those carboxylic acids may be employed individually or in combinations of at least two types.

As preferred aliphatic monocarboxylic acids, listed may be saturated fatty acids such as acetic acid, propionic acid, butyric acid, isobutyric acid, valeric acid, caproic acid, enanthic acid, caplyric acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanic acid, arachidic acid, behenic acid, lignoceric acid, cerotic acid, heptacosanic acid, montanic acid, melissic acid, or lucerric acid, as well as unsaturated fatty acids such as undecylenic acid, oleic acid, sorbic acid, linoleic acid, linolenic acid, arachidonic acid, or octenic acid.

As examples of preferred aliphatic monocarboxylic acids, listed may be cyclopentane carboxylic acids, cyclohexane carboxylic acids, and cyclooctane carboxylic acids as well as derivatives thereof.

As examples of preferred acid are monocarboxylic acids, listed may be aromatic monocarboxylic acids such as benzoic acid or toluic acid which are prepared by introducing an alkyl group, and an alkoxy group into the benzene ring of benzoic acid, as well as aromatic monocarboxylic acid having at least two benzene rings such as cinnamic acid, benzilic acid, biphenylcarboxylic acid, naphthalene carboxylic acid, or tetraline carboxylic acid and derivatives thereof. Specifically listed may be xylyl acid, hemellitic acid, mesitylenic acid, prehnitylic acid, γ-durylic acid, mesituic acid, α-isodutylic acid, cuminic acid, α-toluic acid, hydratropic acid, atropic acid, hydrocinnamic acid, salicylic acid, o-anisic acid, m-anisic acid, p-anisic acid, creosotic acid, o-homosalicylic acid, m-homosalicylic acid, p-homosalicylic acid, o-pyrocatechuic acid, γ-resorcylic acid, vanillic acid, isovanillic acid, veratoric acid, o-veratoric acid, gallic acid, asaronic acid, mandelic acid, homoanisic acid, homovanillic acid, homoveratoric acid, o-homoveratoric acid, phthalonic acid, and p-coumaroic acid. Of these, specifically preferred is benzoic acid.

Of esterified compounds which are prepared by esterifying above compounds (A) and (B), preferred are acetylated compounds into which acetyl group are introduced via esterification.

The manufacturing methods of these acetylated compounds are described, for example, in JP-A No. 8-245678.

In addition to the esterified compounds of the above compounds (A) and (B), it is possible to employ esterified oligosaccharide as a compound in which at least one of the fructose structure or the pyranose structure according to the present invention is subjected to 2-12 combinations.

Oligosaccharide is manufactured in such a way that starch and sucrose are subjected to action of enzymes such as amylase. Examples of oligosaccharide applicable to the present invention include malto-oligosaccharide, fructo-oligosaccharide, galacto-oligosaccharide, and xylo-oligosaccharide.

It is possible to acetylate oligosaccharide via the same method as for above compounds (A) and (B).

An example of the manufacturing method of an esterified compound will now be described.

Acetic anhydride (200 ml) is dripped into a solution which is prepared by adding pyridine (100 ml) to glucose (29.8 g, 166 mmol) and reaction is performed for 24 hours. Thereafter, the resulting solution is concentrated via evaporation, and poured into iced water. After being allowed to stand for one hour, filtration is carried out via a glass filter, and solids are separated from water. The solids on the glass filter are dissolved in chloroform, and until the resulting solution exhibits neutral, solution separation is carried out via cool water. After separating off the organic layer, desiccation is carried out via anhydrous sodium sulfate. After removing anhydrous sodium sulfate via filtration, chloroform is removed via evaporation, followed by reduced pressure drying, whereby it is possible to prepare glucose pentaacetate (58.8 g, 150 mmol, 90.9%). Instead of above acetic anhydride, it is possible to employ any of the above-mentioned monocarboxylic acids.

Specific examples of sugar-esterified compounds are listed below, however the present invention is not limited thereto.

Compound 1

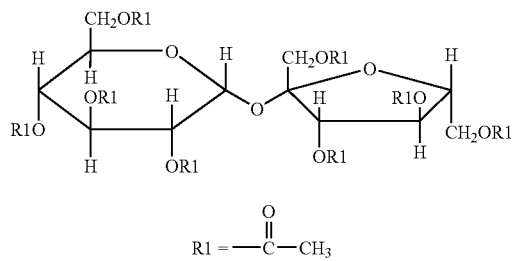

Compound 2

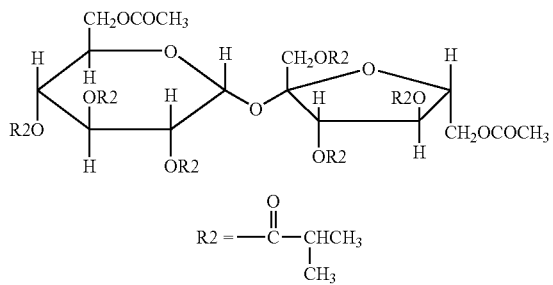

Compound 3

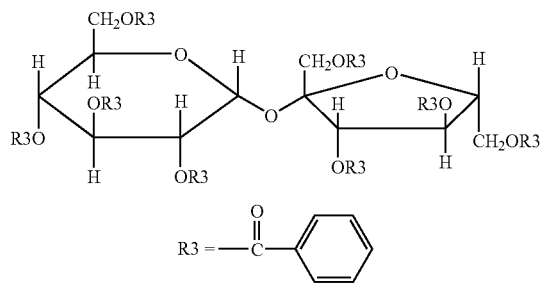

Compound 4

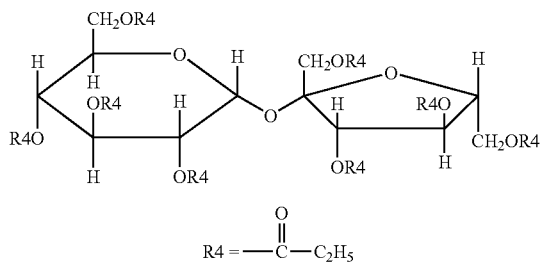

-continued
Compound 5
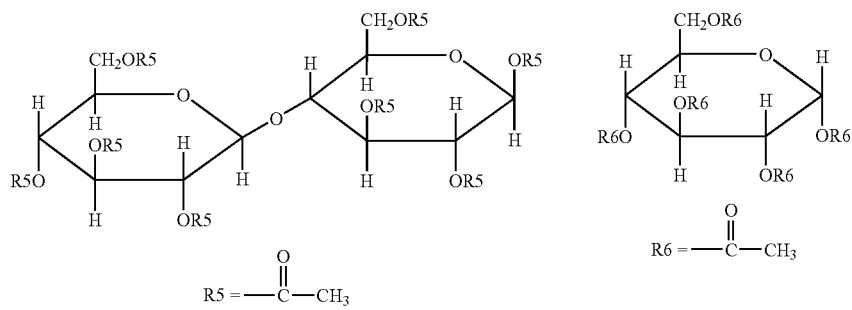
Compound 6
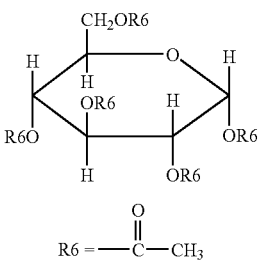
Compound 7
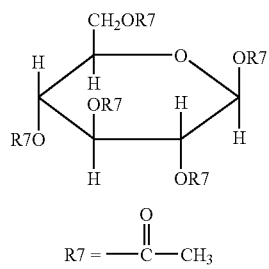
Compound 8
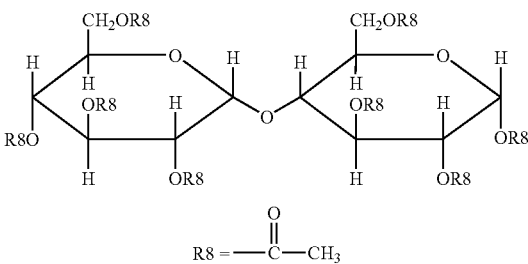
Compound 9
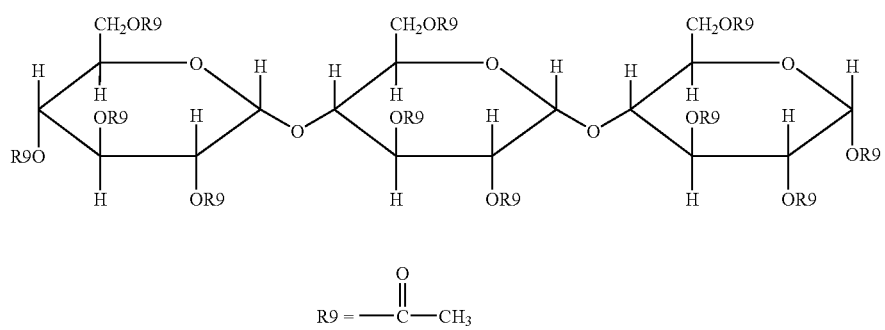
Compound 10
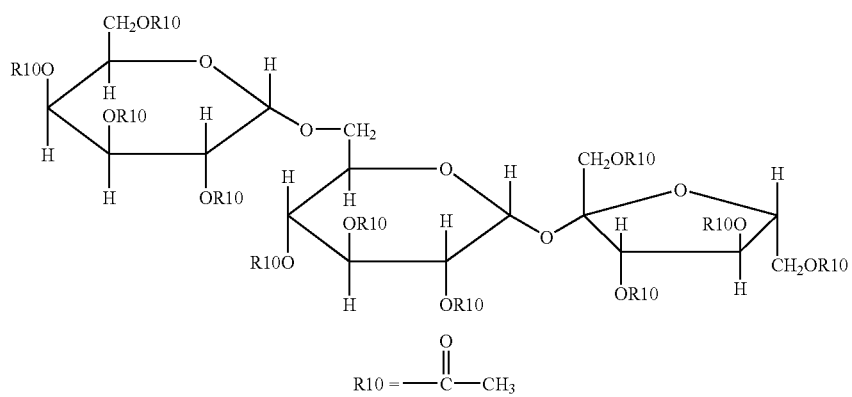

-continued
Compound 11
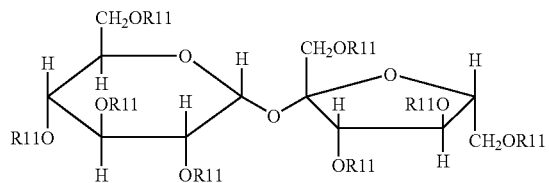
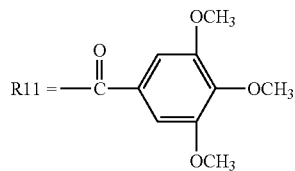
Compound 12
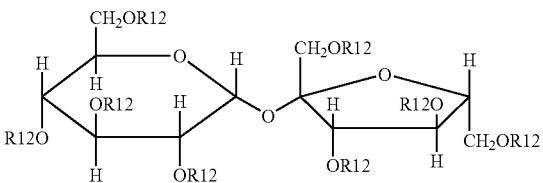
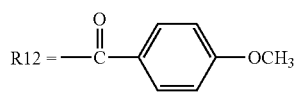
Compound 13
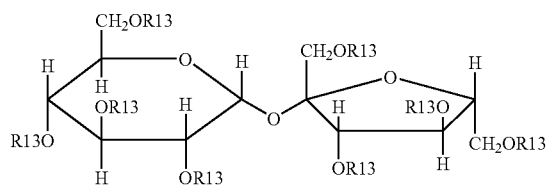
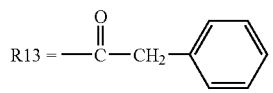
Compound 14
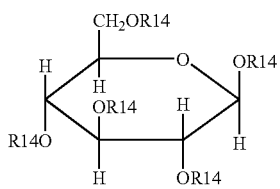
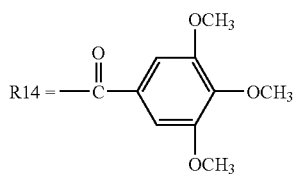
Compound 15
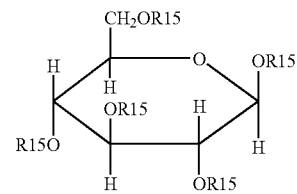
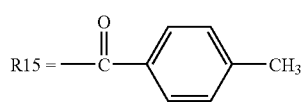
Compound 16
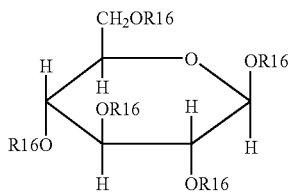
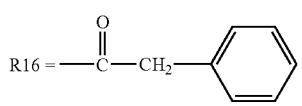
Compound 17
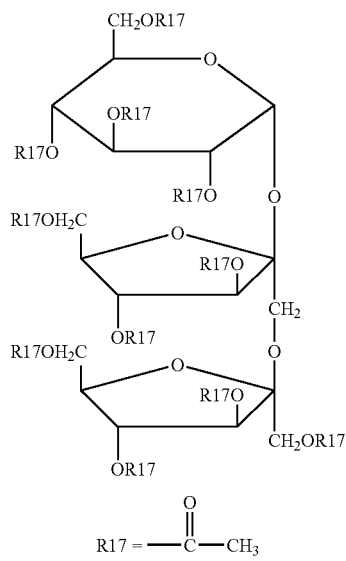

-continued
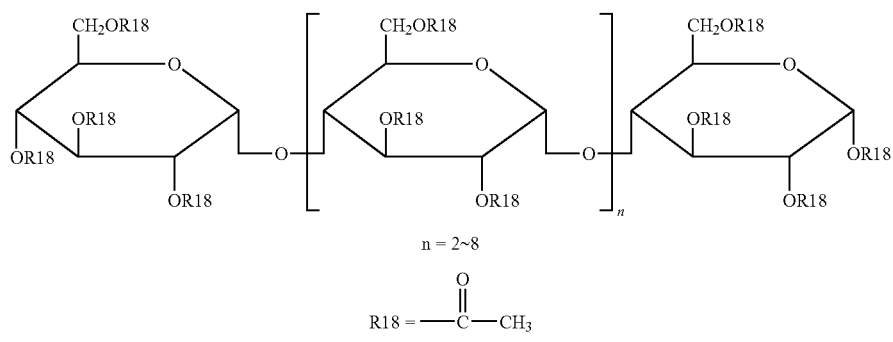
Compound 18
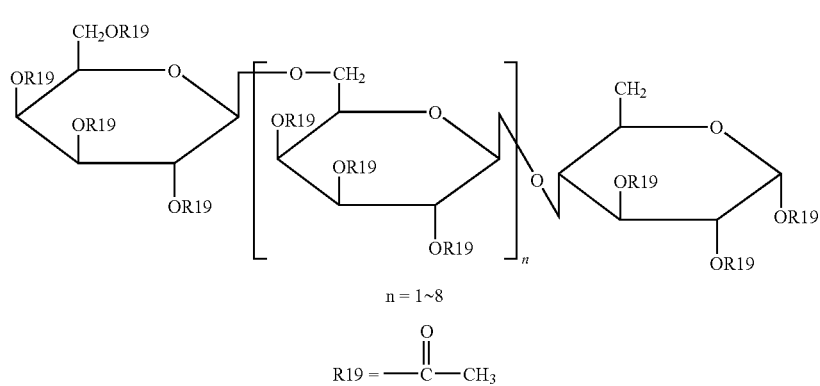
Compound 19
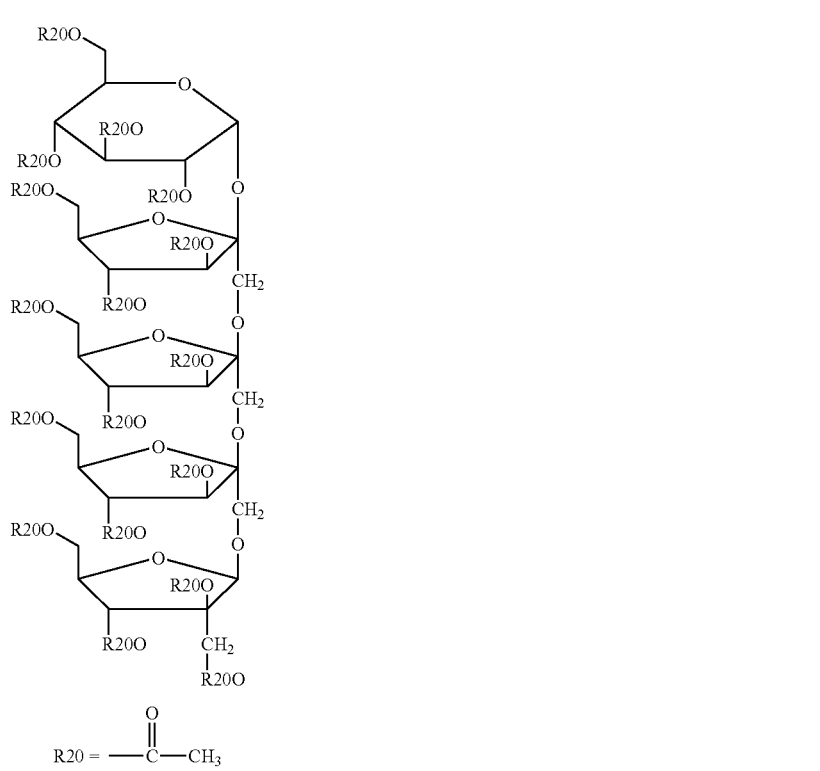
Compound 20

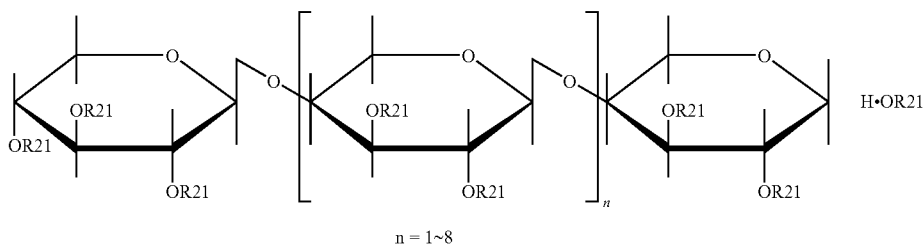

Compound 21

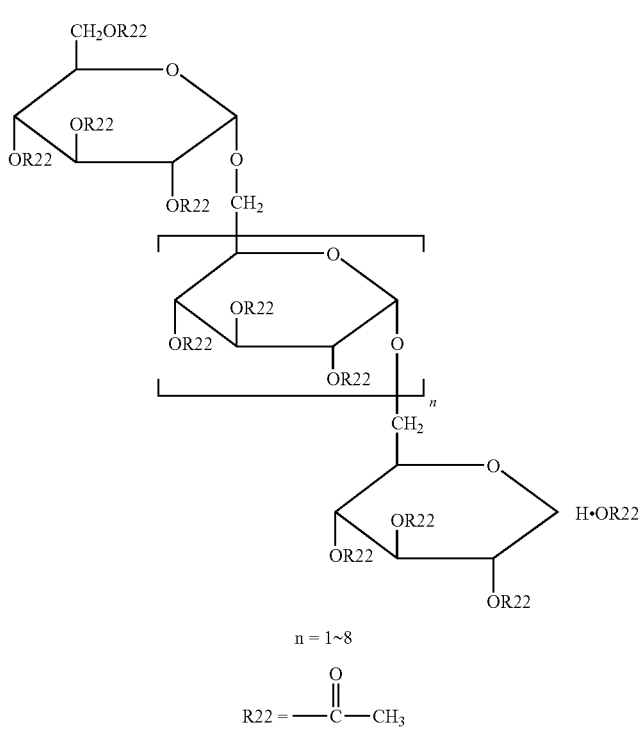

Compound 22

The content of the above sugar ester based plasticizers in the polarizing plate protective film of the present invention is preferably in the range of 1-30% by weight, but is more preferably in the range of 5-30% by weight. The content within the above range is preferred since excellent effects of the present invention are exhibited and no bleeding-out occurs. Further, it is possible to employ the above sugar ester based plasticizers together with other plasticizers.

(Other Plasticizers)

As other plasticizers employed in the present invention, listed are phosphoric acid ester based plasticizers and polymer plasticizers.

Phosphoric acid ester based plasticizers: Specifically listed are phosphoric acid alkyl esters such as triacetyl phosphate or tributyl phosphate; phosphoric acid cycloalkyl esters such as tricyclepentyl phosphate or cyclohexyl phosphate; and phosphoric acid aryl esters such as triphenyl phosphate, tricresyl phosphate, cresyl phenyl phosphate, octyl diphenyl phosphate, diphenyl biphenyl phosphate, trioctyl phosphate, tributyl phosphate, naphthyl phosphate, trixylyl phosphate, or trisortho-biphenyl phosphate. These substituents may be the same or different, and may be further substituted. Further, an alkyl group, a cycloalkyl group, and an aryl group may be in combinations, and substituents may be jointed with each other via a covalent bond.

Further listed are alkylenebis(dialkyl phosphate) such as ethylenebis(dimethyl phosphate) or butylenebis(diethyl phosphate); alkylenebis(diaryl phosphate) such as ethylenebis(diphenyl phosphate), or propylenebis(dinaphthyl phosphate); arylenebis(dialkyl phosphate) such as phenylenebis(dibutyl phosphate) or biphenylenebis(dioctyl phosphate); arylenebis(diaryl phosphate such as phenylenebis (diphenyl phosphate) or naphthylenebis(ditolyl phosphate). These substituents may be the same or different, and may be further substituted. Further, an alkyl group, a cycloalkyl group, and an aryl group may be in combinations, and substituents may be jointed with each other via a covalent bond.

Further, the partial structure of phosphoric acid esters may be a part of a polymer or may be subjected to regular pendant. Further, additives such as antioxidants, acid scavengers, and UV absorbers may be introduced into the part of the molecular structure. Of the above compounds, preferred are phosphoric acid aryl esters and arylenebis(diaryl phosphate), and in practice, preferred are triphenyl phosphate and phenylenebis(diphenyl phosphate).

As polymer plasticizers, specifically listed are aliphatic hydrocarbon based polymers, alicyclic hydrocarbon based polymers, acryl based polymers such as ethyl polyacrylate or methyl polymethacrylates, vinyl based polymers such as polyN-vinylpyrrolidone, styrene based polymers such as polystyrene or poly4-hydroxystyrene, polyesters such as polybutylene succinate, polyethylene terephthalate, or polyethylene naphthalate, polyethers such as polyethylene oxide or polypropylene oxide, polyamide, polyurethane, and polyurea. The number average molecular weight is preferably 1,000-500,000, but is most preferably 5,000-200,000. When it is at least 1,000, sufficient volatility is provided, while when it is at most 500,000, the desired plasticization capability may be realized to exhibit effects to enhance mechanical properties of cellulose ester films. These polymer plasticizers may be homopolymers composed of one repeating unit or copolymers having a plurality of repeating structures. Further, the above polymers may be employed in combinations of at least two types.

In the present invention, it is preferable to remove impurities such as residual acids, inorganic salts, and low molecular weight organic compounds in the same manners as for the above cellulose esters. The purity is more preferably at least 99%. The content of residual acids and water is preferably 0.01-100 ppm. During melt-casting of cellulose esters, it is possible to retard thermal degradation, and film production stability as well as optical physical properties and mechanical physical properties are enhanced.

(Stabilizers)

<Antioxidants>

Decomposition of cellulose esters according to the present invention is enhanced not only via heat but also via oxygen under high temperature circumstances where melt film production is carried out. Consequently, it is preferable that the polarizing plate protective film of the present invention incorporates antioxidants as a stabilizer.

Useful antioxidants in the present invention may be employed without any of the particular limitations as long as they are compounds which retard degradation of melt molding materials due to oxygen. Of these, useful antioxidants include phenol based compounds, hindered amine based compounds, phosphor based compounds, sulfur based compounds, heat resistant processing stabilizers, and oxygen scavengers. In the present invention, of these, it is preferable to incorporate at least one antioxidant (being a stabilizer) selected particularly from phenol based compounds, hindered amine based compounds, and phosphor based compounds. By incorporating these compounds, it is possible to minimize coloration and a decrease in strength due to thermal and thermal oxidation degradation during melt molding without a decrease in transparency and heat resistance. These antioxidants may be employed individually or in combinations of at least two types.

As the phenol based compounds are known ones and examples thereof include those described in sections 12-14 of U.S. Pat. No. 4,839,405 and include 2,6-dialkylphenol derivative compounds. Of such compounds, as preferred compounds listed may be the compounds represented by the following Formula (p).

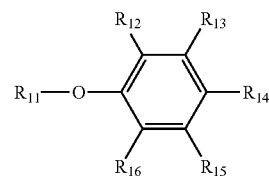

Formula (p)

wherein $R_{11}$, $R_{12}$, $R_{13}$, $R_{14}$, and $R_{15}$ each represents a substituent. Substituents include a hydrogen atom, a halogen atom (for example, a fluorine atom and a chlorine atom), an alkyl group (for example, a methyl group, an ethyl group, an isopropyl group, a hydroxyethyl group, a methoxyethyl group, a trifluoromethyl group, and a t-butyl group), a cycloalkyl group (for example, a cyclopentyl group and a cyclohexyl group), an aralkyl group (for example, a benzyl group and a 2-phenetyl group), an aryl group (for example, a phenyl group, a naphthyl group, a p-tolyl group, and a p-chlorophenyl group), an alkoxy group (for example, a methoxy group, an ethoxy group, an isopropoxy group, and a butoxy group), an aryloxy group (for example, a phenoxy group), a cyano group, an acylamino group (for example, an acetylamino group and a propionylamino group), an alkylthio group (for example, a methylthio group, an ethylthio group, and a butylthio group), an arylthio group (for example, a phenylthio group), a sulfonylamino group (for example, a methanesulfonylamino group and a benzenesulfonylamino group), a ureido group (for example, a 3-methylureido group, a 3,3-dimethylureido group, and a 1,3-dimethylureido group), a sulfamoylamino group (a dimethylsulfamoylamino group), a carbamoyl group (for example, a methylcarbamoyl group, an ethylcarbamoyl group, and a dimethylcarbamoyl group), a sulfamoyl group (for example, an ethylsulfamoyl group and a dimethylsulfamoyl group), an alkoxycarbonyl group (for example, a methoxycarbonyl group and an ethoxycarbonyl group), an aryloxycarbonyl group (for example, phenoxycarbonyl group), a sulfonyl group (for example, a methanesulfonyl group, a butanesulfonyl group, and a phenylsulfonyl group), an acyl group (for example, an acetyl group, a propanoyl group, and a butyroyl group), an amino group (a methylamino group, an ethylamino group, and a dimethylamino group), a cyano group, a hydroxyl group, a nitro group, a nitroso group, an amine oxide group (for example, a pyridine-oxide group), an imido group (for example, a phthalimido group), a disulfide group (for example, a benzene sulfide group and a benzothiazolyl-2-disylfide group) a carboxyl group, a sulfo group, and a heterocyclyl group (for example, a pyrrole group, a pyrrolidyl group, a pyrazolyl group, an imidazolyl group, a pyridyl group, a benzimidazolyl group, and a benzoxazolyl group). These substituents may be further substituted. $R_{11}$ is a hydrogen atom, and $R_{12}$ and $R_{16}$ are preferably phenol based compounds which are t-butyl groups. Specific examples of the phenol based compounds include n-octadecyl 3-(3,5-di-t-butyl-4-hydroxyphenol)propionate, n-octadecyl 3-(3,5-di-t-butyl-4-hydroxyphenol)-acetate, n-octadecyl 3,5-di-t-butyl-4-hydoxybenzoate, n-hexyl 3,5-di-t-butyl-4-hydroxyphenylbenzoate, n-dodecyl 3,5-di-t-butyl-4-hydroxyphenylbanzoate, neo-dodecyl 3-(3,5-di-t-butyl-4-hyfroxyphenyl)propionate, dodecyl ⊕(3,5-di-t-butyl-4-hydroxyphenyl)propionate, ethyl α-(4-hydroxy-3,5-di-t-butylphenyl)isobutylate, octadecyl α-(4-hydroxy-3,5-di-t-butylphenyl)isobutylate, octadecyl α-(4-hydroxy-3,5-di-butyl-4-hydroxyphenyl)propionate, 2-(n-octylthio)ethyl 3,5-di-t-butyl-4-hydroxy-bemzoate, 2-(n-octylthio)ethyl 3,5-dit-butyl-4-hydroxyphenylacetate, 2-(n-octadecylthio)ethyl 3,5-di-butyl-4-hydroxyphenylacetate, 2-(n-octadecylthio) ethyl 3,5-di-t-butyl-4-hydroxy-benzoate, 2-(2-hydroxyethylthio)ethyl 3,5-di t-butyl-4-hydoxybanzoate, diethylglycol bis-(3,5-di-t-butyl-4-hydroxy-phenyl)propionate, 2-(n-octadecylthio)ethyl 3-(3,5-di-t-butyl-4-hydroxyphenyl)propionate, stearylamido-N,N-bis-[ethylene 3-(3,5-di-t-butyl-4-hydroxyphenyl)propionate], N-bis[ethylene 3-(3,5-di-t-butyl-4-hydroxyphenyl)propionate], n-butylamino N,N-bis [ethylene 3-(3,5-di-t-butyl-4-hydroxyphenyl)propionate], 2-(2-stearoyloxyethlthio)ethyl 3,5-di-t-butyl-4-hydroxybenzoate, 2-(2-stearoyloxyethylthio)ethyl 7-(3-methyl-5-t-butyl-4-hydroxyphenyl)heptanoate, 1,2-propylene glycol bis-[3-(3,5-di-t-butyl-4-hydroxyphenyl)propionate], ethylene glycol bis-[3-(3,5-di-t-butyl-4-hydroxyphenyl)propionate], neopentyl glycol bis-[3-(3,5-di-t-butyl-4-hydroxyphenyl) propionate], ethylene glycol bis-(3,5-di-t-butyl-4-hydroxyphenyl acetate), glycerin-1-n-octadecanoate 2,3-bis-(3,5-di-t-butyl-4-hydroxyphenyl acetate, pentaerythritol-tetrakis-[3-(3',5'-di-t-butyl-4'-hydroxyphenyl)propionate], 1,1,1-trimethylolethane-toris-[3-(3,5-di-t-butyl-4-hydroxyphenyl) propionate], sorbitol hexa-[3,5-di-t-butyl-4-hydroxyphenyl] propionate], 2-hydroxyethyl 7-(3-methyl-5-t-butyl-4-hydroxyphenyl)propionate, 2-stearoyloxyethyl 7-(3-methyl-5-t-butyl-4-hydroxyphenyl)heptanoate, 1,6-n-hexanediol-bis[3',5'-di-t-butyl-4-hydroxyphenyl]propionate], and pentaerythritol-tetrakis(3,5-di-t-butyl-4-hydroxyhydrocinnamate. The above type phenol compounds are commercially available under trade names such as "IRGANOX 1076" and "IRGANOX 1010" from Ciba Specialty Chemicals Corp.

As hindered amine based compounds employed in the present invention, preferred the compounds represented by the following Formula (h).

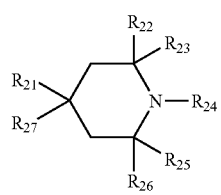

Formula (h)

wherein $R_{21}$, $R_{22}$, $R_{23}$, $R_{24}$, $R_{25}$, $R_{25}$, and $R_{27}$ each represents a substituent. Substituents, as described herein, include the same groups as those described in Formula (p). It is preferable that $R_{24}$ represents a hydrogen atom or a methyl group, $R_{27}$ represents a hydrogen atom, and $R_{22}$, $R_{23}$, $R_{25}$, and $R_{26}$ each represents a methyl group.

Specific examples of hindered amine based compounds include bis(2,2,6,6)-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-pypridyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-pypridyl)2-(3,5-di-t-butyl-4-hydroxybenzyl)-2-butylmalonate, bis(1-acroyl-2,2,6,6-tetramethyl-4-piperidyl)2,2-bis(3,5-di-t-butyl-4-hydroxybenzyl)-2-butyl malonate, bis(1,2,2,6,6-pentamethyl-4-piperidyl)decandioate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpyperidine, 2-methyl-2-(2,2,6,6-tetramethyl-4-piperidyl)amino-N-(2,2,6,6-tetramethyl-4-piperidyl)propionamido, tetrakis(2,2,6,6-tetramethyl-4-piperidyl)1,2,3,4-butanetetracarboxylate, and tetrakis(1,2,2,5,6-pentamethyl-4-piperidyl)1,2,3,4-butanetetracarboxylate. Further, polymer compounds may be acceptable and specific examples thereof include, but are not limited to, N,N', N'',N'''-tetrakis-[4,6-bis-(N-methyl-2,2,6,6-tetramethylpyperodine-4-yl)amino]-triazine-2-yl]4,7-diazadecane-1,10-diamine, polycondensation products of dibutylamine, 1,3,5-triazine.N,N'-bis(2,2,6,6-tetramethyl-4-piperidyl)-1,6-hexamethylenediamine, and N-(2,2,6,6-tetramethyl-4-piperidyl)butylamine, polycondensation products of dibutylamine, 1,3,5-triazine, N,N'-bis(2,2,6,6-tetramethyl-4-tetramethyl-4-piperidyl)butylamine, poly[{(1,1,3,3-tetramethyl)amino-1,3,5-triazine-2,4-diyl}(2,2,6,6-tetramethyl-4-piperidyl}imino){2,2,6,6-tetramethyl-4-piperidyl}imino}hexamethylene{(2,2,6,6-tetramethyl-4-piperidyl)amino}], 1,6-hexanediamine-N,N'-bis(2,2,6,6-tetramethyl-4-piperidyl and morpholine-2,4,6-trichloro-1,3,5-triazine; high molecular weight HALS such as poly[(6-morpholino-s-triazine-2,4-diyl)][(2,2,6,6-tetramethyl-4-piperidyl)imino]-hexamethylene{(2,2,6,6-tetramethyl-4-piperidyl)imino]] in which a plurality of piperidine rings are combined via a triazine skeleton; polymers of dimethyl succinate and 4-hydroxy-2,2,6,6-tetramethyl-1-pyperidine ethanol, and compounds in which piperidine rings are combined via an ester bond such as a mixed ester compound of 1,2,3,4-butanetetracarboxylic acid and 1,2,2,6, 6-pentamethyl-4-piperidinol, and 3,9-bis(2-hydroxy-1,1-dimethylethyl)-2,4,8,10-tetraoxuspyro[5,5]undecane. Of these, preferred are polycondensation products of dibutylamine, 1,3,5-triazine, and N,N'-bis(2,2,6,6-tetramethyl-4-piperidyl)butylamine, poly[{(1,1,3,3-tetramethylbutyl)amino-1,3,5-triazine-2,4diyl}{(2,2,6,6-tetramethyl-4-piperidyl) amino}hexamethylene{(2,2,6,6-tetramethyl-4-piperidyl) amino}], and polymers of dimethyl succinate and 4-hydroxy-2,2,6,6-tetramethyl-1-piperidine ethanol and further those of an number average molecular weight (Mn) of 2,000-5,000 are preferred.

The above type hindered phenol compounds are commercially available under the trade names, for example, "TINUVIN 144" and "TINUVIN 770" from Ciba Specialty Chemicals Inc., as well as "ADK STAB LA-52" from Asahi Denka Kogyo K.K.

As phosphorous based compounds preferred are those which have, in the molecule, the partial structure represented by the following formulas (r-1), (r-2), (r-3), (r-4), and (r-5).

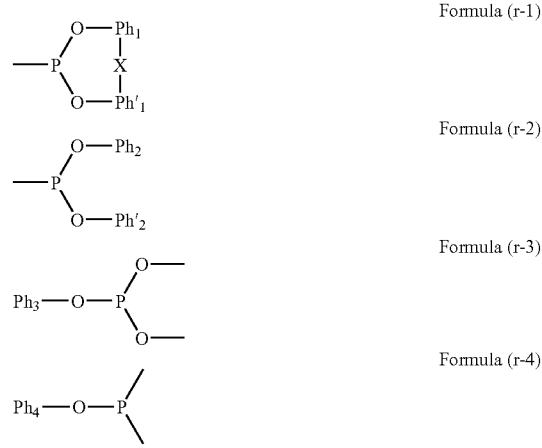

-continued

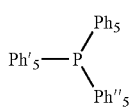

Formula (r-5)

In the formula, $Ph_1$ and $Ph'_1$ each represents a phenylene group and the hydrogen atom in the aforesaid phenylene group may be substituted with an alkyl group having 1-8 carbon atoms, a cycloalkyl group having 5-8 carbon atoms, a alkylcycloalkyl group having 6-12 carbon atoms, or an aralkyl group having 7-12 carbon atoms. $Ph_1$ and $Ph'_1$ may be the same or different. X represents a single bond, a sulfur atom, or —$CHR_6$— wherein $R_6$ represents a hydrogen atom, an alkyl group having 1-8 carbon atoms, or a cycloalkyl group having 5-8 carbon atoms. $Ph_2$ and $Ph'_2$ each represents a phenyl group or a biphenyl group, and the hydrogen atoms of the aforesaid phenyl group or biphenyl group may be substituted with an alkyl group having 1-8 carbon atoms, a cycloalkyl group having 5-8 carbon atoms, or an aralkyl group having 7-12 carbon atoms. $Ph_2$ and $Ph'_2$ may be the same or different. $Ph_3$ represents a phenyl group or a biphenyl group, and the aforesaid phenyl group or biphenyl group may be substituted with an alkyl group having 1-8 carbon atoms, a cycloalkyl group having 6-12 carbon atoms, or an aralkyl group having 7-12 carbon atoms. Further, these may be substituted with the same substituents as described in Formula (p).

In the formula, $Ph_3$ represents a substituent. "Substituent", as described herein, refers to the same group as described in above Formula (p). It is more preferable that $Ph_3$ represents a phenyl group or a biphenyl group. The hydrogen atoms of the above phenyl group or biphenyl group may be substituted with an alkyl group having 1-8 carbon atoms, a cycloalkyl group having 6-12, or an aralkyl group having 7-12 carbon atoms. Further, these may be substituted with the same substituents as described in above Formula (p).

In the formula, $Ph_1$ represents a substituent. "Substituent", as described herein, refers to the same group as described in above Formula (p). More preferably, $Ph_4$ represents an alkyl group having 1-20 carbon atoms or a phenyl group, and the hydrogen atom of the aforesaid alkyl group or phenyl group may be substituted with the same substituent as described in above Formula (p).

In the formula, $Ph_5$, $Ph'_5$, and $Ph''_5$ each represents a substituent. "Substituent", as described herein, refers to the same group as described in above Formula (p). More preferably, $Ph_5$, $Ph'_5$, and $Ph''_5$ each represents an alkyl group having 1-20 carbon atoms or a phenyl group, and the hydrogen atom of the aforesaid alkyl group or phenyl group may be substituted with the same substituent as described in above Formula (p).

As specific examples of phosphorous based compounds listed are monophosphite based compounds such as triphenyl phosphite, diphenylisodecyl phosphite, phenyldiisodecyl phosphite, tris(nonylphenyl) phosphite, tris(dinonylphenyl) phosphite, tris(2,4-di-t-butylphenyl) phosphite, 10-(3,5-di-t-butyl-4-hydroxybenzyl)-9,10-dihydro-9-oxa-10-phosphaphenantholene-10-oxide, 6-[3-(3-t-butyl-4-hydroxy-5-methylphenyl)propoxy]-2,4,8,10-tetra-t-butylbenz[d,f][1.3.2]dioxaphosphepine, or tridecyl phosphite; diphosphite based compounds such as 4,4'-butylidene-bis(3-methyl-6-t-butylphenyl-di-tridecyl phosphite) or 4,4'-isopropylidene-bis (phenyl-d-alkyl(C12-C15) phosphite; phosphonite based compounds such as triphenyl phosphonate, tetrakis(2,4-tert-butylphenyl)[1,1-butylphenyl]-4,4-diylbisphonite, or tetrakis(2,4-di-tert-butyl-5-methylphenyl)[1,1-biphenyl]-4,4'diylbisphosphonite; phosphinite based compounds such as triphenyl phosphinite or 2,6-dimethylphenyldiphenyl phosphinite; and phosphine based compounds such as triphenyl phosphine or tris(2,6-dimethoxyphenyl)phosphine. The above type phosphorous compounds are commercially available under trade names such as "SUMILIZER GP" form Sumitomo Chemical Co., Ltd., "ADK STAB PEP-24G", "ADK STAB PEP-36, and "ADK STAB 3010" from Asahi Denka Kogyo K.K., "GSY-P101" from Sakai Chemical Industry Co., Ltd., and "IRGAFOS P-EPQ" from Ciba Specialty Chemicals Inc.

Further, in the present invention, it is also preferable to employ sulfur based compounds as an antioxidant, and the following compounds, represented by Formula (s), are preferred.

$$R_{31}—S—R_{32}$$ Formula (s)

wherein $R_{31}$ and $R_{32}$ each represents a substituent. "substituent", as described herein, represents the same group as described in Formula (p). $R_{31}$ and $R_{32}$ are preferably alkyl groups.

Specific examples of sulfur based compounds include dilauryl 3,3-thiodipropionate, dimyristyl 3,3'-thiodipropionate, distearyl 3,3-thiodipropionate, laurylstearyl 3,3-thiodipropionate, pentaerythritol-tetrakis(β-lauryl-thio-propionate), and 3,9-bis(2-dodecylthioethyl)-2,4,8,10-tetraoxuspyro[5,5]undecane. The above type sulfur based compounds are commercially available under trade names such as "SUMILIZER TPL-R" and "SUMILIZER TP-D" from Sumitomo Chemical Industry Co., Ltd.

With regard to antioxidants, it is preferable to remove impurities such as residual acids, inorganic salts, or low molecular weigh organic molecules which are brought in during production or generated during storage in the same manner as for the above-mentioned cellulose esters. More preferred purity is at least 99%. The content as residual acids and water is preferably 0.01-100 ppm, whereby during melt casting of cellulose esters, it is possible to retard thermal degradation and to enhance film forming stability, as well as optical characteristics and mechanical physical properties of films.

<Acid Scavengers>

"Acid scavengers", as described herein, refer to agents to trap acids (protons) which are brought in and remain in cellulose esters. Further, when cellulose esters are melted, hydrolysis of the side chains is accelerated via moisture in polymers and heat. In the case of cellulose acetate propionate, acetic acid and propionic acid are generated. Acceptance depends on capability of chemical bonds with acids and included, but limited to, are those having epoxy, tertiary amine, or ether structures.

Specifically, preferred are epoxy compounds which are described in U.S. Pat. No. 4,137,201 as an acid scavenger. Such epoxy compounds as the acid scavenger have been known in the present technical field. They are represented by compositions such as diglycidyl ethers of various polyglycols, especially polyglycols derived via condensation of ethylene dioxide in an amount of about 8-about 40 mol per mol of polyglycol, diglycidyl ethers of glycerol, metallic epoxy compounds (for example, those which conventionally employed in the vinyl chloride composition and together with vinyl chloride polymer composition), expoxidized ether condensation products, diglycidyl ether of bisphenol A (namely, 4,4'dihydroxydiphenyldimethylethane), expoxidized unsaturated fatty acid esters (especially, esters of fatty acids of 2-22 carbon atoms and alkyls of about 4-about 2 carbon atoms (for example, butyl epoxystearate)), or various expoxidized long chain fatty acid triglycerides (for example, expoxidized soybean oil), and included are exemplified expoxidized plant oil, and included are other unsaturated natural oil (occasionally, these are called expoxidized natural glycosides or unsaturated fatty acids. These fatty acids incorporate 12-22 carbon atoms). Specifically preferred are commercially available epoxy group containing epoxy resin compound EPON 815c and other expoxidized ether oligomer condensation products represented by the following Formula (6).

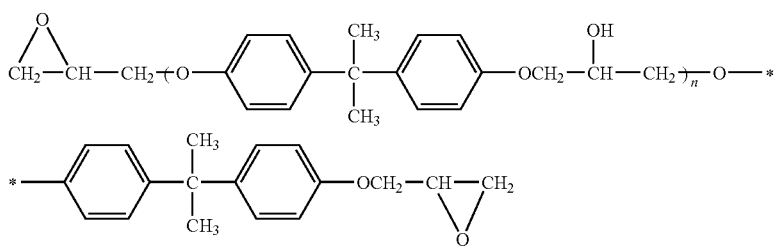

Formula (6)

wherein "n" represents 0-12.

Further, the following Compound e is also preferred.

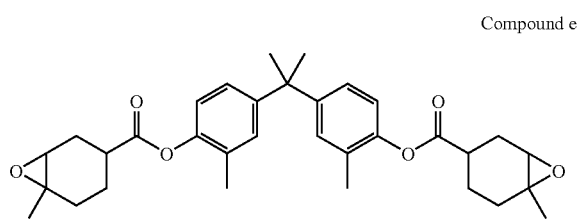 [SMILES: Cc1cc(C(C)(C)c2ccc(OC(=O)C3CCC4(C)OC4C3)c(C)c2)ccc1OC(=O)C1CCC2(C)OC2C1]

Compound e

Further, as employable acid scavengers included are those described in paragraphs 0087-0105 of JP-A No. 5-194788.

It is preferable that acid scavengers remove impurities such as residual acids, inorganic salts, or low molecular weight organic molecules which are brought in from production or generated during storage in the same manner as in the above-mentioned cellulose esters. More preferred purity is at least 99%. The content as residual acids and water is preferably 0.01-100 ppm, whereby during melt casting of cellulose esters, it is possible to retard thermal degradation and to enhance film forming stability, as well as optical characteristics and mechanical physical properties of films.

Incidentally, acid scavengers are sometimes called acid trapping agents, acid capturing agents, or acid catchers. In the present invention, they are employable irrespective of naming.

<UV Absorbers>

In view of minimizing degradation of polarizers and display devices due to ultraviolet rays, as well as excellent absorption capability of ultraviolet rays of a wavelength of 370 nm or shorter, and liquid crystal display capability, preferred are those which exhibit minimal absorption of visible light of a wavelength of at least 400 nm. It is possible to list, for example, oxybenzophenone based compounds, benzotriazole based compounds, salicylic acid ester based compounds, benzophenone based compounds, cyanoacrylate based compounds, and nickel complex salt based compound. Of these, preferred are benzophenone based compounds and benzotriazole based compound with minimal coloration. Further, UV absorbers may be structured of a dimer, a trimer, a tetramer, or a polymer in which a plurality of UV absorbable positions exist in the same molecule, and employed may be UV absorbers described in JP-A Nos. 10-182621 and 8-337574, and polymer UV absorbers described in JP-A No. 6-148430.

Specific examples of useful benzotriazole based UV absorbers include, but are not limited to, 2-(2'-hydroxy-5'methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-3",4", 5",6"-tetrahydrophthalimidomethyl)-5'-methylphenyl) benzotriazole, 2,2-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, and a mixture of 2-(2H-benzotriazole-2-yl)-6-(straight or branched chain dodecyl)-4-methylphenol and octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate.

Further, as commercial products, employed may be TINUVIN 109, TINUVIN 171, TINUVIN 360, and TINUVIN 928 (all produced by Ciba Specialty Chemical Corp.).

Specific examples of benzophenone based compounds include, but are not limited to, 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenylmethane).

In the present invention, the added amount of UV absorbers is preferably 0.1-20% by weight with respect to the polarizing plate protective film, is more preferably 0.5-10% by weight, but is most preferably 1-5% by weight. These may be employed in combinations of at least two types.

(Viscosity Lowering Agents)

In the present invention, in order to decrease melt viscosity, it is possible to add hydrogen bonding solvents. "Hydrogen bonding solvents", as described herein, refers to, as described in J. N. Israelachivili, "Bunshikan Ryoku to Hyomen Ryoku (Intermolecular Force and Surface Force)" (translated by Tamotsu Kondo and Hiroyuki Oshima, published by McGrow-Hill Publication, 1991), organic solvents capable of forming "bond" via a hydrogen atom, which is formed between an electrically negative atom (oxygen, fluorine, or chlorine) and a hydrogen atom which forms a covalent bond with the electrically negative atom, namely an organic solvent which exhibits a large bonding moment, and enables arrangement of molecules, each of which is near others. These exhibit capability to form a hydrogen bond between cellulose esters, which is stronger than the hydrogen bond with cellulose esters. In the melt casting method employed in the present invention, it is possible to lower the melting temperature of a cellulose ester composition via the addition of hydrogen bonding solvents, compared to the glass transition temperature of single cellulose ester. Further, in the same melting temperature, it is possible to make the melt viscosity of the cellulose ester composition incorporating hydrogen bonding solvents lower than the cellulose ester.

Exemplified as hydrogen bonding solvents may be alcohols such as methanol, ethanol, propanol, isopropanol, n-butanol, sec-butanol, t-butanol, 2-ethylhexanol, heptanoyl, octanoyl, nonanol, dodecanol, ethylene glycol, propylene glycol, xylene glycol, dipropylene glycol, polyethylene glycol, polypropylene glycol, methyl cellosolve, ethyl cellosolve, butyl cellosolve, hexyl cellosolve, glycerin; ketones such as acetone or methyl ethyl ketone; carboxylic acids such as formic acid, acetic acid, propionic acid, butyric acid; ethers such as diethyl ether, tetrahydrofuran, or dioxane; pyrrolidones such as N-methylpyrrolidone; amines such as trimethylamine or pyridine. These hydrogen bonding solvents may be employed individually or in combinations of at least two types. Of these, preferred are alcohols, ketones, and ethers. Further, preferred are methanol, ethanol, propanol, isopropanol, octanoyl, dodecanol, ethylene glycol, glycerin, acetone, and tetrahydrofuran. Still further, specifically preferred are water soluble solvents such as methanol, ethanol, propanol, isopropanol, ethylene glycol, glycerin, acetone, or tetrahydrofuran. Here, "water soluble" means a property to exhibit a solubility of 10 g or more in 100 g of water.

(Retardation Controlling Agents)

In the polarizing plate protective film of the present invention, an orientation film is formed to arrange a liquid crystal layer, and polarizing plate processing may be carried out in such a manner that retardations derived from the optical film and the liquid crystal layer are combined, or compounds to regulate retardation may be incorporated into the polarizing plate protective film.

As compounds to regulate retardation, employed may be aromatic compounds having at least two aromatic rings, described in European Patent No. 911,656A2. Further, at least two aromatic compounds may be simultaneously employed. The aromatic rings of the above aromatic compounds include heterocyclic rings other than aromatic hydrocarbon rings. Specifically preferred are aromatic heterocyclic rings which are commonly unsaturated hetero-rings. Of these, particularly preferred are compounds having a 1,3,5-triazine ring.

(Matting Agents)

In order to provide sliding properties, minute particles such as matting agents may be incorporated into the polarizing plate protective film of the present invention. As minute particles listed are minute particles of inorganic compounds or minute particles of organic compounds. The matting agents are preferably minute particles of which size is as small as possible. As examples of minute particles, listed may be minute inorganic particles such as silicon dioxide, titanium dioxide, aluminum oxide, zirconium oxide, calcium carbonate, kaolin, talc, sintered calcium silicate, hydrated calcium silicate, aluminum silicate, magnesium silicate, or calcium phosphate, as well as minute crosslinked polymer particles. Of these, preferred is silicon dioxide due to possibility to lower haze of the film.

As preferred organic compounds for surface processing, listed are halosilanes, alkoxysilanes, silazane, and siloxane. As the average diameter of minute particles increases, more desired sliding properties result. On the other hand, as the average particle diameter decreases, transparency becomes as desired. Further, the average diameter of secondary particles of the above minute particles is in the range of 0.05-1.0 μm. The average diameter of secondary particles of minute particles is preferably 5-50 nm, but is more preferably 7-14 nm. These minute particles are preferably employed in the polarizing plate protective film so that 0.01-1.0 μm roughness is formed on the surface of the optical film. The content of minute particles in the polarizing plate protective film is preferably 0.005-0.3% by weight with respect to the cellulose esters.

As minute silicon dioxide particles, listed may be AEROSIL 200, 200V, 300, R972, R972V, R974, R202, R812, OX50, and TT600, produced by Nippon Aerosil Co., Ltd. Of these preferred are AEROSIL 200V, R972, R972V, R974, R202, and R812. These minute particles may be employed in combinations of at least two types. When employed in combinations of at least two types, they may be blended in any appropriate ratio and employed. In such a case, minute particles which differ in average particle diameter and materials may be employed as follows. For example, it is possible to employ AEROSIL 200V and R972V at a weight ratio in the range of 0.1:99.9-99.9-0.1.

The presence of minute particles in a film employed as the above matting agent is useful to enhance the strength of a film as another object. Further, the presence of the above minute particles in a film enables enhancement of orientation properties of cellulose esters which constitute the polarizing plate protective film of the present invention.

(Polymer Materials)

With regard to the polarizing plate protective film of the present invention, polymer materials and oligomers other than cellulose esters may appropriately selected and employed. The above polymer materials and oligomers are preferred which excel in compatibility with cellulose esters. Transmittance of the resulting film is preferably at least 80%, is more preferably at least 90%, but is most preferably at least 92%. The purpose of blending at least one of the polymer materials and oligomers other than cellulose esters includes intention to control viscosity during melting via heat and to enhance physical properties of the film after processing. In such a case, incorporation may be carried out as the above other additives.

<<Preparation of Polarizing Plate Protective Film via Melt Casting Method>>

In the melt casting method, as described in the present invention, melt casting is defined as follows. A composition incorporating cellulose ester resins and additives such as plasticizers is heated to the temperature at which the composition exhibits fluidity. Thereafter, a melt incorporating fluid cellulose ester resins is subjected to melt casting. Heat melt molding methods may be classified to a melt extrusion molding method, a pressed molding method, an inflation method, an injection molding method, a blow molding method, a stretched molding method. Of these, in view of realizing the desired effects of the present invention, preferred is the melt extrusion method. In the above, film constituting materials are heated to result in fluidity. Thereafter, the resulting fluid is extruded onto a looped belt to form a film. The above method is included in the manufacturing method of the polarizing plate protective film of the present invention as a melt casting film production method.

The inventors of the present invention conducted investigation of the cause of generation of spot-like unevenness when the silicone rubber roller, as a touch roller, in which the surface was covered with a thin film metal sleeve, which is described in JP-A Nos. 2005-172940 and 2005-280217, was applied to melt molding of cellulose ester resins. As a result, problems were discovered in which since high heat insulating rubber was employed in the above touch roller, the surface of the touch roller was not sufficiently cooled even by cooling it from the interior via cooling media, and since a small gap between the thin film metal sleeve and the rubber was formed without fail, non-uniform temperature of the surface of the touch roller was not avoided. Further, the inventor of the present invention conducted investigation employing cellulose ester resins, and discovered that when a 100 μm film was prepared employing the die at a lip clearance of 800 μm which was identical to that described in the example of JP-A No. 2005-280217, during a low film production rate, the resulting film surface quality just after casting was acceptable, but as the film production rate increased, indented mottling was generated. The inventors of the present invention further continued the investigation and discovered that the above drawbacks were overcome in such a manner that the relationship with the average thickness of the film which incorporated the specified compounds and cast through the lip clearance of the die, and solidified via cooling was resulted in a wider range than that known in the conventional cellulose ester resins and further a film was pressed via the specified touch roller under specified conditions, whereby the present invention was achieved.

A melt incorporating cellulose ester resins exhibits relatively high melt viscosity and difficulty of stretching, compared to other thermoplastic resins. Due to that, problems occur in which when a draw ratio is relatively large, fluctuation of the layer thickness tends to occur in the conveying direction and during stretching in the tenter process, breakage tends to occur. Consequently, has been employed the draw ratio of at most 7-8. In the present invention, a feature is that a melt incorporating cellulose resins is extruded from the die in the form of a film and the resulting film prepared at a draw ratio of 10-30 is pressed while being sandwiched between the elastic touch roller and the cooling roller, followed by conveyance.

As noted above, "draw ratio", as described herein, refers to the value obtained by dividing lip clearance B of the die by average thickness A of the film solidified on the cooling roller. By regulating the draw ratio within the above range, when images are displayed via a liquid crystal display device, long-period optical unevenness and spot like unevenness decrease, whereby it is possible to prepare polarizing plate protective films which exhibit excellent productivity. It is possible to regulate the draw ratio via the die lip clearance and the taking-over rate of the cooling roller. The die lip clearance is preferably at least 900 μm, but is more preferably 1-2 mm. When it is excessively small or large, occasionally, the long-period optical unevenness is not improved.

Figure 3:
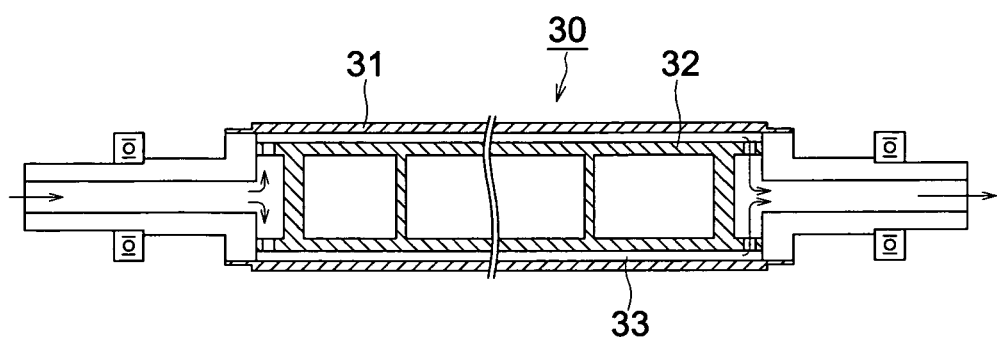
FIG. 3 is a cross-sectional view showing one example of a touch roller having an elastic section on the surface which is applicable to the present invention.

As shown in FIG. 3, elastic touch roller 30 employed in the present invention is in a double structure composed of outer metal cylinder 31 and inner cylinder 32, and has space 33 so that cooling fluid may be flown between them. Further, since the outer metal cylinder exhibits elasticity, it is possible to accurately control the surface temperature of the touch roller. Further, by utilizing the property which is subjected to elastic modification, an effect is exhibited in which the distance to press a film in the latitudinal direction is earned, whereby neither long-period optical unevenness nor spot unevenness occurs, and deterioration and distortion due to heat are reduced. The wall thickness of the outer metal cylinder is preferably in the range in which 0.003≤(wall thickness of outer metal cylinder)/radius of touch roller)≤0.03 is satisfied, whereby suitable elasticity is realized. When the radius of the touch roller, namely the radius of the outer metal cylinder, is large, even though the wall thickness of the outer metal cylinder is large, appropriate flexibility is realized. The diameter of the touch roller is preferably 100-600 mm. When the wall thickness of the outer metal cylinder is excessively small, strength becomes insufficient, whereby a concern of breakage occurs. On the other hand, when it is excessively large, the weight of the roller significantly increases, whereby a concern of uneven rotation occurs. Accordingly, the wall thickness of the outer metal cylinder is preferably 0.1-5 mm.

Roughness of the outer metal cylinder is regulated to be preferably at most 0.1 μm in terms of Ra, but more preferably at most 0.05 μm. As the roller surface becomes smooth, it is possible to make the surface of the resulting film smoother.

Materials of the outer metal cylinder are required to be smooth, appropriately elastic and durable. It is possible to preferably employ carbon steel, stainless steel, and titanium, as well as nickel produced via electroforming. Further, in order to enhance the hardness of the surface and to improve peeling properties from resins, it is preferable to carry out surface processing such as hard chromium plating, nickel plating, amorphous chromium plating, or ceramic thermal spraying. It is preferable that the processed surface is further polished so that the above-mentioned surface roughness is attained.

It is preferable that the inner cylinder is composed of lightweight and rigid metal. By providing rigidity, it is possible to retard the fluctuation of roller rotation. By setting the wall thickness of the inner cylinder to be a factor of 2-10 of the outer cylinder, sufficient rigidity is achieved. The inner cylinder may further be covered with elastic resin materials such as silicone, or fluorocarbon rubber.

The structure of the space to flow cooling fluid is applicable as long as it is possible to uniformly control the temperature of the roller surface. For example, it is possible to carry out the temperature control which results in minimal temperature fluctuation of the roller surface via a structure in which the flow alternately runs back and forth in the lateral direction, or in which the flow runs in a spiral shape. Cooling fluids are not particularly limited, and water and oil may be employed in conformity with the employed temperature range.

The surface temperature of the touch roller is preferably lower than the glass transition temperature (Tg) of the film. When it is higher than Tg, peeling properties between the film and the roller are occasionally degraded. When it is excessively low, volatile components from the film are occasionally deposited to the roller. Accordingly, the above surface temperature is more preferably between 10° C. and Tg−10° C.

"Tg", as described herein, refers to Tg of films, and to the temperature at which the base line recorded by DSC measurements (at a temperature increasing rate of 10° C./minute) starts changing.

It is preferable that the elastic touch roller is shaped to be of a so-called crown roller shape in which the diameter of the central portion in the lateral direction is greater than the edges. It is common that both edges of the touch roller are pressed onto the film via a pressurization means. In such a case, since the touch roller is bent, a phenomenon occurs in which the edge portion is more strongly pressed. By shaping a roller to be of a crowned shape, it is possible to achieve highly uniform pressing.

It is preferable that the width of the elastic touch roller employed in the present invention is greater than the film width since it is possible to closely contact the entire film with the cooling roller. Further, as the draw ratio increases, both edges of the film occasionally result in high ear (the film thickness of the edge increases). In such a case, the width of the outer metal cylinder may become less than the film to escape the high ear. Alternately, the outer diameter of the outer metal cylinder may become less to escape the high ear portion.

As specific examples of elastic metal touch rollers listed are molding rollers described in Japanese Patent Nos. 3194904, 3422798, as well as JP-A Nos. 2002-36332 and 2002-36333.

In order to minimize bending of the touch roller, a support roller may be arranged on the opposite side of the touch roller with respect to the cooling roller.

An apparatus to clean dirt from the touch roller may be arranged. In the cleaning apparatus, preferably employed may be a method in which, if desired, a member such as nonwoven fabric, into which solvents are allowed to penetrate, is pressed onto the surface of the roller, a method in which rollers are brought into contact in liquid, and a method in which dirt on the roller surface is volatilized via plasma discharge such as corona discharge or glow discharge.

In order to kelp the surface temperature of the touch roller more uniform, a temperature regulating roller may be brought into contact with the touch roller, temperature regulated air may be blown onto the same, or heat media may be brought into contact with the same.

Further, in the present invention, it is preferable that during pressing of the touch roller, touch roller linear pressure is regulated within 9.8-150 N/cm. By regulating the touch roller linear pressure within the above range, it is possible to prepare a polarizing plate protective film in which thermal distortion of the cellulose resin film produced via the melt casting method is reduced. Linear pressure, as described herein, refers to the value obtained by dividing the force to press the film via the touch roller by the film width during pressing. Methods to regulate the linear pressure within the above range are not particularly limited, and for example, it is possible to press both edges of the roller via an air cylinder or an oil pressure cylinder. Also, the film may be indirectly pressed by pressing the touch roller via a support roller.

As film temperature during pressing the film via the touch roller is increased, distortion is reduced. However, when it is excessively high, another type of distortion is occasionally generated. It is assumed that the above occurs as follows. Volatile components are volatilized from the film, and during pressing via the touch roller, uniform pressing is not achieved. When it is excessively low, the desired effects of the present invention are not realized. In the present invention, it is preferable that film surface temperature T is regulated to Tg<T<Tg+110° C. Methods to regulate the film temperature during pressing are not particularly limited. Examples thereof include a method in which the distance between the die and the cooling roller is reduced so that cooling is retarded between the die and the cooling roller, a method in which the gap between the die and the cooling roller is surrounded by heat insulating materials to result in heat retention, and a method in which heating is carried out via heated air flow, via an infrared heater, or microwave heating. Needless to say, higher extrusion temperature may also be set.

It is possible to determine film surface temperature and roller surface temperature via a non-contact infrared thermometer. Practically, measurements are carried out at 10 positions in the lateral direction at a distance of 0.5 m from the sample to be measured, employing a non-contact hand-held thermometer (IT2-80, produced by Keyence Corp.).

Surface temperature T on the touch roller side refers to the film surface temperature of a conveying film which is determined via a non-contact infrared thermometer from the touch roller side in such a state that the touch roller is taken off.

The cooling roller is the very rigid metal roller and is structured so that heat controllable heat medium or cooling medium is flown in the interior. Its size is not limited as long as it is sufficiently large to cool the melt-extruded film. The diameter of the cooling roller is commonly about 100 mm-about 1 m. As surface materials of the cooling roller listed are carbon steel, stainless steel, aluminum, and titanium. Further, in order to improve peeling properties of resins via an increase in the surface hardness, it is preferable to carry out any of the surface treatments such as hard chromium plating, nickel plating, amorphous chromium plating, or thermal ceramic spraying. The surface roughness of the cooling roller is preferably at most 0.1 μm in terms of Ra, but is more preferably at most 0.05 μm. As the roller surface becomes smoother, it is possible to make the surface of the resulting film smoother. Needless to say, it is preferable that the treated surface is further polished to reach the above surface roughness.

A film production method will now be described.

Commonly, a plurality of raw materials employed in melt extrusion is previously kneaded, followed by pelletization. Pelletization may be carried out via one of any of the conventional methods. For example, desiccated cellulose esters and other additives are fed to an extruder via a feeder and kneading is carried out via a uniaxial or biaxial extruder, followed by extrusion from a die in the form of a strand, air or water cooling, and cutting. It is essential to desiccate the raw materials prior to extrusion to minimize their decomposition. Since cellulose esters specifically tend to absorb moisture, it is preferable to dry them at 70-140° C. for at least 3 hours via a hot air dehumidifier or a vacuum dryer so that the moisture content is at most 200 ppm, but is preferably at most 100 ppm. The additives are blended prior to feeding to the extruder. To achieve uniform blending, it is preferable that additives in a mall amount such as antioxidants may previously be blended. Solid antioxidants may be blended with each other, if needed, antioxidants are dissolved in solvents and the resulting solution may be blended with cellulose esters via impregnation, or blending may be carried out via spraying. Alternately, a vacuum NAUTOR mixer is preferred since it simultaneously enables drying and blending. Further, if the feeder section and the exit from the die are allowed to come into contact with ambient air, preferred ambience is desiccated air or desiccated $N_2$ gas. Matting agents and UV absorbers may be combined with the resulting pellets or may be added into the extruder.

It is preferable that an extruder decreases shearing force and carries out processing at relatively low temperature so that pelletization is achievable without degradation (such as a decrease in the molecular weight, coloration, and gel formation) of resins. For example, in the case of a biaxial extruder, it is preferable to carry out rotation in the same direction by employing deep grooved type screws. In view of uniformity, an engaging type is preferred. A kneader disk enables enhancement of kneading properties, but caution should be paid for shearing heat generation. Blending is sufficiently achieved without employing the kneader disk. Suction from a bent hole may be carried out when needed. Since almost no volatile components are formed at relatively low temperature, the bent hole may be omitted.

Pellet color is preferably in the range of −5 to 10 in terms of B* value which is an index of yellow, is more preferably in the range of −1 to 8, but is most preferably in the range of −1 to 5. It is possible to determine value b* employing a light source of D65 (a color temperature of 6504 K) at a view angle of 10° C., via spectral colorimeter CM-3700d (produced by Konica Minolta Sensing, Inc.).

By employing the pellets prepared as above, film production is achieved. Of course, without pelletization, it is possible to feed raw material powders into the extruder via the feeder and to produce a film without any modification.

Polymers, dried by dehumidified heated air flow, or under vacuum or reduced pressure, are melted at about 200- about 300° C. via a uniaxial or biaxial type extruder. After removing foreign matter via filtration employing a leaf disk type filter, extrusion from a T die is carried out in the form of a film, and solidification is carried out on a cooling roller. While fed into the extruder from the feeding hopper, it is preferable to minimize oxidation decomposition under vacuum or reduced pressure or under an ambience of inert gases.

It is preferable to achieve a stabilized extrusion flow rate by introducing a gear pump. Further, as a filter employed to remove foreign matter, preferably employed is a stainless steel filament sintered filter. The stainless steel filament sintered filter is prepared in such a manner that a state in which stainless steel filaments are intricately entwined is produced followed by compression, and sintering of contacting positions to achieve unification, whereby it is possible to regulate filtration accuracy by changing density via the size of the resulting filaments and the compression degree. A multilayer is preferred in which high and low filtration accuracy is repeated several times. Further, it is preferable that a structure may be employed in which filtration accuracy is sequentially enhanced or a method may be employed in which high and low filtration accuracy is repeated, whereby filtration life of the filter is extended and it is possible to enhance catching accuracy of foreign matter and gels.

When the die exhibits flaws or foreign matter is adhered, streaking defects are occasionally generated. Such defects are called die lines. In order to decrease surface defects such as the above die lines, a structure is preferred in which resin retaining portions are minimized in the pipe from the extruder to the die. It is also preferable to employ a die having minimal flaws on its interior surfaces or lip. Volatile components from resins are occasionally deposited on the periphery of the die, resulting in die lines. Consequently, it is preferable that atmosphere incorporating volatile components are sucked. Further, since deposition occasionally occurs on apparatuses which are subjected to electrostatic application to allow the film extruded from the die to closely adhere to the cooling roller, it is preferable to minimize the above deposition via application of alternating current or other heating means.

It is preferable that the inner surface of the extruder and the die, in contact with melted resins, are subjected to a surface treatment which is barely adhered with melted resins via a decrease in the surface roughness or application of materials of low surface energy. Specifically listed are those which are polished to reach a surface roughness of at most 0.2 S after chromium plating or thermal ceramic spraying.

Additives such as plasticizers may previously be blended with resins or may be kneaded in mid-course of the extruder. To achieve uniform addition, it is preferable to employ mixing apparatuses such as a static mixer.

When melted film is insufficiently contacted by the cooling roller, volatile components in the melted resin are deposited onto the roller, whereby resulting stains occasionally become problematic. It is preferable to employ any of the methods such as a method in which close contact is achieved via electrostatic application, a method in which close contact is achieved via air pressure, a method in which close contact is achieved by nipping the entire width or the edges, and a method in which close contact is achieved via reduced pressure.

Further, when a film is nipped via the cooling roller and the elastic touch roller, it is preferable that the film temperature on the touch roller side is regulated to Tg–Tg+100° C. so that distortion is reduced and the desired effects of the present invention are realized. As a roller having an elastic body surface employed for the above purpose, employed may be conventional rollers. Preferably employed may be rollers described, for example, in JP-A Nos. 03-124425, 08-224772, and 07-100960, 10-272676, as well as W097-028950 and JP-A Nos. 11-235747 and 2002-36332.

When a film is peeled from the cooling roller, it is preferable to minimize film deformation by controlling the tension.

It is preferable that the polarizing plate protective film of the present invention is stretched in the lateral direction or in the film producing direction.

It is preferable that the unstretched film, which has been peeled from the above cooling drum, is heated to the glass transition temperature (Tg) of cellulose esters–Tg+100° C. via a plurality of roller groups and/or heating apparatuses such as infrared heaters and is subjected to single stage or multistage longitudinal stretching. The stretching factor is commonly in the range of 5-200% and is selected to satisfy retardation required for the specific products.

It is further preferable that the polarizing plate protective film which has been stretched in the longitudinal direction, as described above, is also laterally stretched in the range of 5-200% between Tg–20° C. and Tg+20° C., followed by thermal fixing.

In the case of lateral stretching, it is preferable to be carried out in a stretching zone which is divided into at least two sub-zones, while sequentially increasing the temperature over a range of temperature difference of 1-50° C., since thereby fluctuations of physical properties in the lateral direction are minimized. Further, it is preferable that after lateral stretching, the resulting film is maintained in the temperature range between Tg–40° C. and the final lateral stretching temperature for 0.01-5 minutes, since it is possible to further reduce any fluctuations of the physical properties in the lateral direction. Stretching order is not limited to the order of longitudinal direction and lateral direction, but the order of lateral direction and longitudinal direction may be acceptable.

Further, simultaneous biaxial stretching may preferably be employed. During sequential stretching, breakage tends to occur during the second zone. However, simultaneous biaxial stretching tends to result in more difficulty of the breakage, whereby any advantages, in which it is possible to make longitudinal and lateral orientation uniform, are realized.

Thermal fixing refers to the thermal fixing in the temperature range between the final stretching temperature and Tg+50° C. typically for 0.5-300 seconds. During the above, it is preferable that the thermal fixing is carried out in a zone which is divided into at least two sub-zones, in the range of temperature difference of 1-100° C. while sequentially increasing the temperature.

A thermally fixed film is commonly cooled to at most the Tg, and the clip holding portion of film edges are cut off, followed by winding. At that time, it is preferable that relaxation by 0.1-10% is carried out in the lateral direction and/or the longitudinal direction within the temperature range between Tg–30° C. and the final thermal fixing temperature. Further, it is preferable that cooling is carried out gradually at a cooling rate of at most 100° C. per second from the final thermal fixing temperature to the Tg. The means to carry out cooling and relaxation are not particularly limited and any of the several conventional means are feasible. However, in view of enhancement of dimensional stability of the film, it is specifically preferable that the above treatments are carried out in a plurality of temperature zones, while sequentially cooling it. Incidentally, the cooling rate is the value obtained via the formula (T1–Tg)/t, wherein T1 represents the final thermal fixing temperature and "t" represents the time during which the film temperature reaches Tg from the final thermal fixing temperature.

Optimal conditions of these thermal fixing conditions, and cooling and relaxation conditions differ depending on cellulose esters which constitute a film. Accordingly, physical properties of the resulting stretched film are determined and condition may appropriately be set so that preferred characteristics are attained.

Further, in the film production process, clip holding portions of both film edges which have been cut off are ground up and if desired, granulated. Thereafter, they may be reused as raw material for the same type of film or modified for different types of films.

(Stretching Operation and Refractive Index Control)

When the polarizing plate protective film of the present invention is employed as a retardation film, it is preferable to control the refractive index via the stretching operation. It is possible to control the refractive index within the preferred range via the stretching operation in which the film is stretched in one direction by a factor of 1.0-2.0 and in the direction perpendicular to the above on the film surface by a factor of 1.01-2.5.

For example, it is possible to sequentially or simultaneously carry out stretching in the longitudinal direction (the film producing direction) of the film and in the direction perpendicular to the above on the film surface, namely in the lateral direction. At that time, when the stretching factor is excessively small in at least one direction, no targeted retardation is obtained, while when it is excessively large, stretching becomes difficult, whereby breakage occasionally occurs.

For example, during stretching in the melt-casting direction, when contraction in the lateral direction is excessive, the refractive index in the film thickness direction becomes excessive. In such case, it is possible to achieve improvement by retarding the lateral contraction of the film or by also stretching in the lateral direction. In the case of stretching in the lateral direction, fluctuations of the refractive index occasionally result in the lateral direction. The above is observed when a tenter method is employed. This is a phenomenon which occurs in such a manner that by carrying out stretching in the lateral direction, contraction force is generated in the central portion of the film, while the edges are fixed. This is considered as the so-called bowing phenomenon. In this case, by carrying out stretching in the aforesaid casting direction, it is possible to restrain the above bowing phenomenon and to reduce retardation fluctuations in the lateral direction.

It is possible to reduce the variation of the resulting film thickness by stretching in biaxial directions which are perpendicular to each other. As variation of the thickness of a polarizing plate protective film becomes excessive, uneven retardation results, whereby when employed in a liquid crystal display, unevenness such as coloration becomes problematic.

The variation of thickness of the polarizing plate protective film is regulated preferably within the range of ±3%, but more preferably within the range of ±1%. In the targets as described above, an effective method is one in which stretching is carries out in biaxial directions which are perpendicular to each other. With regard to stretching factors in biaxial directions which are perpendicular to each other, it is preferable to regulate the range of the final stretching factor of 1.0-2.0 in the casting direction and 1.01-2.5 in the lateral direction, while it is also preferable to achieve stretching in the casting direction within the range of a factor of 1.01-1.5 and in the lateral direction within the range of a factor of 1.05-2.0.

When cellulose esters are employed which result in positive birefringence against stress, it is possible to provide a delayed phase axis of the cellulose ester film in the lateral direction by stretching in the lateral direction. In such case, in order to enhance display quality in the present invention, it is preferable that the delayed phase axis of a cellulose ester film is located in the lateral direction, and it is necessary that the stretching factor in the lateral direction>the stretching factor in the casting direction.

Methods to stretch a web are not particularly limited, and examples thereof include a method in which a plurality of rollers are subjected to different peripheral rates and longitudinal stretching is carried out utilizing difference of the roller peripheral rate among them, a method in which both edges of a web are fixed via clips and pins and stretching in the longitudinal direction is carried out by increasing the distance between clips or pins in the conveyance direction, a method in which stretching in the lateral direction is carried out by increasing the above in the lateral direction, and a method in which stretching is carried out in both longitudinal and lateral directions by simultaneously increasing the above in the longitudinal and lateral directions. Obviously, combinations of these methods may be employed. Further, in the so-called tenter method, it is preferable that clip potions are driven via a linear drive system since it is possible to reduce danger such as breakage.

It is preferable that such width holding or stretching in the lateral direction during film production process is carried out via a tenter, which may be either a pin tenter or a clip tenter.

In order to employ the polarizing plate protective film of the present invention as a retardation film, the above stretching operations are carried out, and in-plane retardation value Ro, represented by Formula (i) at a wavelength of 590 nm under 23° C. and 55% relative humidity is commonly in the range of 10-100 nm, but is preferably in the range of 20-80 nm; retardation value Rt in the thickness direction represented by Formula (ii) is commonly in the range of 80-400 nm, but is preferably in the range of 100-250 nm; and Rt/Ro is preferably in the range of 2.0-5.0.

$$Ro=(nx-ny)\times d \quad \text{Formula (i)}$$

$$Rt=\{(nx+ny)/2-nz\}\times d \quad \text{Formula (ii)}$$

wherein nx represents the refractive index in the film in-plane delayed phase axis direction, ny represents the refractive index in the direction perpendicular to the delayed phase axis, nz represents the refractive index of the film thickness direction, and d (in nm) represents the film thickness.

Thickness of the polarizing plate protective film of the present intention is preferably 10-500 μm, is more preferably at least 20 μm, but is still more preferably at least 35 μm. Further, it is more preferably at most 150 μm, but is still more preferably at most 120 μm. However, it is most preferably 25-90 μm. When the thickness of the polarizing plate protective film is greater than the above upper limit, the resulting polarizing plate becomes excessively thick and does not achieve the target of a thin type and light weight in the liquid crystal displays employed in lap-top computers and mobile type electronic devices. On the other hand, a thickness of less than the above lower limit is not preferred since it becomes difficult to generate the targeted retardation, and moisture permeability of films increases whereby capability to protect polarizers from moisture is deteriorated.

The delayed phase axis or advanced phase axis of the polarizing plate protective film of the present invention exists in the film plane. When an angle with respect to the film production direction is represented by θ1, θ1 is preferably between −1 and 1° C., but is more preferably between −0.5 and +0.5° C. It is possible to define above θ1 as the orientation angle. It is possible to determine θ1 via an automatic birefringence meter, KOBRA-21ADH (produced by Oji Scientific Instruments). When each θ1 satisfies the above relationship, contribution may be made to obtain high luminance in displayed images, to minimize or prevent light leakage, and to obtain faithful color reproduction in a color liquid crystal display device.

<<Functional Layer>>

During manufacturing of the polarizing plate protective film of the present invention, prior to and/or after stretching, it is possible to arrange functional layers, via coating, such as an antistatic layer, a hard coat layer, an antireflection layer, an easy sliding layer, an easy adhesion layer, an anti-glare layer, a barrier layer, an optical compensation layer, and a back coat layer. Specifically, it is preferable to arrange at least one layer selected from the antistatic layer, the hard coat layer, the antireflection layer, the easy adhesion layer, the anti-glare layer, and the back coat layer. It is specifically preferable that the aforesaid antireflection layer incorporates minute hollow particles to reduce reflectance. In such a case, it is possible to carry out various types of surface treatments such as a corona discharge treatment, a plasma treatment, or a chemical treatment as needed.

<<Polarizing Plates>>

Manufacturing methods of polarizing plates having the polarizing plate protective film of the present invention are not particularly limited, and common methods are available for its manufacturing. The resulting polarizing plate protective film, which has been subjected to an alkaline treatment, may be adhered to both sides of a polarizer, which is prepared in such a manner that a polyvinyl alcohol film or an ethylene modified polyvinyl alcohol of a content of ethylene units of 1-4 mol %, a degree of polymerization of 2,000-4,000, and a ratio of saponification of 99.0-99.99 mol % is immersed into an iodine solution followed by stretching, by employing an aqueous completely saponified polyvinyl alcohol solution, or the polarizing plate protective film of the present invention may be adhered to at least one side of the polarizer. On the other side, employed may be another polarizing plate protective film. As such a film, preferably employed may be a commercial cellulose ester film such as KONICA MINOLTA TAC KC8UX, KC4UX, KC5UX, KC8UCR3, KC8UCR4, KC8UCR5, KC8UY, KC4UY, KC12UR, KC4UE, KC8UE, KC8UY-HA, KC8UX-RHA, KC8UXW-RHA-C, KC8UXW-RHA-NC, KC4UXW-RHA-NC (all produced by Konica Minolta Opto, Inc.).

Further, instead of the above alkaline treatment, the easy adhesion processing, described in JP-A Nos. 6-94915 and 6-118232, may be applied followed by polarizing plate processing.

The polarizing plate is composed of a polarizer and protective films which protect both sides thereof. Further, it may be constituted in such a manner that a protective film is adhered to one side and a separate film is adhered to the opposite side. The protective film and the separate film are employed to protect the polarizing plate during shipment of the polarizing plate and product inspection. In this case, the protective film is adhered to protect the surface of the polarizing plate and is applied to the side opposite the side where the polarizing plate is adhered to the liquid crystal plate. Further, a separate film is employed to cover the adhesion layer which is adhered to the liquid crystal plate, and employed on the surface side where the polarizing plate is adhered to the liquid crystal cell.

<<Liquid Crystal Display Device>>

In a liquid crystal display device, a substrate incorporating a liquid crystal cell is commonly arranged between two polarizing plates. However, even though the polarizing plate protective film of the present invention is arranged in any location, excellent display properties are obtained. Specifically, since in the polarizing plate protective film of the uppermost surface on the display side of the liquid crystal display device, a clear hard coat layer, an anti-glare layer, and an antireflection layer are arranged, it is also preferable that the aforesaid polarizing plate protective film is employed in this portion. Further, in order to increase the view angle, it is preferable to employ the stretched polarizing plate protective film of the present invention as a retardation film.

The polarizing plate protective film of the present invention and the polarizing plate employing the same are preferably employed in LCDs of various types of driving systems such as a reflection type, a transmission type, or semi-transmission type LCD, or a TN type, an STN type, an OCB type, an HAN type, a VA type (a PVA type and an MVA type), or an IPS type. In a display device of a large image area of at least 30 type, especially 30-54 type, no white spots result at the periphery of images and the resulting effects are maintained over an extended period. In an MVA type liquid crystal display device, marked effects are observed. Specifically, effects were observed in which color shading, asperity, and wavy unevenness are minimized and eyes did not tire due to viewing over an extended duration.

EXAMPLES

The present invention will now be described with reference to examples, however the present invention is not limited thereto.

<<Preparation of Employed Materials>>

(Cellulose Esters)

C-1. Cellulose acetate propionate: substitution degree of the acetyl group of 1.95, substitution degree of the propionyl group of 0.7, and number average molecular weight of 60,000

C-2. Cellulose acetate butyrate: substitution degree of the acetyl group of 1.75, substitution degree of the butyryl group of 1.0, and number average molecular weight of 100,000

C-3. Cellulose acetate propionate: substitution degree of the acetyl group of 1.4, substitution degree of the propionyl group of 1.35, and number average molecular weight of 60,000

(Plasticizers)

Synthesis Example 1

Synthesis of trimethylolpropane tribenzoate (TMPTB)

While stirring, 71 parts by weight of benzoyl chloride were dripped over 30 minutes into a mixed solution of 45 parts by weight of trimethylolpropane and 101 parts by weight of triethylamine maintained at 100° C., and the resulting mixture was stirred for an additional 30 minutes. After completion of the reaction, the resulting mixture was cooled to room temperature. After collecting precipitates via filtration, washing was carried out via the addition of ethyl acetate and pure water, and the organic phase was collected via separation, followed by removal of ethyl acetate via distillation under reduced pressure, whereby 126 parts by weight (at an 85% yield) of white TMPTB crystals were prepared. The molecular weight of the resulting compound was 446.

Synthesis Example 2

Exemplified Compound 9 represented by Formula (3)

While stirring, 240 parts by weight of o-methoxybenzoyl chloride were dripped over 30 minutes into a mixed solution of 54 parts by weight of trimethylolpropane, 127 parts by weight of pyridine, and 500 parts by weight of ethyl acetate maintained at 10° C. Thereafter, the resulting mixture was heated to 80° C. and stirred for 3 hours. After completion of the reaction, the resulting mixture was cooled to room temperature. After collection of precipitates via filtration, washing was carried out via the addition of an aqueous 1 mol/L HCl solution, and further, washing was carried out via the addition of an aqueous 1% $Na_2CO_3$ solution. Thereafter, the organic phase was collected via separation, followed by removal of ethyl acetate via distillation under reduced pressure, whereby 193 parts by weight (at a 90% yield) of transparent liquid of Exemplified Compound 9 were prepared. The molecular weight of the resulting compound was 537.

Additive 1

Synthesis Example 3

Compound Represented by Formula (I), Compound 101

According to the following method, 5,7-di-tert-Bu-3-(2,5-dimethylphenyl)-3H-benzofuran-2-one (being Compound 101) was synthesized by employing, as a starting compound, 5,7-di-tert-Bu-3-hydroxy-3H-benzofuran-2-one, p-xylene, and FULCAT 22B as a catalyst.

a) Synthesis of 5,7-di-tert-Bu-3-hydroxy-3H-benzofuran-2-one

A mixture of 212.5 g of 2,4-di-tert-Bu-phenol (97%) in 300 ml of 1,2-dichloroethane, 163.0 g (1.10 mol) of 50% aqueous glyoxylic acid, and 0.5 g (2.6 mmol) p-toluenesulfonic acid monohydrate was refluxed on a water separator under a nitrogen flow for 3.5 hours. Thereafter, the reaction mixture was concentrated via a reduced pressure rotary evaporator. The resulting residue was dissolved in 800 ml of hexane, followed by water washing three times. In a separation funnel, the water phase was separated, and extraction was carried out employing 300 ml of hexane. Organic phases were collected, desiccated with magnesium sulfate, and concentrated in a reduced pressure evaporator. From the residue, 262.3 g (nearly 100%) of purified 5,7-di-tert-Bu-3-hydroxy-3H-benzofuran-2-one in the form of a deep yellow resinous shape was prepared.

b) Synthesis of 5,7-di-tert-Bu-3-(2,5-dimethylphenyl)-3H-benzofuran-2-one (Compound 101)

A mixture prepared by adding 40 g of FULCAT 22B to a solution prepared by dissolving 262.3 g (1.00 mol) of 5,7-di-tert-Bu-3-hydroxy-3H-benzofuran-2-one solution in 500 ml (4.05 mol) of ethylbenzene was refluxed on a water separator for 1.5 hours. Subsequently, catalyst, FULCAT 22B, was removed via filtration, and excessive p-xylene was distilled out via a reduced pressure evaporator. By crystallizing the residue from 400 ml of methanol, 280.6 g (80%) of 5,7-di-tertiary-butyl-3-(2,5-dimethylphenyl)-3H-benzofuran-2-one (Compound (101) of a melting point of 93-97° C. was prepared.

Synthesis Example 4

Synthesis of Compounds 103 and 103A Represented by Formula (I)

According to the following method, a mixture of 3-(3,4-dimethylphenyl)-5,7-di-tert-Bu-3H-benzofuran-2-one (Compound 103) and 3-(2,3-dimethylphenyl)-5,7-di-tert-Bu-3H-benzofuran-2-one (Compound 103A isomer) at about 5.7:1 was synthesized by employing, as a starting compound, 2,4-di-tert-Bu-phenol, glyoxylic acid, o-xylene, and FULMONT as a catalyst.

In a 1500 ml double layer reactor fitted with a water separator, placed were 206.3 g (1.0 mol) of 2,4-di-tert-Bu-phenol, 485 g (5.5 mol) of o-xylene, 0.5 g (2.6 mmol) of p-toluenesulfonic acid monohydrate, and 163 g (1.1 mol) of 50% aqueous glyoxylic acid. While stirring, the resulting mixture was heated to 85-90° C., and simultaneously, the apparatus was subjected to evacuation to approximately 450 mbar. Immediately after the temperature in the reactor reached 85-90° C., the o-xylene/water mixture was distilled, and o-xylene was refluxed, while water was removed from the system. The magnitude of pressure reduction was continuously increased so that the temperature of the reactor was maintained in the range of 85-90° C. All water, approximately 90-100 ml, was distilled out over 3-4 hours. Pressure reduction was released via nitrogen and 40 g of catalyst (FULMONT XMP-3) was added to the transparent yellow solution. Pressure of the apparatus was reduced to 70 kPa, and the resulting suspension was stirred at a heating bath temperature of 165° C. Reaction water was distilled out as an azeotropy from the system from a temperature of approximately 128° C. The reactor temperature was finally raised to a maximum of 140° C. Water in a total amount of approximately 20 ml was distilled out from the system over 1-2 hours. Subsequently, pressure reduction was released via nitrogen. The reaction mixture was cooled to 90-100° C., followed by filtration. The apparatus and the filter residue were washed with 100 g of o-xylene. The filtrate was transferred to a double layer reactor, followed by concentration under reduced pressure, whereby 360 g of xylene was recovered. A slightly reddish yellow residue was cooled to 70° C., and while maintaining a temperature of 60-65° C., 636 g of methanol was carefully added from a dripping funnel. Crystallizing seeds were added to the resulting solution and crystallization was carried out while stirring at 60-65° C. for 30 minutes. Subsequently, crystallized slurries were cooled to −5° C. over two hours and stirred for an additional one hour at the above temperature. The resulting crystals were collected via suction filtration, and the residue was washed 5 times with 400 ml of cooled methanol (−5° C.). The sufficiently dried and pressed product was dried at 50-60° C. via a vacuum dryer, whereby 266 g of white solids were prepared. The resulting product was analyzed via gas chromatography. As a result, it was confirmed that the resulting compound was composed of approximately 85% of 3-(3,4-dimethylphenyl)-5,7-di-tert-Bu-3H-benzofuran-2-one (Compound 103) and approximately 15% of 3-(2,3-dimethylphenyl)-5,7-di-tert-Bu-3H-benzofuran-2-one isomer (Compound 103A).

Synthesis Example 5

Compound Represented by Formula (I), Compound 105

According to the following method, 5,7-di-tert-Bu-3-(4-ethylphenyl)-3H-benzofuran-2-one (Compound 105) was synthesized by employing, as a starting compound, 5,7-di-tert-Bu-3-hydroxy-3H-benzofuran-2-one, ethylbenzene, and FULCAT 22B as a catalyst.

A mixture prepared by adding 40 g of FULCAT 22B to a solution prepared by dissolving 262.3 g (1.00 mol) of 5,7-di-tert-Bu-3-hydroxy-3H-benzofuran-2-one in 500 ml (4.08 mol) of ethylbenzene was refluxed on a water separator for 1.5 hours. Catalyst, FULCAT 22B, was removed via filtration, and excessive ethylbenzene was distilled out via a reduced pressure evaporator. GC-MS analysis was carried out. As a result, it was confirmed that the residue was composed of 59.2% of a para-isomer (Compound 105), 10.8% of a meta-isomer (compound 105A) and 21.1% of an ortho-isomer (Compound 105B). By crystallizing the residue from 400 ml of methanol, 163.8 g (47%) of 5,7-di-tert-Bu-3-(4-ethylphenyl)-3H-benzofuran-2-one (Compound 105) (a para-isomer) was prepared. Further, prepared were crystals incorporating 5.6% of a meta-isomer, 7-di-tert-Bu-3-(3-ethylphenuyl)-3H-benzofuran-2-one (Compound 105A) and 1.3% of an ortho-isomer, 5,7-di-tert-Bu-3-(2-ethylphenyl)-3H-benzofuran-2-one (Compound 105B). Subsequently, via recrystallization from methanol, an almost pure para-isomer (Compound 105) of a melting point of 127-132° C. was obtained.

Synthesis Example 6

Compound Represented by Formula (I), Compound 111

According to the following method, 5,7-di-tert-Bu-3-(2,3,4,5,6-pentamethylphenyl)-3H-benzofuran-2-one (Compound 111) was synthesized by employing, as a starting compound, 5,7-di-tert-Bu-3-hydroxy-3H-benzofuran-2-one, pentamethylbenzene, and tin tetrachloride as a catalyst.

Added to a solution which was prepared by dissolving 19.7 g (75.0 mmol) of 5,7-di-tert-Bu-3-hydroxy-3H-benzofuran-2-one in 50 ml of 1,2-dichloromethane were 11.5 g (77.5 mol) of pentamethylbenzene and 10 ml (85.0 mmol) of tin tetrachloride, and the reaction mixture was refluxed for one hour. The resulting reaction mixture was diluted with water and extraction via toluene was carried out three times. The organic phases were collected, washed with water, desiccated via sodium sulfate, and concentrated via a pressure reduced evaporator. By crystallizing the residue from ethanol, 26.3 g (89%) of 5,7-di-tert-Bu-(2,3,4,5,6-pentamethylphenyl)-3H-benzofuran-2-one (Compound 111) was obtained.

Synthesis Example 7

Compound Represented by Formula (I), Compound 108

According to the following method, 5,7-di-tert-Bu-3-(4-methylthiophenyl)-3H-benzofuran-2-one (Compound 108) was synthesized by employing, as a starting compound, 5,7-di-tert-Bu-3-hydroxy-3H-benzofuran-2-one, thioanisole, and aluminum trichloride as a catalyst.

A solution prepared by dissolving 26.2 g (0.10 mol) of 5,7-di-tert-Bu-3-hydroxy-3H-benzofuran in 25 ml (0.21 mol) of thioanisole was dripped at 35-40° C. into a solution prepared by dissolving 14.7 g (0.11 mol) of aluminum chloride in 15 ml (0.13 mol) of thioanisole. The reaction mixture was stirred at 30° C. for 30 minutes and subsequently at 80° C. for two hours. After cooling, approximately 50 ml of water and a sufficient amount of concentrated hydrochloric acid and methylene chloride to form a homogeneous double layer mixture were added. The organic phase was separated, washed with water, desiccated via sodium sulfate, and subsequently concentrated via a rotary evaporator. By crystallizing the residue from methanol, 6.7 g of 5,7-di-tert-Bu-3-(4-methylphenyl)-3H-benzofuran-2-one (Compound 108) of a melting point of 125-131° C. was obtained.

Synthesis Example 8

Compound Represented by Formula (I), Compound 104

According to the following method, 5,7-di-tert-Bu-3-(4-methylphenyl)-3H-benzofuran-2-one (Compound 104) was synthesized by employing, as a starting compound, 5,7-di-tert-Bu-3-hydroxy-3H-benzofuran-2-one, glyoxylic acid, toluene, and FULCAT 22B as a catalyst.

A mixture of 21.2 g (0.10 mol) of 2,4-di-tert-Buphenol (97%), 16.3 g (0.11 mol) of 50% aqueous glyoxylic acid, 2.0 g of FULCAT 22B, and 50 ml of toluene was refluxed over 8 hours on a water separator under a nitrogen flow. Catalyst FULCAT 22B was removed via filtration and excessive toluene was distilled out via a pressure reduced evaporator. By crystallizing the reside from 40 ml of ethanol, 14.2 g (42%) of 5,7-di-tert-Bu-3-(4-methylphenyl)-3H-benzofuran-2-one (Compound 104) was obtained.

(HP136)
IRGANOX HP136 (being a commercial compound represented by Formula (I), produced by Ciba Specialty Chemicals Corp.) (Additive 2: a compound having an acrylate group or a methacrylate group and a phenolic hydroxyl group in the same molecule)
1) Exemplified Compound 5
2) AP-1: SUMILIZER GM (being a commercial product, produced by Sumitomo Chemical Co., Ltd.) (Exemplified Compound represented by Formula (II))
3) AP-2: SUMILIZER GS (being a commercial product, produced by Sumitomo Chemical Co., Ltd.) (Exemplified Compound represented by Formula (II))
(Comparative Additive for the compound having an acrylate group or a methacrylate group and a phenolic hydroxyl group in the same molecule)
1) AP-3: SUMILIZER MDP-S (being a commercial product, produced by Sumitomo Chemical Co., Ltd.: the comparative example in the following)

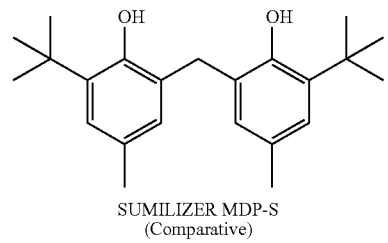 [SMILES: Cc1cc(Cc2cc(C)cc(C(C)(C)C)c2O)c(O)c(C(C)(C)C)c1]

SUMILIZER MDP-S
(Comparative)

(Other Additive 3)

1) HP-1: IRGANOX-1010 (produced by Ciba Specialty Chemicals Corp.)
2) GSY: GSY-P101 (produced by Sakai Chemical Industry Co., Ltd.)
3) P-EPQ: IRGANOX P-EPQ (produced by Ciba Specialty Chemicals, Corp.)
4) XP420: IRGANOX XP420 (being a mixture of HP136, IRGANOX-1010, and P-EPQ, produced by Ciba Specialty Chemicals Corp.)

Example 1

Preparation of Polarizing Plate Protective Film (Preparation of Polarizing Plate Protective Film 101)

Polarizing Plate Protective Film 101 was prepared by employing various types of compounds prepared via above synthesis examples and various types of commercial compounds employing the melt casting method.

| | |
|---|---|
| Cellulose ester (C-1) | 89 parts by weight |
| Plasticizer (TMPTB) | 5 parts by weight |
| Plasticizer (Exemplified Compound 9) | 5 parts by weight |
| Additive 1 (being a mixture of 3-(3,4-dimethylphenyl)-5,7-di-tert-Bu-3H-benzofuran-2-one (compound 103) of Synthesis Example 4 and 3-(2,3-dimethylphenyl)-5,7-di-tert-Bu-3H-benzofuran-2-one (Compound 103A at a ratio of approximately 5.7:1) | 0.3 part by weight |
| Additive 3 (HP-1) | 0.5 part by weight |
| Additive 3 (GSY) | 0.3 part by weight |

The above cellulose ester was dried at 70° C. under reduced pressure for 3 hours and cooled to room temperature, followed by blending of plasticizers and additives. The resulting mixture was further dried while stirring at 80° C. and 133 Pa via vacuum NAUTOR MIXER. The resulting mixture was melt-blended via a biaxial system extruder at 235° C., followed by pelletization. During the above operation, in order to retard heat generation, a kneading disk was not employed but an all screw type screw was employed. Further, vacuum was formed via suction through the vent hole, whereby volatile components generated during kneading were removed via suction. A feeder and a hopper to feed materials to the extruder and the space from the extruder to the cooling tank were placed in an ambience of desiccated nitrogen so that moisture was not absorbed by the resins.

Film formation was carried out via the manufacturing apparatus shown in FIG. 1.

First and second cooling rollers were made of stainless steel to attain a diameter of 40 cm, and their surfaces were subjected to hard chromium plating. Further, the temperature of the roller surface was controlled by circulating temperature regulating oil (cooling fluid) within its interior. The diameter of an elastic touch roller was determined to be 20 cm, and the inner cylinder and the outer cylinder were made of stainless steel. The surface of the outer cylinder was subjected to hard chromium plating. The wall thickness of the outer cylinder was made to be 2 mm. The surface temperature of the elastic touch roller was controlled by circulating temperature regulating oil (cooling fluid) in the space between the inner cylinder and the outer cylinder.

Prepared pellets (at a moisture content of 50 ppm) were melt-extruded at a melting temperature of 250° C. onto the first cooling roller at a surface temperature of 100° C. in the form of a film from a T-die, employing a uniaxial extruder, whereby a 80 μm thick cast film at a draw ratio of 20 was prepared. During the above operation, employed was a T-die at a lip clearance of the T-die of 1.5 mm and average surface roughness Ra of the lip section of 0.01 μm. Further, added were silica particles (produced by Japan Aerosil Co., Ltd.) as a sliding agent from a hopper aperture in the middle section of the extruder to result in 0.1 part by weight.

Further, the resulting film was pressed onto the first cooling roller via a touch roller having a 2 mm metallic surface at a linear pressure of 10 kg/cm. During pressing, film temperature on the touch roller side was 180±1° C. (film temperature of the touch roller side during pressing refers to the average value of film surface temperatures in the contact position of the touch roller on the first roller (the cooling roller) at 10 points in the lateral direction from positions 50 cm apart in the state of the absence of the touch roller due to its withdrawal of the touch roller, while employing a non-contact thermometer). Glass transition temperature Tg of the above film was 136° C. (based on the DSC method (at a temperature increase of 10° C./minute in an atmosphere of nitrogen), the glass transition temperature of an extruded film from the dice was determined).

Incidentally, the surface temperature of the elastic touch roller was set at 100° C., while the surface temperature of the second cooling roller was set at 30° C. The surface temperature of each of the elastic touch roller, the first cooling roller, and the second cooling roller was determined as follows. The surface temperatures of the roller in the 90° frontal position in the rotation direction from the position where the film was initially brought into contact with the roller were determined at 10 positions in the lateral direction via a non-contact thermometer, and the average value referred to as the surface temperature of each roller.

The resulting film was introduced into a tenter having a pre-heating zone, a stretching zone, a holding zone, and a cooling zone (having a neutral zone between two zones to assure heat insulation between any two zones), and after stretching in the lateral direction by a factor of 1.3, the resulting film was cooled to 30° C. while relaxed by 2% in the lateral direction. Thereafter, the resulting film was released from clips and the clip holding portions were trimmed off. Subsequently, the film was subjected to knurling of a width of 10 mm and a height of 5 μm on both edges, whereby Polarizing Plate Protective Film 101 of a film thickness of 60 μm was prepared. During the above operation, by regulating the pre-heating temperature and the holding temperature, minimized was the bowing phenomenon due to stretching. No residual solvents were detected in resulting Polarizing Plate Protective Film 1.

(Preparation of Polarizing Plate Protective Films 102-129)

Polarizing Plate Protective Films 102-129 at a film thickness of 60 μm, were prepared in the same manner as above Polarizing Plate Protective Film 101, except that the lip clearance (the draw ratio), the touching roller linear pressure, and Additives 1, 2, and 3 were changed as listed in Tables 1 and 2.

TABLE 1

| Polarizing Plate Protective Film No. | Draw Ratio | *2 | Film Temperature on Roller (° C.) | Cellulose Ester | Additive 1 Type | *3 | Additive 2 Type | *3 | Additive 3 Type | *3 | Remarks |
|---|---|---|---|---|---|---|---|---|---|---|---|
| 101 | 20 | 10 | 180 | 1 | *1 | 0.3 | — | — | HP-1 | 0.5 GSY 0.3 | Inv. |
| 102 | 20 | 10 | 180 | 2 | *1 | 0.3 | — | — | HP-1 | 0.5 GSY 0.3 | Inv. |
| 103 | 20 | 10 | 180 | 3 | Compound 101 | 0.3 | — | — | HP-1 | 0.5 GSY 0.3 | Inv. |
| 104 | 20 | 10 | 180 | 3 | Compound 105 | 0.3 | — | — | HP-1 | 0.5 GSY 0.3 | Inv. |
| 105 | 20 | 10 | 180 | 3 | Compound 104 | 0.3 | — | — | HP-1 | 0.5 GSY 0.3 | Inv. |
| 106 | 20 | 10 | 180 | 3 | Compound 111 | 0.3 | — | — | HP-1 | 0.5 GSY 0.3 | Inv. |
| 107 | 20 | 10 | 180 | 3 | Compound 108 | 0.3 | — | — | HP-1 | 0.5 GSY 0.3 | Inv. |
| 108 | 20 | 10 | 180 | 3 | HP136 | 0.3 | — | — | HP-1 | 0.5 GSY 0.3 | Inv. |
| 109 | 20 | 10 | 180 | 3 | — | — | — | — | HP-1 | 0.5 GSY 0.3 | Comp. |
| 110 | 20 | 10 | 180 | 3 | — | — | AP-3 | 0.5 | HP-1 | 0.5 GSY 0.3 | Comp. |
| 111 | 20 | 10 | 180 | 3 | — | — | AP-1 | 0.5 | HP-1 | 0.5 — — | Inv. |
| 112 | 20 | 10 | 180 | 3 | — | — | AP-1 | 0.5 | HP-1 | 0.5 GSY 0.3 | Inv. |
| 113 | 20 | 10 | 180 | 3 | — | — | AP-2 | 0.5 | HP-1 | 0.5 GSY 0.3 | Inv. |
| 114 | 20 | 10 | 180 | 3 | HP136 | 0.5 | — | — | HP-1 | 0.5 P-EPQ 0.3 | Inv. |
| 115 | 20 | 10 | 180 | 3 | XP420 | 1.5 | — | — | — | — — | Inv. |
| 116 | 10 | 10 | 180 | 3 | HP136 | 0.5 | — | — | HP-1 | 0.5 GSY 0.3 | Inv. |
| 117 | 10 | 10 | 180 | 3 | — | — | AP-1 | 0.5 | HP-1 | 0.5 GSY 0.3 | Inv. |
| 118 | 30 | 10 | 180 | 3 | HP136 | 0.5 | — | — | HP-1 | 0.5 GSY 0.3 | Inv. |
| 119 | 5 | 10 | 180 | 3 | HP136 | 0.5 | — | — | HP-1 | 0.5 GSY 0.3 | Comp. |
| 120 | 35 | 10 | 180 | 3 | HP136 | 0.5 | — | — | HP-1 | 0.5 GSY 0.3 | Comp. |
| 121 | 20 | ** | 180 | 3 | HP136 | 0.5 | — | — | HP-1 | 0.5 GSY 0.3 | Comp. |
| 122 | 20 | ** | 180 | 3 | | | AP-1 | 0.5 | HP-1 | 0.5 GSY 0.3 | Comp. |
| 123 | 20 | ** | 180 | 3 | | | AP-2 | 0.5 | HP-1 | 0.5 GSY 0.3 | Comp. |
| 124 | 20 | 5 | 180 | 3 | HP136 | 0.5 | — | — | HP-1 | 0.5 GSY 0.3 | Inv. |
| 125 | 20 | 15 | 180 | 3 | HP136 | 0.5 | — | — | HP-1 | 0.5 GSY 0.3 | Inv. |
| 126 | 20 | 15 | 180 | 3 | — | — | AP-1 | 0.5 | HP-1 | 0.5 GSY 0.3 | Inv. |
| 127 | 20 | 10 | 140 | 3 | HP136 | 0.3 | — | — | HP-1 | 0.5 GSY 0.3 | Inv. |
| 128 | 20 | 10 | 245 | 3 | HP136 | 0.3 | — | — | HP-1 | 0.5 GSY 0.3 | Inv. |
| 129 | 20 | 10 | 260 | 3 | HP136 | 0.3 | — | — | HP-1 | 0.5 GSY 0.3 | Inv. |

*1: Compound 103/103A,
*2: Touch Roller Linear Pressure (kg/cm),
*3: Amount part by weight
**: elastic touch roller not used,
Inv.: Present Invention,
Comp.: Comparative Example <<Preparation and Evaluation of Polarizing Plate>>

A polarizing plate was prepared by employing each of the resulting polarizing plate protective films. Long period optical unevenness, spotty unevenness, and light and shadow streaks were evaluated in a liquid crystal display device.

(Preparation of Polarizing Plate)

A 120 μm thick polyvinyl alcohol film was immersed into 100 parts by weight of an aqueous solution incorporating one weight part of iodine and 4 weight parts of boric acid, followed by longitudinal stretching by a factor of 6 at 50° C., whereby a polarizing film was prepared.

Subsequently, two of each polarizing plate protective film, prepared as above, were immersed into an aqueous 2 mol/L sodium hydroxide solution at 60° C. for 10 minutes, subsequently washed with water, and dried at 100° C. for 10 minutes. The above polarizing plate protective film was adhered to both sides of the above polarizing film by employing an adhesive composed of an aqueous 5% completely saponified type polyvinyl alcohol solution, whereby each of Polarizing Plates 101-129 was prepared.

One side of each of the resulting polarizing plate was subjected to a corona discharge treatment at a treatment amount of 50 dyn/cm, followed by lamination of an adhesion layer. The resulting composition was subjected to an aging treatment at normal temperature for one week. The above adhesion layer was prepared in such a manner that a solution prepared by blending 99.9 parts by weight of an acrylic acid ester based adhesive (at a weight ratio of butyl acrylate and acrylic acid of 95:5) with 0.1 part by weight of trimethylolpropane tolylene diisocyanate as a crosslinking agent was applied onto a releasing film (a 38 μm polyethylene terephthalate film which was subjected to a silicone treatment on one side), followed by drying.

A polarizing plate which had been adhered to a commercial liquid crystal display device was carefully peeled off, and each of the resulting polarizing plates was adhered so that the transmission axis matched that of the previously adhered polarizing plate, whereby each of Liquid Crystal Display Devices 101-129 was prepared.

(Evaluation of Liquid Crystal Display Devices)

(Long Period Optical Unevenness Resistance)

Light and shadow unevenness which appeared in a size of approximately 10 cm when each of the liquid crystal display device, prepared as above, was subjected to black display, was visually observed, and long period optical unevenness prior to accelerated aging was evaluated based on the evaluation criteria described below. Further, after storing each polarizing plate in an ambience of 80° C. and 90% relative humidity for 5 days (after accelerated aging), the long period optical unevenness was evaluated in the same manner.

A: an entirely uniform dark field was noted

B: when carefully observed, light and shadow were slightly noted at the periphery of the screen C: when carefully observed, slight light and shadow were entirely noted D: clear light and shadow were partly noted E: light and shadow were noted at a glance (Spotty Unevenness Resistance and Light and Shadow Streaking Resistance)

When each of the liquid crystal display devices was subjected to black display, formation of spotty unevenness and light and shadow streaking were visually observed, and the spotty unevenness resistance and the light and shadow streaking resistance were evaluated.

Table 2 shows each of the evaluation results.

TABLE 2

| Polarizing Plate Protective Film No. | Long Period Unevenness Before Accelerated Aging | Long Period Unevenness After Accelerated Aging | Spotty Unevenness, Light and Shadow Streaking | Remarks |
|---|---|---|---|---|
| 101 | A | B | none | Inv. |
| 102 | A | B | none | Inv. |
| 103 | A | B | none | Inv. |
| 104 | A | B | none | Inv. |
| 105 | A | B | none | Inv. |
| 106 | A | B | none | Inv. |
| 107 | A | B | none | Inv. |
| 108 | A | A | none | Inv. |
| 109 | D | E | none | Comp. |
| 110 | D | E | none | Comp. |
| 111 | A | B | none | Inv. |
| 112 | A | B | none | Inv. |
| 113 | A | B | none | Inv. |
| 114 | A | B | none | Inv. |
| 115 | A | A | none | Inv. |
| 116 | A | B | none | Inv. |
| 117 | A | B | none | Inv. |
| 118 | A | B | none | Inv. |
| 119 | C | C | spotty unevenness | Comp. |
| 120 | C | C | spotty unevenness | Comp. |
| 121 | D | D | light and shadow streaking | Comp. |
| 122 | D | D | light and shadow streaking | Comp. |
| 123 | D | D | light and shadow streaking | Comp. |
| 124 | B | B | none | Inv. |
| 125 | A | A | none | Inv. |
| 126 | A | B | none | Inv. |
| 127 | B | B | none | Inv. |
| 128 | A | B | none | Inv. |
| 129 | A | B | none | Inv. |

Inv.: Present Invention, Comp.: Comparative Example

As can be clearly seen from the results described in Table 2, polarizing plate protective films of the present invention excels in the long period optical unevenness resistance, spotty unevenness resistance, and light and shadow streaking resistance, compared to the comparative examples.

The invention claimed is:

1. A method for producing a polarizing plate protective film through film formation by melt casting, the method comprising the steps of:

extruding a melted film making composition through a casting die at a draw ratio of 10 to 30 during film formation by melt casting to form the polarizing plate protective film; and conveying the formed polarizing plate protective film while holding and pressing between a touch roller having an elastic surface and a cooling roller, wherein the melted film making composition comprises:
a cellulose ester resin; and
a compound represented by the following Formula (II):

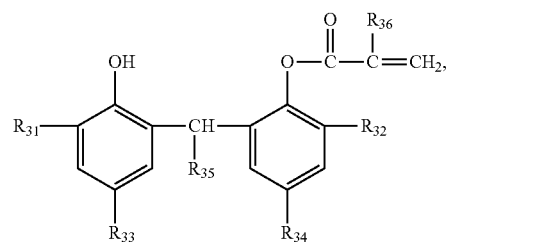

Formula (II)

wherein $R_{31}$ to $R_{35}$ each are independently a hydrogen atom or an alkyl group with 1 to 10 carbon atoms; and $R_{36}$ is a hydrogen atom or a methyl group, and wherein said cellulose ester resin simultaneously satisfies the following Schemes (1) and (2):

$$2.6 \leq X+Y \leq 3.0 \qquad \text{Scheme (1):}$$

$$0.0 \leq X \leq 2.5, \qquad \text{Scheme (2):}$$

wherein X represents the substitution degree of an acetyl group, while Y represents the substitution degree of a propionyl group or a butyryl group.

2. The method for producing a polarizing plate protective film of claim 1,
wherein the polarizing plate protective film contains the compound represented by Formula (II) in an amount of 0.01 to 5.0 mass portion based on 100 mass portion of the cellulose ester resin.

3. The method for producing a polarizing plate protective film of claim 1,
wherein the polarizing plate protective film comprises at least one plasticizer selected from the group consisting of:
an ester plasticizer derived from a polyhydric alcohol and a monocarboxylic acid;
an ester plasticizer derived from a polycarboxylic acid and a monohydric alcohol; and
a sugar ester plasticizer.

4. The method for producing a polarizing plate protective film of claim 1,
wherein the touch roller comprises an outer metal cylinder and an inner metal cylinder having a space therebetween in which a fluid is introduced.

5. The method for producing a polarizing plate protective film of claim 1,
wherein the compound represented by Formula (II) is at least a compound selected from the group consisting of AP-1 and AP-2, which are as follows:

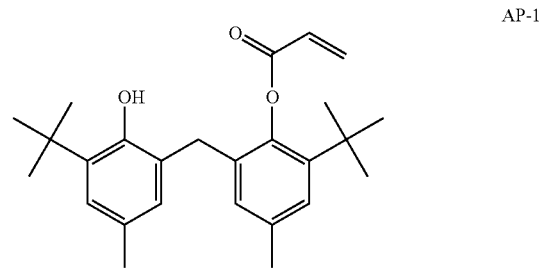

AP-1

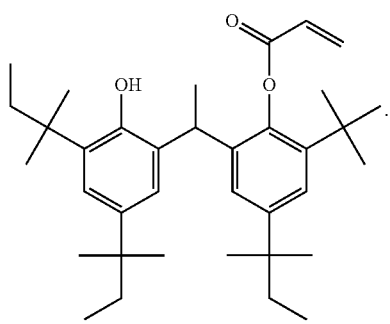
AP-2
* * * * *